United States Patent
Brogan et al.

(10) Patent No.: US 9,998,580 B2
(45) Date of Patent: Jun. 12, 2018

(54) COMPUTING DEVICE OPERABLE TO WORK IN CONJUNCTION WITH A COMPANION ELECTRONIC DEVICE

(75) Inventors: Hugh Brogan, Isle of Man (GB); Margaret Rice-Jones, Berkshire (GB); Ron Schaeffer, London (GB); Nigel Newby-House, London (GB); George Hines, Berkhamsted (GB)

(73) Assignee: HU-DO LTD., Isle of Man (GB)

( * ) Notice: Subject to any disclaimer, the term of this patent is extended or adjusted under 35 U.S.C. 154(b) by 0 days. days.

(21) Appl. No.: 13/643,680

(22) PCT Filed: Apr. 26, 2011

(86) PCT No.: PCT/GB2011/050825
§ 371 (c)(1),
(2), (4) Date: Jan. 7, 2013

(87) PCT Pub. No.: WO2011/135352
PCT Pub. Date: Nov. 3, 2011

(65) Prior Publication Data
US 2013/0109371 A1   May 2, 2013

(30) Foreign Application Priority Data

Apr. 26, 2010 (GB) .................................. 1006943.3
Oct. 14, 2010 (GB) .................................. 1017446.4
Dec. 22, 2010 (GB) .................................. 1021736.2

(51) Int. Cl.
*H04M 3/00* (2006.01)
*H04M 1/725* (2006.01)
(Continued)

(52) U.S. Cl.
CPC ...... *H04M 1/72527* (2013.01); *G06F 1/1626* (2013.01); *G06F 1/1632* (2013.01);
(Continued)

(58) Field of Classification Search
CPC ..... H04W 88/02; H04W 88/04; H03W 92/00; H03W 92/08; H03W 92/16; H03W 92/18
(Continued)

(56) References Cited

U.S. PATENT DOCUMENTS 6,049,453 A   4/2000 Hulsebosch
6,272,545 B1  8/2001 Flanagin et al.
(Continued)

FOREIGN PATENT DOCUMENTS

EP   0 703 522 A2   3/1996
GB   2470625 A    12/2010
(Continued)

OTHER PUBLICATIONS

International Search Report, dated Aug. 2, 2011, and Written Opinion, issued in priority International Application No. PCT/GB2011/050825.
(Continued)

*Primary Examiner* — San Htun
(74) *Attorney, Agent, or Firm* — Saul Ewing Arnstein & Lehr LLP

(57) ABSTRACT

A computing device is operable to work in conjunction with a companion electronic device. The computing device and the companion electronic device each have their own electronics and/or own operating system and each is able to construct a partial or complete user environment. The computing device is operable to send data to the companion device, on request of the companion device, which the companion electronic device then uses to locally construct its own user environment, in whole or in part.

23 Claims, 67 Drawing Sheets

(51) Int. Cl.
*G06F 1/16* (2006.01)
*G06F 9/445* (2018.01)

(52) U.S. Cl.
CPC .......... *G06F 1/1633* (2013.01); *G06F 1/1639* (2013.01); *G06F 1/1649* (2013.01); *G06F 1/1684* (2013.01); *G06F 1/1686* (2013.01); *G06F 1/1692* (2013.01); *G06F 8/60* (2013.01); *Y02D 10/42* (2018.01)

(58) Field of Classification Search
USPC .............................. 455/418–420, 556.1–559
See application file for complete search history.

(56) References Cited

U.S. PATENT DOCUMENTS

| | | | |
|---|---|---|---|
| 6,489,932 | B1 | 12/2002 | Chitturi et al. |
| 6,538,880 | B1 | 3/2003 | Kamijo et al. |
| 2001/0001083 | A1 | 5/2001 | Helot |
| 2003/0041206 | A1 | 2/2003 | Dickie |
| 2003/0079038 | A1 | 4/2003 | Robbin et al. |
| 2003/0149817 | A1 | 8/2003 | Scott et al. |
| 2004/0077313 | A1 | 4/2004 | Oba et al. |
| 2004/0145606 | A1 | 7/2004 | Jones |
| 2004/0157638 | A1 | 8/2004 | Moran et al. |
| 2004/0235520 | A1* | 11/2004 | Cadiz ................. H04M 1/2473 455/557 |
| 2005/0008344 | A1 | 1/2005 | Crohas |
| 2005/0013103 | A1 | 1/2005 | Chandley |
| 2005/0153749 | A1 | 7/2005 | Falcon et al. |
| 2006/0094462 | A1 | 5/2006 | Nguyen et al. |
| 2006/0100978 | A1 | 5/2006 | Heller et al. |
| 2006/0236014 | A1 | 10/2006 | Yin et al. |
| 2007/0087725 | A1 | 4/2007 | Anderson |
| 2007/0124372 | A1* | 5/2007 | Liu ......................... G06F 3/023 709/204 |
| 2007/0198760 | A1 | 8/2007 | Han |
| 2007/0226327 | A1* | 9/2007 | Redpath ....................... 709/223 |
| 2007/0288227 | A1* | 12/2007 | Kim et al. ....................... 703/24 |
| 2008/0026794 | A1 | 1/2008 | Warren |
| 2008/0034009 | A1 | 2/2008 | Freedman et al. |
| 2008/0082603 | A1 | 4/2008 | Mansour et al. |
| 2008/0248834 | A1* | 10/2008 | Chatterjee ............. G06F 3/1415 455/557 |
| 2008/0263178 | A1* | 10/2008 | Hogue .................... G06F 15/16 709/218 |
| 2008/0300884 | A1* | 12/2008 | Smith .................... G06F 9/4443 704/270.1 |
| 2009/0125838 | A1* | 5/2009 | Bhogal .................... H04L 67/38 715/788 |
| 2009/0198851 | A1 | 8/2009 | Rofougaran |
| 2009/0284476 | A1* | 11/2009 | Bull ....................... G06F 9/4445 345/173 |
| 2010/0045611 | A1* | 2/2010 | Nelson ................ G06F 3/03547 345/173 |
| 2010/0138780 | A1* | 6/2010 | Marano et al. ................ 715/804 |

FOREIGN PATENT DOCUMENTS

| | | |
|---|---|---|
| WO | 2007/047056 A2 | 4/2007 |
| WO | 2008/100893 A1 | 8/2008 |
| WO | 2010/028293 A2 | 3/2010 |
| WO | 2010/110955 A2 | 9/2010 |

OTHER PUBLICATIONS

Search Report, dated Aug. 22, 2011, issued in corresponding UK Application No. GB1106935.8.
International Preliminary Report on Patentability, dated Oct. 30, 2012, issued in priority International Application No. PCT/GB2011/050825 111.

* cited by examiner

PhoneBook System Overview Examples

COMPUTING DEVICE OPERABLE TO WORK IN CONJUNCTION WITH A COMPANION ELECTRONIC DEVICE

CROSS REFERENCE TO RELATED APPLICATIONS

This application claims the priority of PCT/GB2011/050825, filed on Apr. 26, 2011, which claims priority to Great Britain Application No. 1006943.3, filed on Apr. 26, 2010; Great Britain Application No. 1017446.4, filed Oct. 14, 2010; and Great Britain Application No. 1021736.2, filed Dec. 22, 2010, the entire contents of each of which are hereby incorporated in total by reference.

BACKGROUND OF THE INVENTION

1. Field of the Invention

This invention relates to a computing device operable to work in conjunction with a companion electronic device. The computing device may be a mobile telephone or other kind of fixed or mobile device: the invention has the potential to revolutionize the way people use fixed or mobile devices, mobile phones and computers. The system and product embodiments plug the gap which has not been filled by smartphones, netbooks or smartbooks or other PDA style devices, and other consumer electronic devices, by bringing computer and media connectivity to mobile device users throughout the world, including in emerging markets which are looking to save on the cost of devices and infrastructure development.

2. Technical Background

In this invention, the computing device and the companion electronic device each have their own electronics and/or own operating system and each is able to construct a partial or complete 'user environment'. A 'user environment' is the complete set of software and hardware components that together provide for output to and input from a user, where a user is a person, persons or another device (for example, for machine to machine (M2M) applications).

3. Description of the Prior Art

Four factors have been cited as the key drivers for the growth in smartphone computing devices in the coming years:—
 Disruptive innovations in mobile software and hardware;
 Rising consumer/business demand for mobile data (and applications);
 Faster wireless networks; and
 Mass market smartphone and data pricing
Although both smartphones and notebooks markets and other computing and consumer electronic devices have benefitted from many breakthrough products in recent years, no device has yet been capable of providing a single solution that spans all user scenarios in a flexible and cost effective way. See Market Drivers, FIGS. 1 and 2.

Until recently mobile data consumption has been enabled mainly through two types of device, both predominantly the preserve of business customers:
 Smartphones (<4-5" display); &
 Notebooks (>=13.0" display)
However, as consumer demand for data services and downloadable mobile applications has increased, a host of alternatives devices have emerged as manufacturers and service providers seek to define the "ideal" consumption and creation device and their share of the associated revenues. Emerging mobile data category devices now include:
 Netbooks (10.0" to 13.0")
 Smartbooks (4.0-5.0" to 10")
 Tablets (7.0" to 10.0")
But still there is a gap. The PC can use the bandwidth provided by mobile broadband networks but does not have the portability, where as a mobile phone has the portability but has a limited user environment and this limits the functionality and the ability to use the bandwidth that is available. Apple's iPad and other tablets try to solve some of these issues but have many limitations:
 Still a two autonomous device solution . . . it's not a phone.
 Modest display size (e.g., 9.7")
 Reliant on virtual keypad or (keyboard as an accessory)
 Expensive
 No Flash support on Apple devices (though browsing is supposed to be a key benefit)
 No printing

SUMMARY OF THE INVENTION

The invention is a computing device operable to work in conjunction with a companion electronic device, in which the computing device and the companion electronic device each have their own electronics and/or own operating system and each is able to construct a partial or complete user environment;
 in which the computing device is operable to send data to the companion device, on request of the companion device, which the companion electronic device then uses to locally construct its own user environment, in whole or in part.

This approach enables the companion electronic device to leverage off the computational resources of the computing device. In one implementation, the computing device is a smartphone and the companion electronic device has the form factor of a clamshell laptop or netbook; the smartphone provides the data that the companion device uses to locally construct its own user environment, in whole or in part. The smartphone need have no understanding of the configuration (e.g. display size) of the companion device and hence the data it sends is may be 'generic' data that is not specific to one type or model of companion device but instead can be used by a broad range of different companion devices.

By distributing the computational load in this manner across both the mobile device and the companion device, enables a combined system that is flexible, powerful and also efficient.

An implementation of the invention is called the PPC—the 'Phone Powered Computer'. The invention can be implemented in a very broad range of forms.

BRIEF DESCRIPTION OF THE DRAWINGS

The invention will be described with reference to the accompanying drawings.

DETAILED DESCRIPTION

The Phone Powered Computer (PPC)

Figure 1:
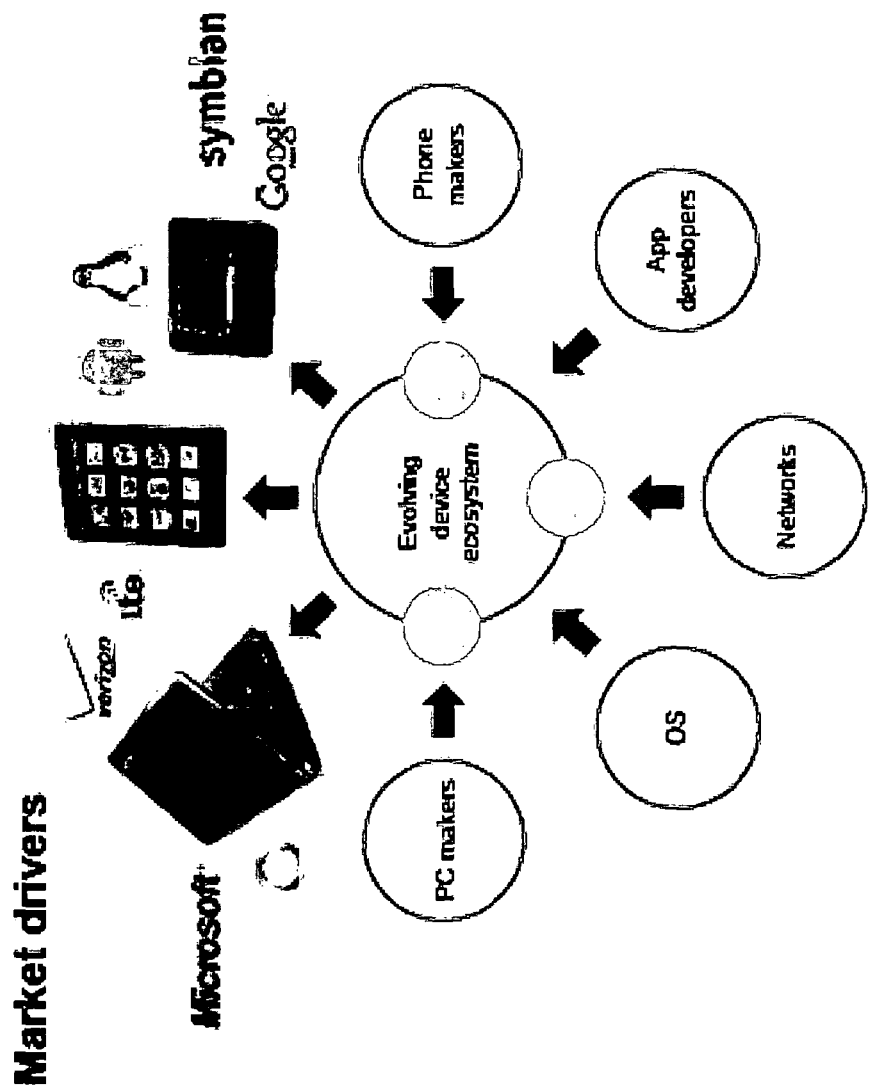
FIG. 1 Market Drivers
 FIG. 2 Market Drivers 2
 FIG. 3 User Experience Flow Example
 FIG. 4 Device Discovery & Connection Flow Example 1
 FIG. 5 Device Discovery & Connection Flow Example 2
 FIG. 6 Sample Computing Device Architecture FIG. 7 Sample Companion Electronic Device Architecture Example
FIG. 8 Example Laptop Style PPC system
FIG. 9 Example Laptop PPC System
FIG. 10 Example Laptop PPC System
FIG. 11 Example Laptop PPC System
FIG. 12 Example PPC System Computing Device close up
FIG. 13 Example PPC System Computing Device Detail
FIG. 14 Example PPC system Bluetooth headset close up
FIG. 15 Example PPC system Laptop style
FIG. 16 Example PPC system Tablet style
FIG. 17 Example PPC Enabler Distribution Options
FIG. 18 HW/OS Configuration Options
FIG. 19 HW/OS Configuration Options 2
FIG. 20 Software Configuration Option Example A
FIG. 21 Software Configuration Option Example B
FIG. 22 Software Configuration Option Example C
FIG. 23 Software Configuration Option Example D
FIG. 24 Software Configuration Option Example Z
FIG. 25 Possible Smart Computing Device/Smart Companion Electronic Device System
FIG. 26 PhoneTube (TV/Desktop Dock) System Overview Examples
FIG. 27 PhonePad (Tablet-style) System Overview Examples
FIG. 28 PhoneBook (Laptop-style) System Overview Examples
FIG. 29 Companion Electronic Device or Computing Device Hardware Block Diagram Example
FIG. 30 Computing Device Docking Example
FIG. 31 Computing Device & Companion Electronic Device
FIG. 32 Laptop-style Companion Electronic Device Example with Rotating Display (Presentation Mode)
FIG. 33 Laptop-style Companion Electronic Device Example with Rotating Display (Closed)
FIG. 34 TV/Desktop dock-style Companion Electronic Device Example
FIG. 35 PhoneWrap Dock Example
FIG. 36 PhoneWrap Detail Example
FIG. 37 PhoneWrap Dongle Example
FIG. 38 Shoe Adapter Example
FIG. 39 Adapter Example
FIG. 40 Tablet-style Companion Electronic Device Docking Option Example
FIG. 41 Laptop-style Companion Electronic Device Example
FIG. 42 Laptop-style Companion Electronic Device Docking Example
FIG. 43 Laptop-style Companion Electronic Device Docking Example
FIG. 44 Compartment Docking Example
FIG. 45 Tablet-style Companion Electronic Device Drawer Docking Example
FIG. 46 Tablet-style Companion Electronic Device Slot Docking Example
FIG. 47 Tablet-style Companion Electronic Device Slot Docking Example
FIG. 48 Tablet-style Companion Electronic Device Example
FIG. 49 Laptop-style Companion Electronic Device Docking Example
FIG. 50 Laptop-style Companion Electronic Device Docking Example
FIG. 51 Laptop-style Companion Electronic Device Docking Example
FIG. 52 Laptop-style Companion Electronic Device Docking Example
FIG. 53 Laptop-style Companion Electronic Device Docking Example
FIG. 54 Laptop-style Companion Electronic Device Docking Example
FIG. 55 Laptop-style Companion Electronic Device Docking Example
FIG. 56 Alternative Device Form Factor Example
FIG. 57 Alternative Device Form Factor Example
FIG. 58 Alternative Device Form Factor Example
FIG. 59 Alternative Device Form Factor Example
FIG. 60 Alternative Device Form Factor Example
FIG. 61 Alternative Device Form Factor Example
FIG. 62 Alternative Device Form Factor Example
FIG. 63 Alternative Device Form Factor Example
FIG. 64 Alternative Device Form Factor Example
FIG. 65 Alternative Device Form Factor Example
FIG. 66 Tablet-style Device Mechanical Stack Example
FIG. 67 Dock-style Device Mechanical Stack Example
FIG. 68 Laptop-style Device Mechanical Stack Example
FIG. 69 Dock-style Device Form Factor Example
FIG. 70 Tablet-style Device Form Factor Example
FIG. 71 Dock-style Gaming System Form Factor Example
FIG. 72 Multiple Computing Device and Multiple Companion Electronic Device Example
FIG. 74 Folio-style PPC system Example with Tablet-style Companion Electronic Device
FIG. 75 Desktop-style Dock Alternative Example
FIG. 76 Desktop-style Dock Alternative Example
FIG. 77 Desktop-style Dock Alternative Example
FIG. 78 Desktop-style Dock Alternative Example
FIG. 79 Desktop-style Dock Alternative Example
Figure 2:
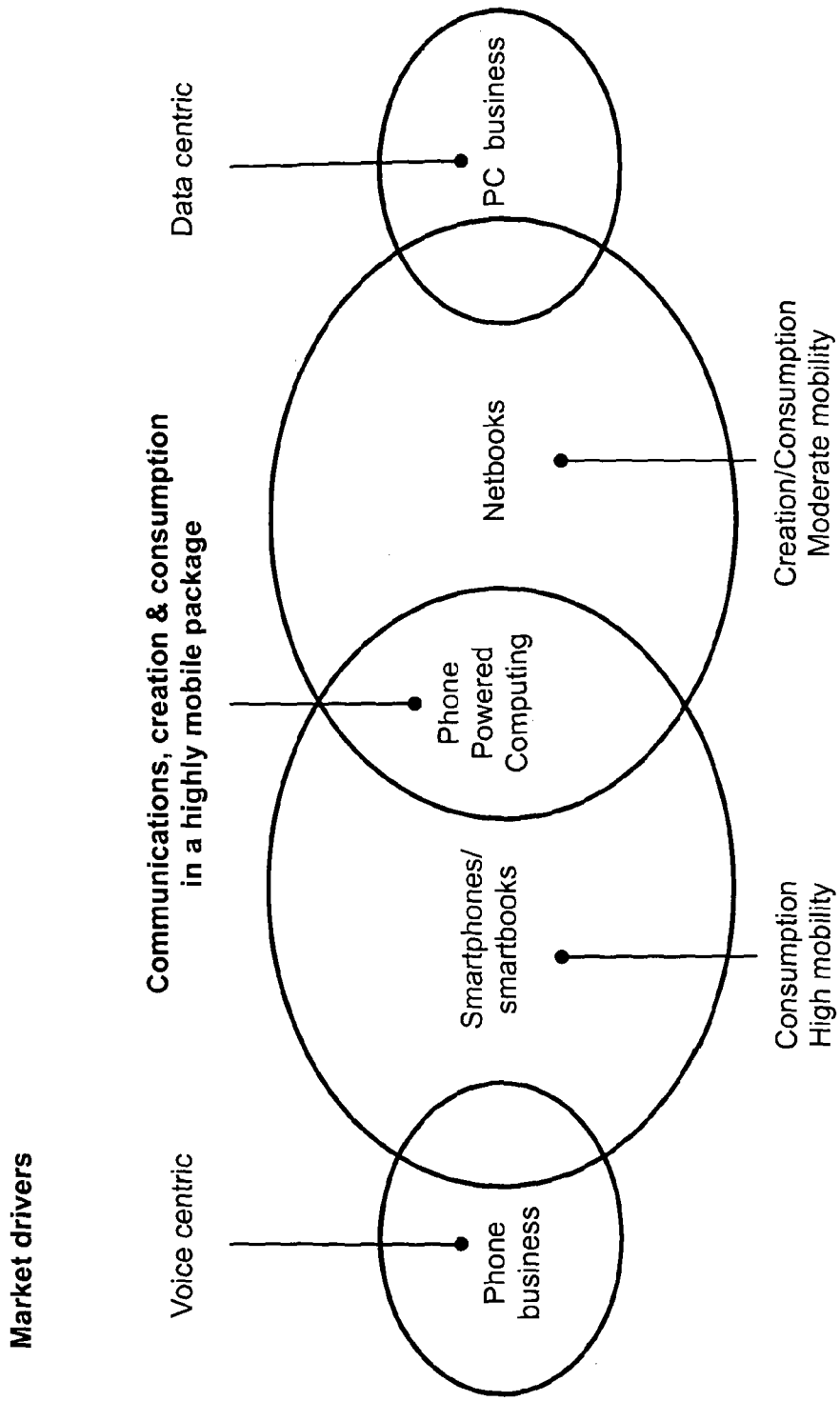

A PPC is a highly differentiated proposition that offers an innovative solution to emerging hardware, software and service models in relation to current and future network rollouts, emerging high-bandwidth value-added services, constantly shifting user-scenarios and existing and future business models such as cloud computing.

Essentially, a PPC system leverages the computing and communication capability of a smartphone (or other mobile or fixed electronic device) along with its applications, data, user interface elements, media, content, etc., making these available in form factors and/or use case scenarios that are more convenient, more optimized, or simply provide an alternative to using the smartphone (or other device) directly. This is achieved through a physical and or logical and or wireless connection to another device or devices that may resemble (but may not necessarily be) a familiar device category, such as a desktop, notebook or tablet computer. These other device or devices can have varied amounts of processing, storage, applications, user interaction, user feedback, input/output and data capabilities of their own, but may be less capable, less expensive and less complex than the familiar device type that they resemble.

Through its innovative multi-part architecture, a PPC may combine (as an example) a 3.5" display smartphone with an innovative 11.1" netbook computer (or a device that looks like one) to deliver a series of benefits that are both consumer wise and commercially very attractive.

Other examples of phone-powered computing include a phone or other electronic device referred to in this document as a Computing Device, connected wired or wirelessly directly or indirectly to a Companion device, also referred to throughout this document as a Companion Electronic Device, either or both of which may be, or may in turn be connected to:

Secondary display (s)
Peripherals such as memory, printer, etc.
Tablet (s) and devices with the appearance of a tablet.
Automobile or other transport displays
Computer (s) and devices with the appearance of a computer
Server (s)
Another phone (s)
Gaming console (s)
Keyboard (s)
Remote control (s)
Game controllers
Kiosk (s)
Portable navigation device (s)
Television (s)
Multimedia receiver (s)
Other multimedia systems
Point of sale device (s)
A docking stand
Industrial PDA's (e.g., warehouse or shop floor management)

The above are also examples of Companion Electronic Devices.

Although the concept is referred to as phone-powered computing, the mobile device need not be a phone. It could be any mobile (or fixed) device, also referred to through this document as Computing Device, including but not limited to:

Feature phone
Smartphone
Satellite navigation device
PDA
Media player
Camera
eReader
Tablet
Netbook/smartbook PPC Benefits Using fast, power efficient, processing, media and communications electronics, a PPC system creates a solution that delivers:

Low cost/high margin computing
Genuine breakthrough quad-play hardware and User environment (UE) solution For the purposes of this disclosure, "user environment" (UE) refers to the complete set of software and hardware components that together provide for output to and input from a user. A user may be a person or persons or another machine. These components may provide for any or all of the following, in whole or in part, and may also provide for additional means of output to or input from a user: Display screen, graphical user interface, textual user interface, motion user interface, audio user interface, camera, other optical sensor, LED or other light output, IRDA transceiver, proximity sensor, audio output, speaker(s), microphone(s), vibrator, haptics, touchscreen, buttons, keypad, trackpad, mouse, trackball, accelerometer, e-compass, other position/movement sensors, NFC transceiver, gesture capture mechanisms. In some cases, user environment may specifically refer to a subset of the above, for example, the graphical user interface and audio output.

Flexible mobile and notebook/tablet/television (or other form factor) usability with an appropriate UE, for example:
Same (or varied) set of applications, data, Graphical User Interface (GUI) elements, etc., in order to enable an appropriate user experience for the Companion Electronic Device;
Consistency of user and application data (files, bookmarks, history, preferences, etc.) across the Computing Device and Companion Electronic Device
Appropriate state persistency across the Computing Device and the Companion Electronic Device, such as maintaining browsing session, open applications, application state etc. when connecting, operating or disconnecting the Computing Device from the Companion Electronic Device.
Common state and data consistency of Companion Electronic Device applications by, for example, storing such information on the Computing Device. A benefit of this would be to maintain the same state and data set across a number of different Companion Electronic Devices that the Computing Device could be connected to at different times.
Ultimate productivity solution with class-leading power (in terms of both processing power, i.e., capability, and power consumption) efficiency.
See also related discussions of power (processing and electrical) elsewhere in this document.
Multi-modal product architecture
See also related discussion of modes, multi-modal states, system architectures and device architectures elsewhere in this document.

The PPC concept will exert a disruptive influence compared to conventional wireless-device business models to deliver increased value at lower costs throughout the value chain.

For example, the Companion Electronic Device leverages the WAN connection (e.g. cellular) and subscription associated with the handheld device, saving cost for the cellular network operator in maintenance of multiple SIM cards and subscriptions and for the user in the cost of those multiple subscriptions.

PPC could reduce network operator subsidization cost because the BOM costs and hence selling price of the Computing Device and/or Companion Electronic Device are lower than standalone device and multiple subscription costs ("Two lower performance processors [Computing Device/Companion Electronic Device] are cheaper than one higher performance processor.")

Multipart Architecture & the PPC Enabler

A PPC has two or more key parts, a Computing Device ('C1') and a Companion Electronic Device (or 'C2' . . . 'Cn'), with the ability to plug-in and add other units, devices, tokens and similar.

A key characteristic of the multipart architecture is a "PPC enabler". The PPC enabler is the collection of hardware and software components that allow the mobile device Computing Device user experience (or a modified version thereof), applications, data, connectivity, etc., to be displayed, accessed and/or controlled using elements of a second device Companion Electronic Device, or vice versa. Components of the PPC enabler may be distributed across the Computing Device, the Companion Electronic Device (s), or another element or elements as part of a physical or logical system between the Computing Device and the Companion Electronic Device.

See also later discussion of the PPC Enabler.

Key functions of the PPC enabler include:

Management of some or all video, audio, data, (user and system) applications, control and UE signals to the single or a series of integrated and or external wired, wireless, or networked connection between Computing Device and Companion Electronic Devices.

Optimisation and modification/reconfiguration of the UE when connected or before or after a connection to an external device, which could include, for example, a display of an alternative format or resolution.

The interrogation, sensing and potential determination of the system environment and the adaptation of the hardware, hardware signals and software (RTOS, OS, applications and data) including the presentation of the user environment in an appropriate manner for the particular device and scenario.

In addition to encompassing many potential physical form factors and usage methods, there are many potential underlying, multipart hardware and software architectures which could form a PPC system.

Figure 18:
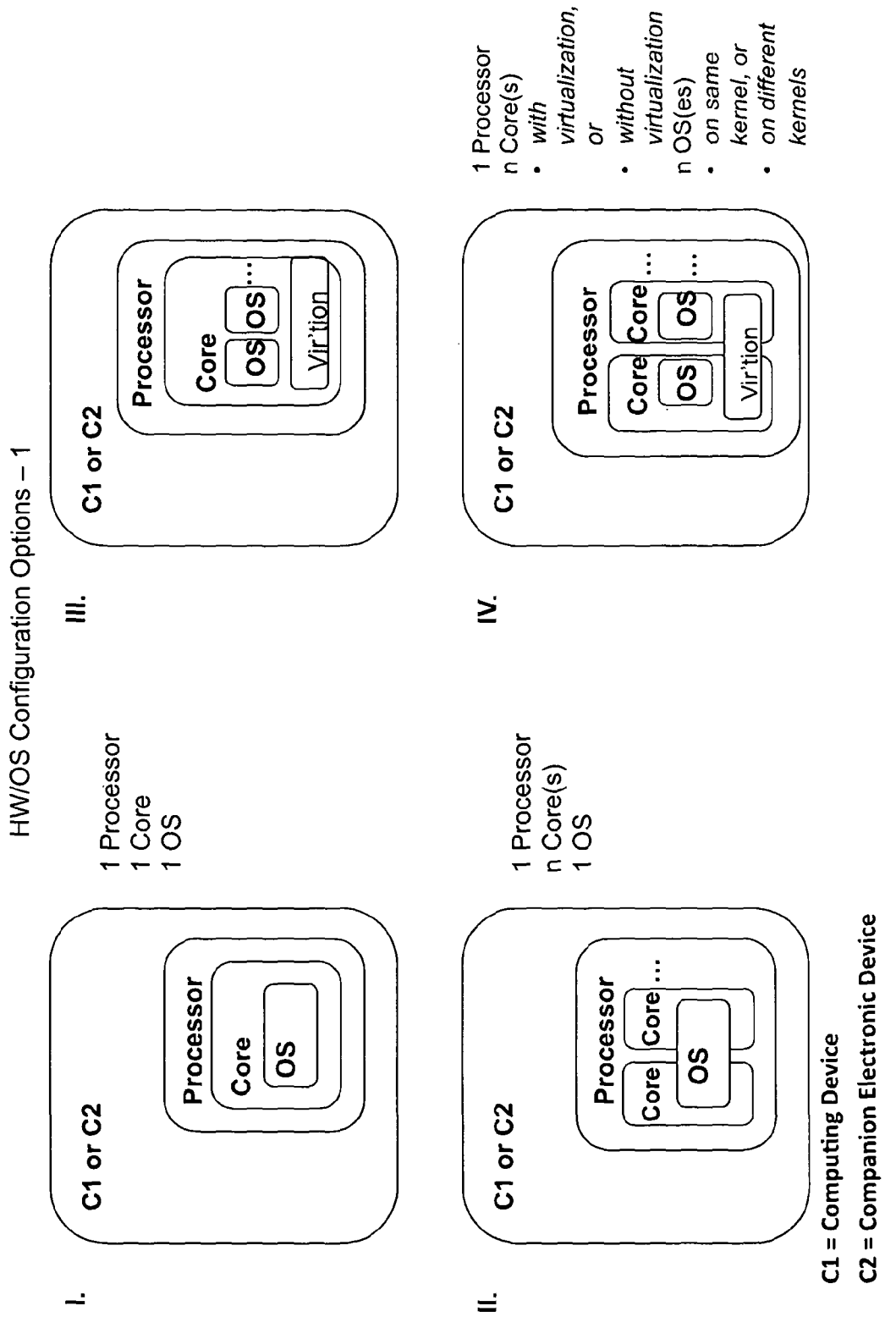
Figure 19:
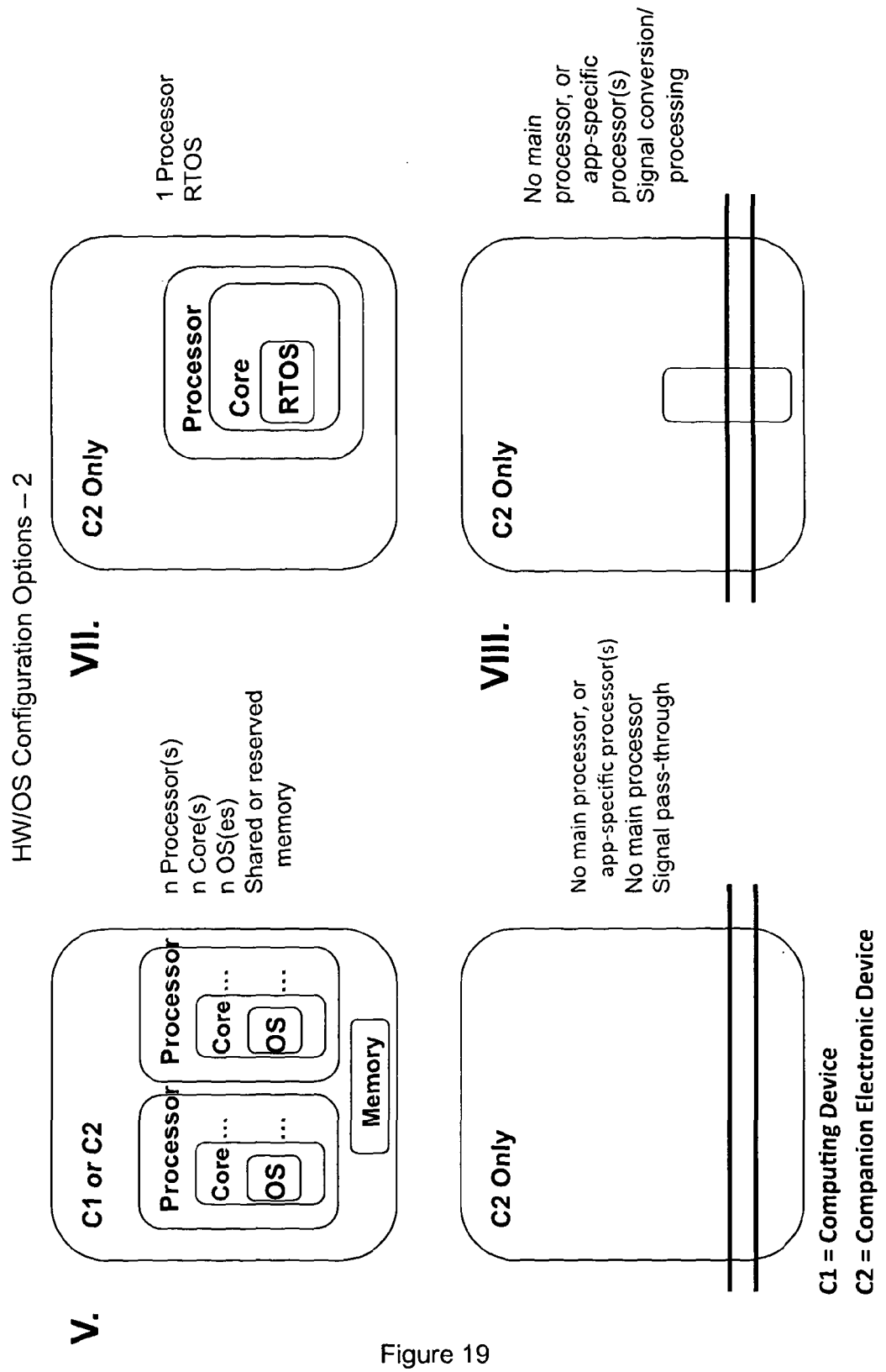
Figure 20:
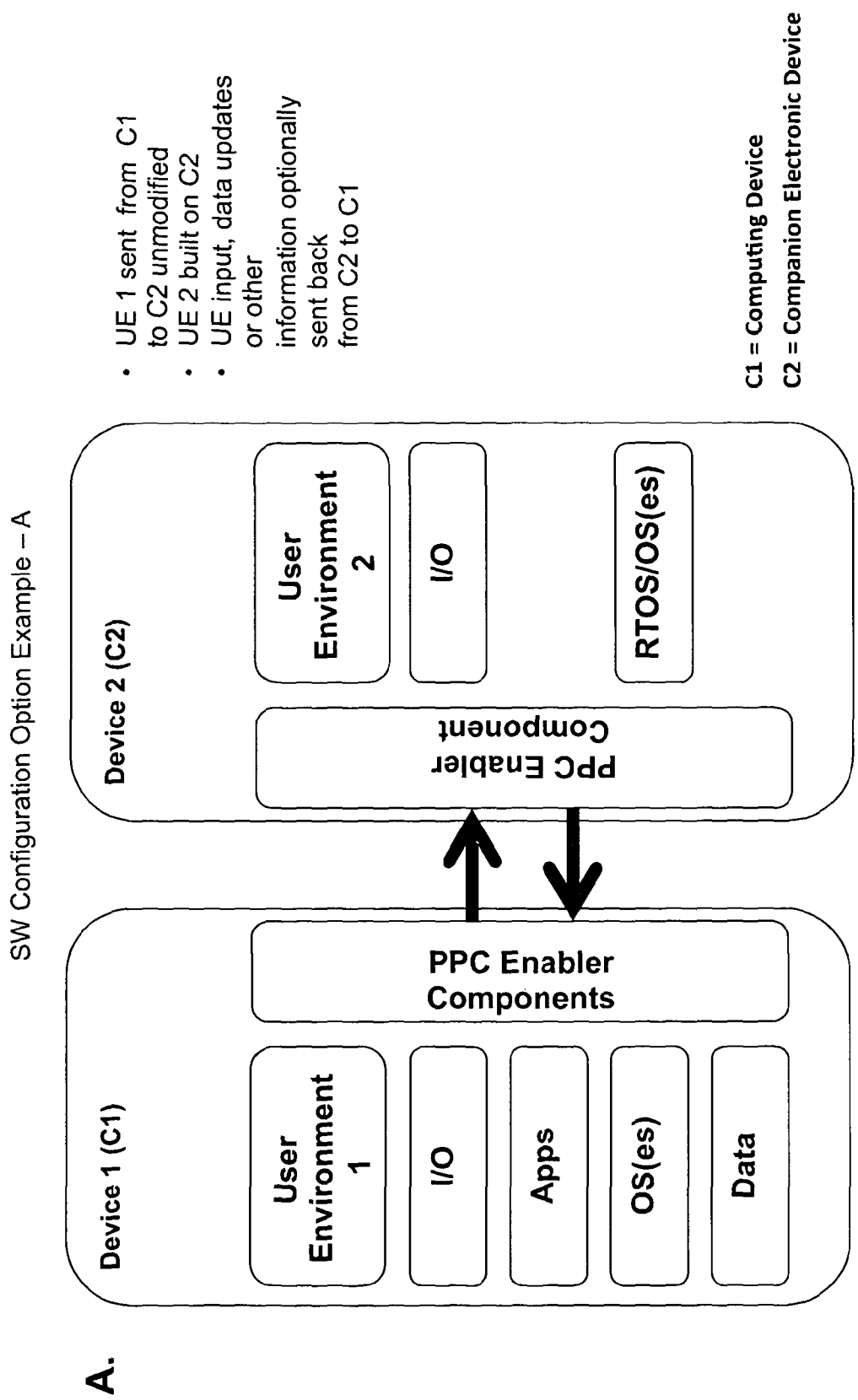
Figure 21:
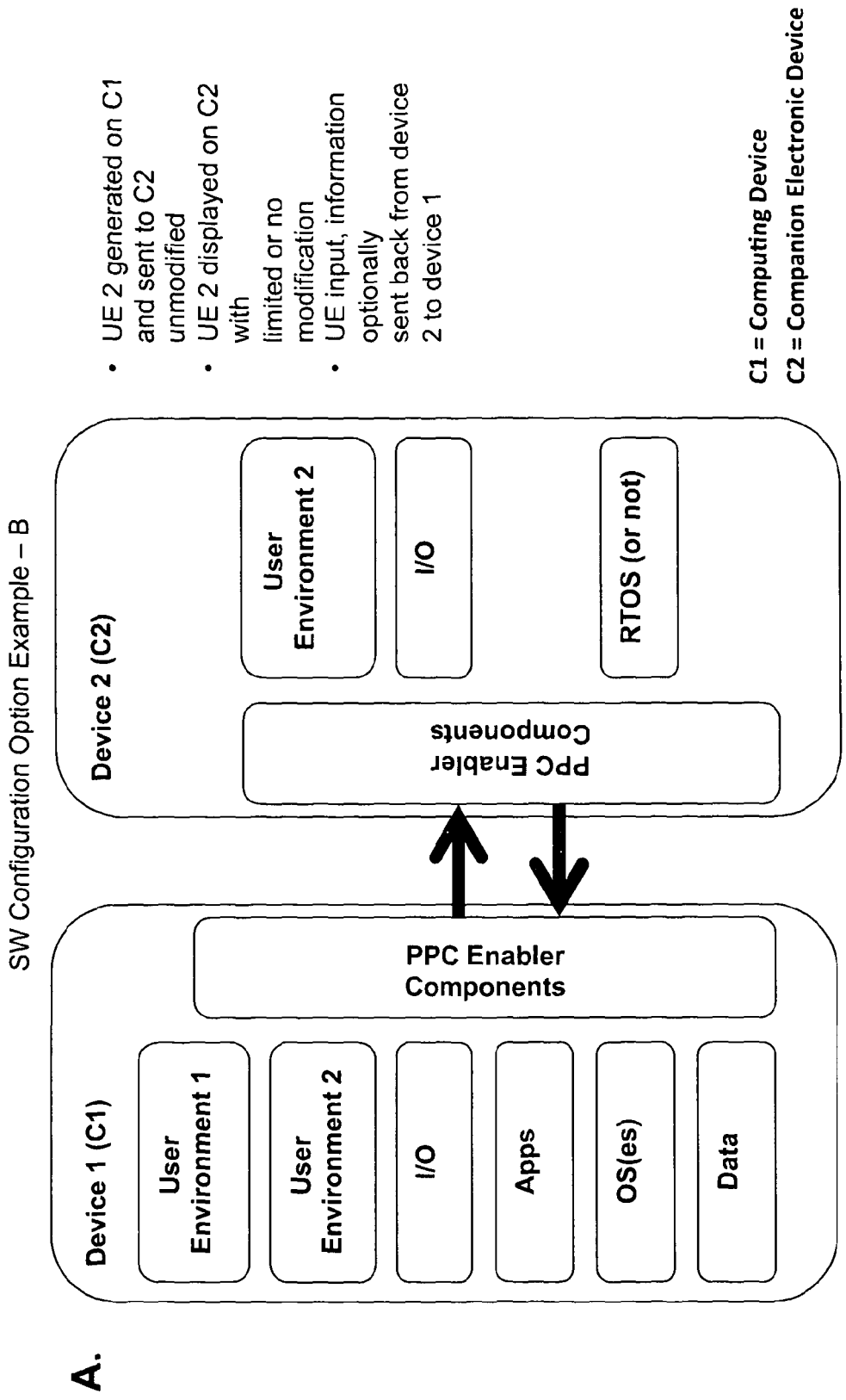
Figure 22:
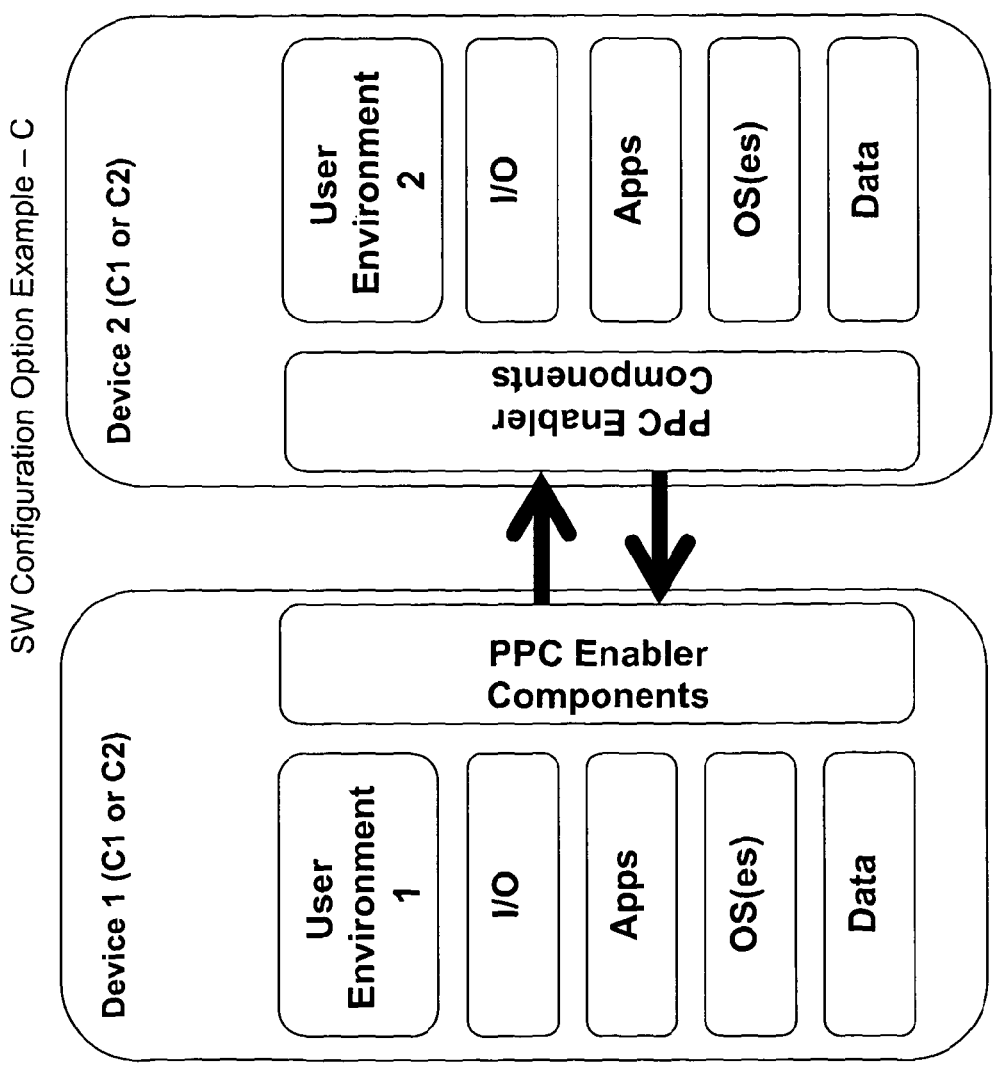
Figure 23:
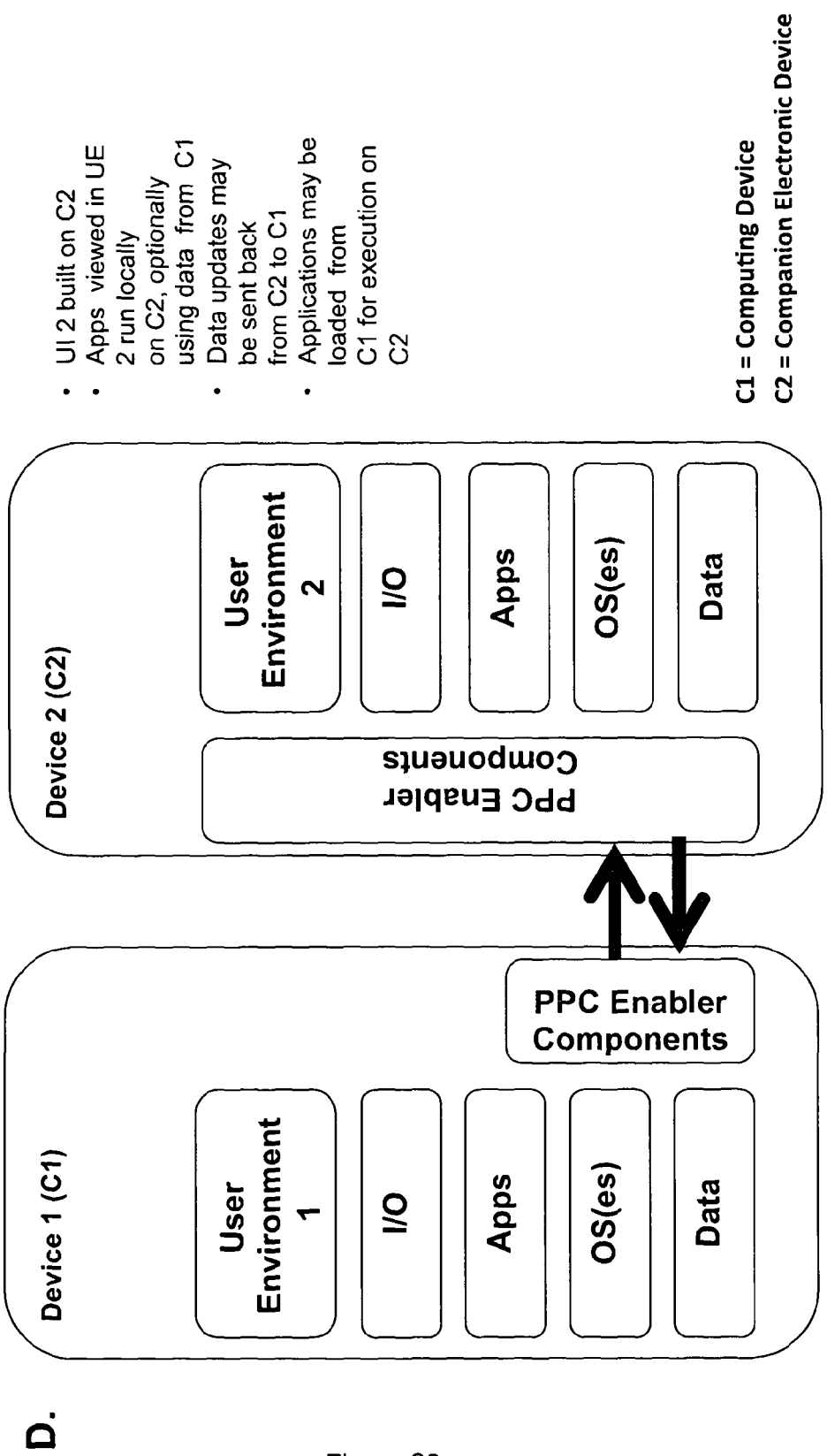
Figure 24:
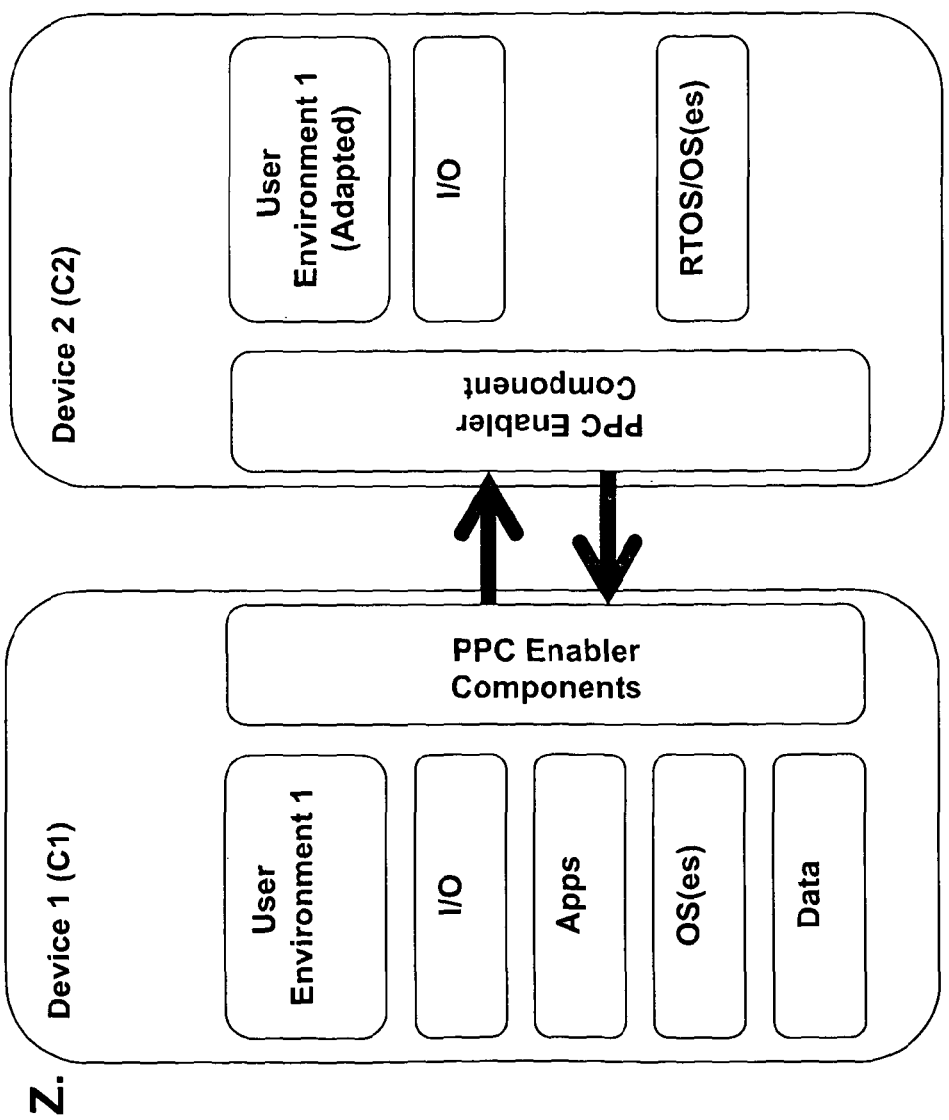

These architectures may be described in two categories:
1. Hardware and Operating System Configurations (Some examples are shown in FIGS. 18 to 19.)
2. Software Configurations (Some examples are shown in FIGS. 20 to 24.)

Hardware and Operating System Configuration options include the placement of different hardware, operating system and enabler components variously in Computing Device, Companion Electronic Device or in other devices in the system. Relevant components may include but are not limited to:

Single or multicore general purpose processors, such as ARM, MIPS, or X86-based processors Application-specific processors or hardware components, such as video or audio codecs Any number of RTOS or OS instances, which may be instances of the same or of different OSes, such as Android, iOS, Blackberry OS, webOS, any Linux distribution, Windows, OS X, Neutrino, Nucleus, OSE, QNX, etc.

Dedicated or shared OS kernels

Dedicated or shared memory

Hardware or software virtualization methods, such as OKL4, Codezero, other hypervisors, Intel VT, etc.

Mechanical, electromechanical and physical or logical interconnect components

Software configuration options relate mainly to distribution of various software tasks, such as UE element generation, application execution and data storage/access, around the system. Relevant components may include but are not limited to:

"PPC enabler" software components (See "PPC enabler" elsewhere.)

GUI or other UE element description
GUI or other UE element generation
GUI or other UE element adaptation
GUI or other UE element combination
GUI or other UE rendering
Input/output drivers and handing
User data
System data
Device Data
Preferences and settings
Applications
Application execution
Application results handing and output Example Embodiments There are many possible embodiments of Phone Powered Computing, both for the externally visible form factors/use scenarios of the devices/systems and for the underlying architecture of those devices/systems. These embodiments can divide into three complementary areas:
1. Form factor and use scenario
2. System architecture
3. PPC enabler Potentially, any embodiment within each of the three complimentary areas could be used with any embodiment of the architectures or systems in any combination.

Form Factor and Use Scenario Embodiments

Many different form factors and use scenario embodiments are possible with the PPC concept some examples but not limited to are Laptop-style Companion Electronic Device connected wired or wirelessly to Computing Device Tablet-style Companion Electronic Device connected wired or wirelessly to Computing Device Desktop-style Companion Electronic Device connected wired or wirelessly to Computing Device with or without wireless keyboard, trackpad remote control, and/or mouse.

TV dock-style Companion Electronic Device connected wired or wirelessly to Computing Device, with or without wireless keyboard, remote control, trackpad and/or mouse TV dock-style Companion Electronic Device connected wired or wirelessly to Computing Device, with the Computing Device acting as the game controller or alternatively with wired or wireless game controllers Wired and wireless connections between Computing Device and Companion Electronic Device, or single to multiple Computing Device and Companion Electronic Device configurations are possible.

Figure 26:
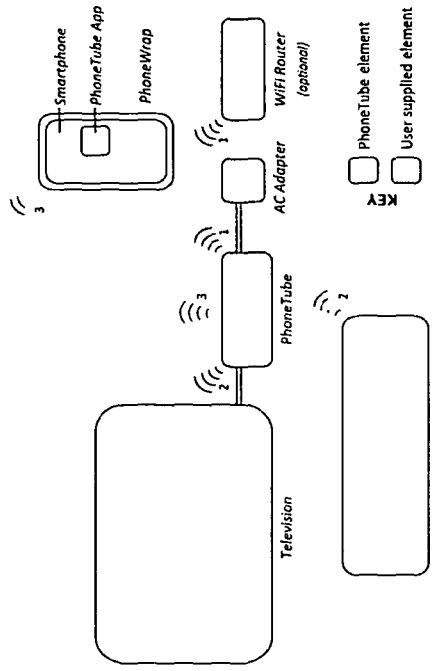
Figure 26:
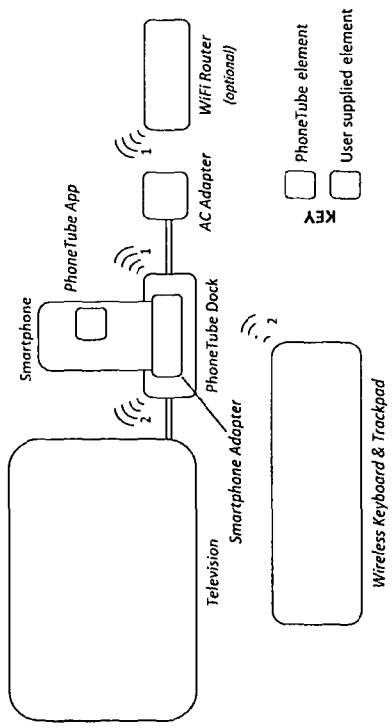

These example embodiments include many novel mechanical, electromechanical and software elements, and which may be wired or wireless, for example:

"PhoneTube"—A Companion Electronic Device dock for the Computing Device that connects to a larger display such as a monitor or television and may also connect to (or include) input/output peripherals (either directly or through the computing device) such as a keyboard, trackpad, mouse, camera, memory key, speakers, printer, remote control, game controller(s), a cooling system to cool the computing device and or the PhoneTube itself to enable more performance to be obtained from the computing device, etc. The device may also have wired or wireless communication capability. Example use scenarios are analogous to a desktop computer, a home media center/set-top box and a home game console The computing device may physically connect to PhoneTube thru an adapter means such as a "L" or "U" adapter (providing side and end on interconnection) or other means providing a consistent physical and electronic interconnection to the PhoneTube independent of the computing device, thereby avoiding the need for PhoneTube docks to be designed to physically "fit with" or interconnect with each and every computing device; see FIG. 26. The FIGS. 35, 39, 68, 70, 72 and 75-79 show various embodiments of a PhoneTube configuration.

Figure 27:
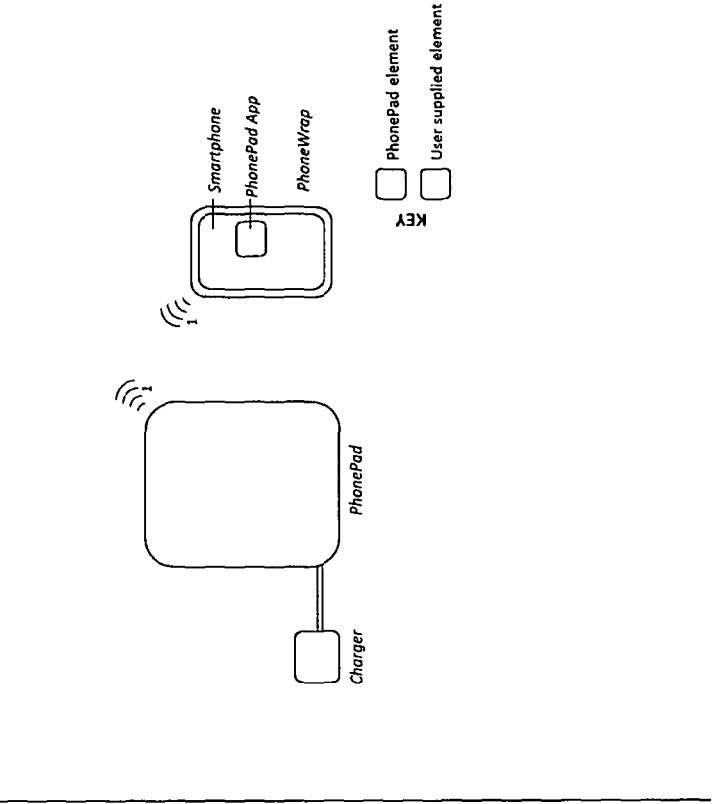
Figure 27:
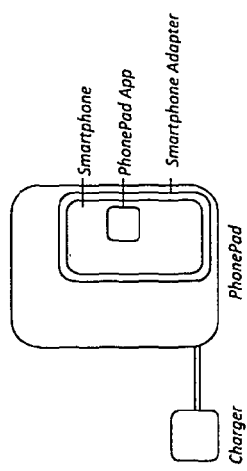

"PhonePad"—A tablet style Companion Electronic Device to which a computing device connects that may have any number of built-in or peripheral functionalities and inputs/outputs (either directly or through the computing device) such as a keyboard, touchscreen, trackpad, mouse, camera, memory key, speakers, printer, remote control, game controller(s), etc. The device may also contain sensors such as accelerometers, e-compasses, proximity sensors, light sensors, a cooling system to cool the computing device and or the PhonePad to enable more performance to be obtained from the computing device, etc. The device may also have wired or wireless communication capability. Example use scenarios are analogous to a tablet or convertible computer. The computing device may physically connect to PhonePad thru an adapter means such as a horse shoe or cassette style adapter or other means providing a consistent physical and electronic interconnection to the PhonePad independent of the computing device, thereby avoiding the need for PhonePads to be designed to physically "fit with" or interconnect with each and every computing device. See FIG. 27. The FIGS. 16, 32, 41, 45-49, 64, 65, 67, 71 and 74 show various embodiments of a PhonePad configuration.

Figure 28:
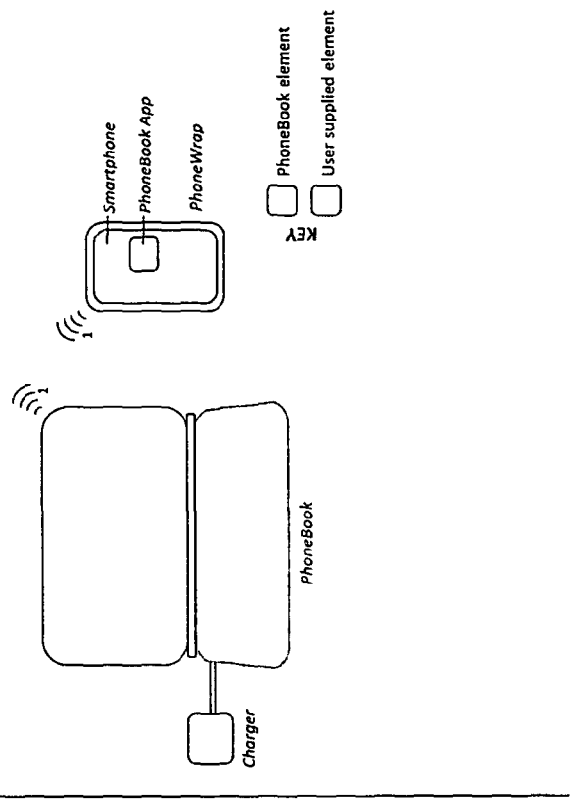
Figure 28:
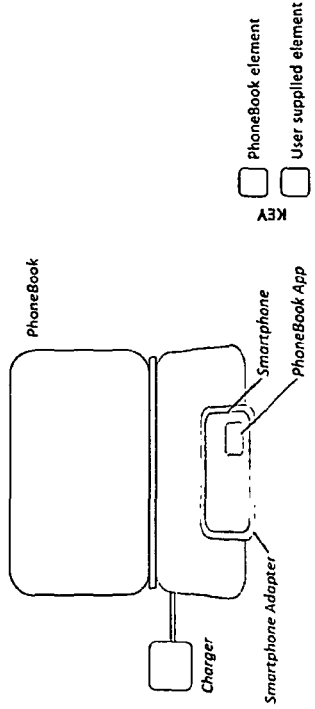

"PhoneBook"—A notebook-style companion electronic device to which a computing device connects that may have any number of built-in or peripheral functionalities and inputs/outputs (either directly or through the computing device) such as a keyboard, display, touchscreen, trackpad, mouse, camera, memory key, speakers, printer, remote control, game controller(s), etc. The device may also contain sensors such as accelerometers, e-compasses, proximity sensors, light sensors, etc, a cooling system to cool the computing device and or the PhoneBook to enable more performance to be obtained from the computing device, etc The device may also have wired or wireless communication capability. Example use scenarios are analogous to netbook or notebook computer. The computing device may physically connect to PhoneBook thru an adapter means such as a horse shoe or cassette style adapter or other means providing a consistent physical and electronic interconnection to the PhoneBook independent of the computing device, thereby avoiding the need for PhoneBook to be designed to physically "fit with" or interconnect with each and every computing device. See FIG. 28. The FIGS. 8-11, 14, 15, 30, 31, 33, 34, 42-44, 50-56, 60, and 69 show various embodiments of a PhonePad configuration.

"PhoneWrap"—A sleeve, "shoe" or dongle that attaches to a phone or other computing device in order to supplement its capability and to better enable PPC functionality. Example functionalities of PhoneWrap could include the inclusion of additional batteries/charging, video/audio conversion and/or compression, video/audio transmission, data transmission, wired or wireless communication, additional memory, and/or auxiliary processing capability, the ability to cool the computing device to enable more performance to be obtained from it, the addition of further connectors in addition to or in replacement of the computing devices. PhoneWrap can act as a physical and electronic adapter for the physical and or wireless/network connection between the computing device and the companion electronic device. Allowing common PhoneTube, PhonePad, PhoneBook and other embodiments of the PPC enabler to be created. With the adaptation for different models of computing devices being dealt with different versions of PhoneWrap. This has the benefit that if a user changes their computing device they only have to change the PhoneWrap and not all the other devices such as PhonePad. Similarly it allows as single computing device to be used with multiple companion electronic devices. In one embodiment PhoneWrap might be integrated with a cover on the computing device allowing for a more integrated and smaller combination of the computing device and the phone wrap. See FIGS. 35-37.

Examples of alternative embodiments are also shown in FIGS. 57-59, 61-63 and 66.

Figure 30:
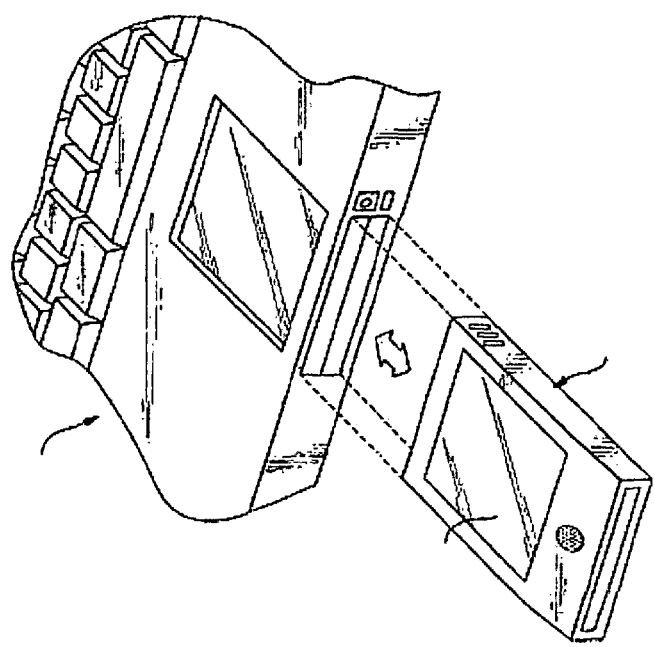
Figure 31:
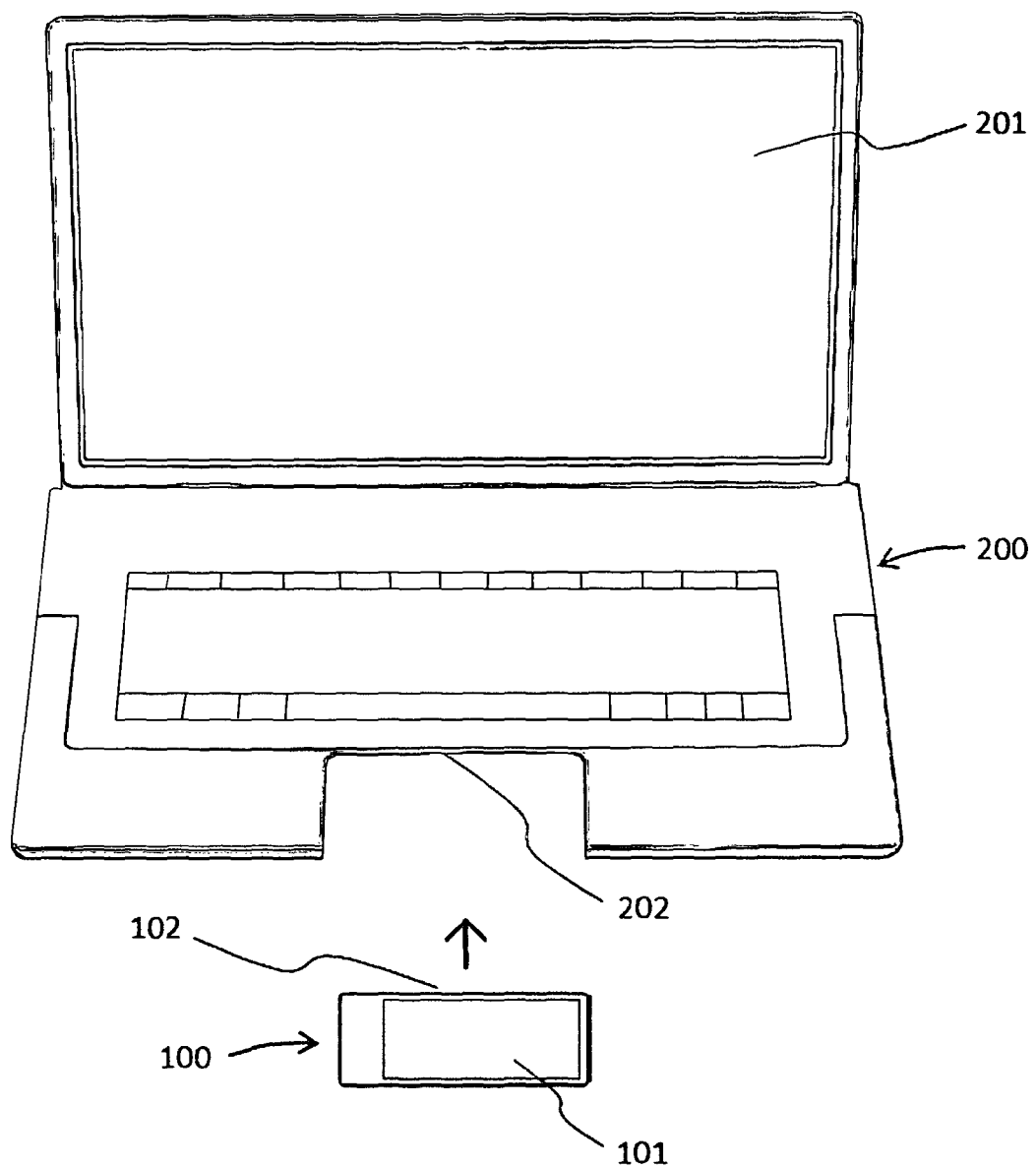

1] A embodiment of PhoneBook is detailed with reference to FIG. 30—PhoneBook comprises a computing device 100 and a notebook style companion electronic device 200 that are connectable to each other and form an enhanced computing companion electronic device. This combination of functionality is a phone powered computer, with modular capability, and the ability to transfer itself into different type of compatible products to suit the user's scenario.

2] PhoneBook has two key parts, a computing device 100 and a notebook like companion electronic device 200 with the ability to host the computing device 100 and additionally to plug-in and add other units, companion electronic devices, tokens and similar. The companion electronic device 200 may accommodate the computing device 100 via a horseshoe adapter between the docking area 202 and corresponding section 102 of the computing device 100. The docking area 202 may be located next to the keyboard 203 where a regular notebook computing device known in the art would feature a trackpad. In this arrangement, the touch screen display 101 of the attached computing device might also function as a trackpad. Other means might be used attach computing device 100 to companion electronic device 200. The multi-modal opportunities of the computing device 100 and companion electronic device 200 enable a series of different architectures and functionality. The computing device 100 could work as a remote pointing device. The computing device 100 can be a projector or can connect to a TV display. The companion electronic device 200 can be used as a host for multiple computing devices, at the same or different times which might be particularly useful for families and small businesses and schools. For small businesses and schools only a few companion electronic devices 200 will be needed, so employees and students just plug in at work/school, and take home their work to plug in at their home companion electronic device 200.

Figure 32:
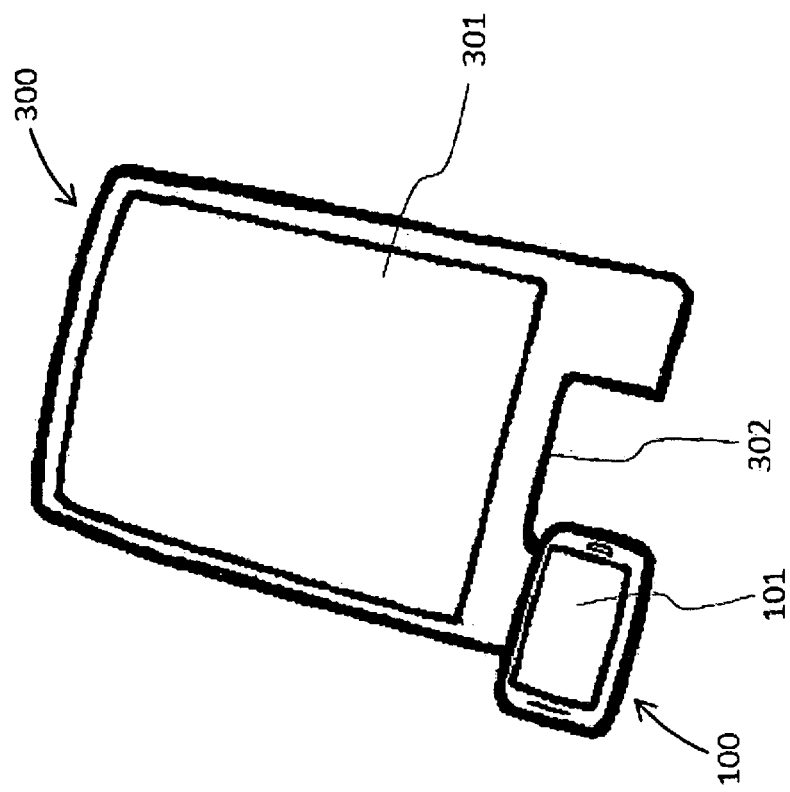

3] A potential embodiment of a PhonePad system is illustrated on FIG. 32 and comprises an alternative companion electronic device 300 similar to a tablet computer, accommodating a computing device 100 alongside its main display 301. Alternatively, computing device 100 can be inserted into or attached to the back side or any suitable portion of the companion electronic device 300 examples of which are shown in FIGS. 41 and 45-49. Once connected, the companion electronic devices 100 and 300 may or may not work together to form a computing system. The companion electronic device 300 has its own processor and operating system, thus various communications, entertainment, and computing functions are implemented and controlled by the computing device 100 and the companion electronic device 300. The screen 301 of the companion electronic device 300 might be a touchscreen, thus alleviating the need for a hardware keyboard. The companion electronic device 300 might have an on-screen keyboard on display 301 or might have voice recognition means, or hand-writing recognition means to allow user input beyond the input capabilities of the computing device 100. The companion electronic device 300 may optionally comprise an extra battery, loudspeakers, graphics processor, Wi-Fi receiver, a backup memory, and various connectors (not shown). These optional components may complement the functionality of the connected computing device 100.

Figure 33:
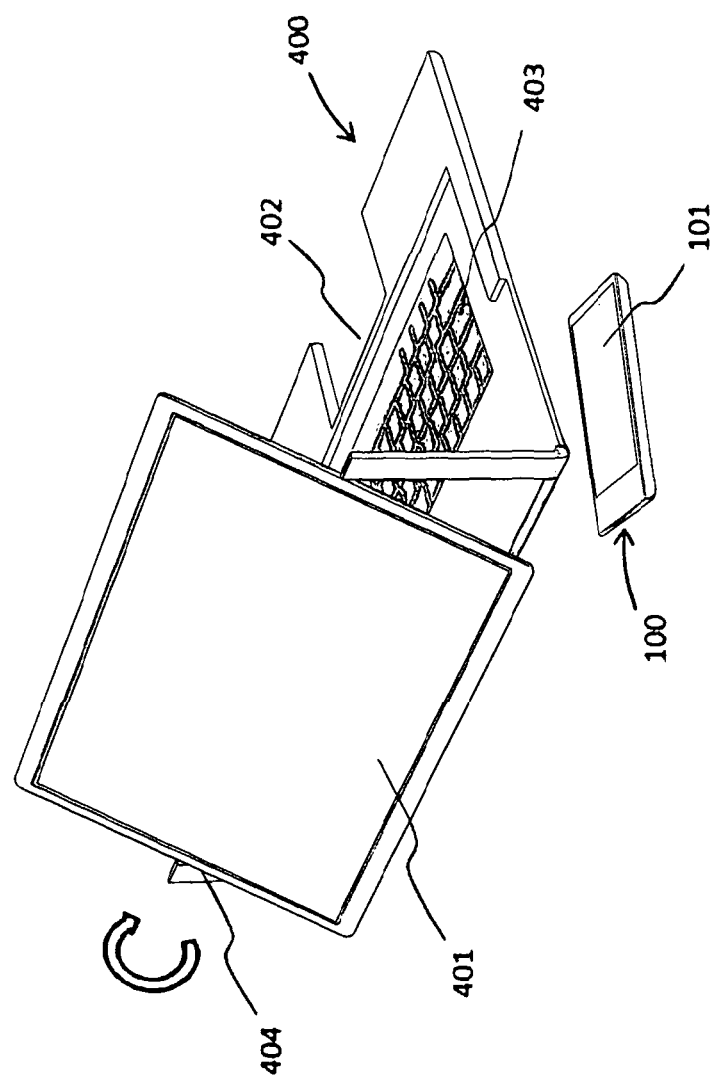
Figure 34:
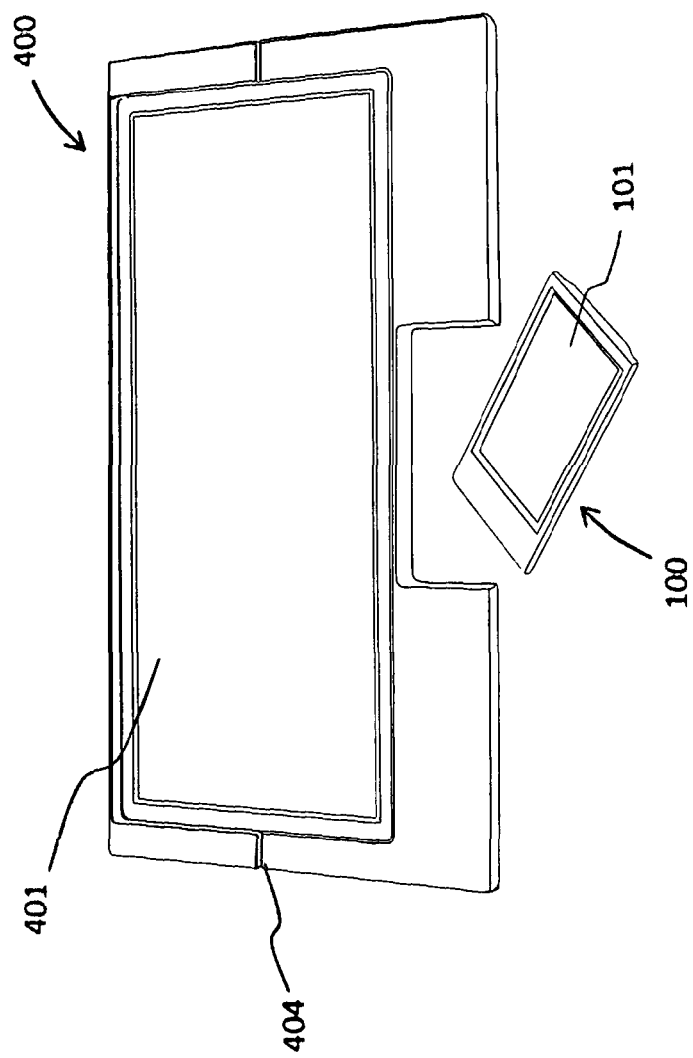

4] An alternative embodiment might comprise a companion electronic device 400 supporting both notebook type and tablet type configurations—effectively a combination of PhoneBook and PhonePad and is illustrated on FIGS. 33 and 34. The docking area 402 might be identical to the docking area 202 of the first embodiment, allowing a computing device 100 to be inserted either directly or via a horseshoe accessory. The difference is that the display 401 is connected to the chassis of companion electronic device 400 using a special hinge mechanism 404 allowing the display to be rotated. When the lid of the notebook style companion electronic device 400 is closed, display 401 covers the keyboard 403 like the lid of a regular notebook companion electronic device, however, when the lid is closed in a reversed position of the display 401, companion electronic device 400 can be used in a similar manner as the tablet companion electronic device 300 of the second embodiment. As a variation of this companion electronic device 400, or the companion electronic devices 200 and 300 according to previous embodiments, the display 401 may have its own battery pack (not shown) and may be wirelessly communicating with other parts of the companion electronic device 400 (or 200 and 300) or directly with computing device 100. The benefit of a wirelessly communicating display 401 is that it can be freely rotated to any direction and can be placed anywhere (within reception range) independently from the computing device 100 or the chassis of companion electronic device 400.

Figure 35:
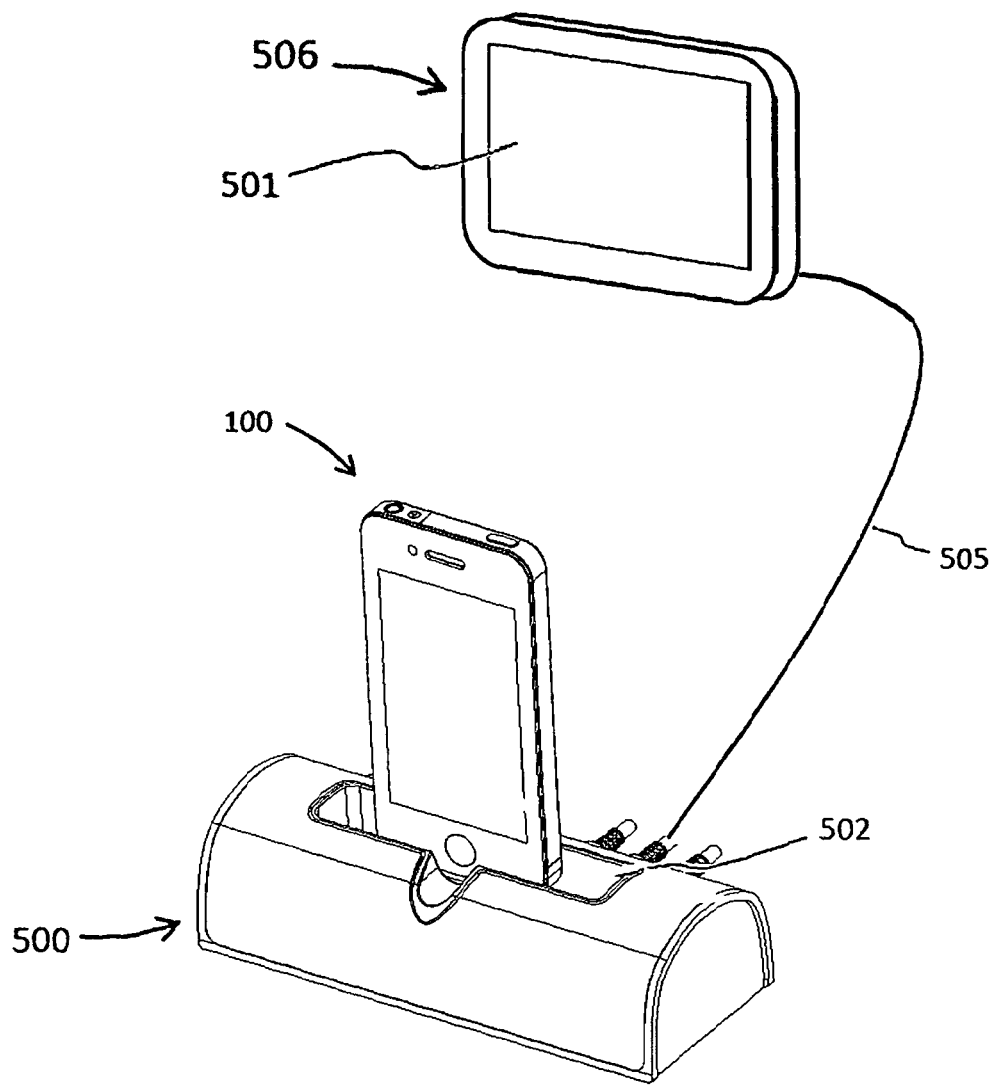

5] A potential embodiment of PhoneTube is illustrated on FIG. 35 and comprises a docking stand 500 connectable to a TV set 506 and a keyboard 503. The docking stand 500 is arranged to receive a computing device 100, either directly or via suitable adapter means, such as a bracket positioned between the computing device 100 and the docking area 502 of the docking stand 500. The adapter means might comprise a cassette or a cover at least partially surrounding the computing device 100, or any suitable wired or wireless connection. The keyboard 503 might be a wireless keyboard and might incorporate a trackpad for convenient user interaction with the computing device 100 and companion electronic device. When connected to a TV 506 or an external display companion electronic device via wire 505 or other means, the docking stand 500 is arranged to transmit multimedia signals from the computing device 100 to the TV 506 and/or to/from any further companion electronic devices capable of displaying, playing back, or processing audio and/or video signals. The audio and video signals can be either analogue or digital signals (or a data representations thereof), such as HDMI, composite, stereo sound, surround sound signals (or a data representations thereof), and might include additional data channels for carrying control signals and other data between the computing device 100 and any external companion electronic devices. The docking stand 500 is arranged to provide connection to other peripherals such as a computer mouse, a computer display, a network adapter, antenna, local or remote data storage means. The docking stand 500 might also provide the capability to act as a USB hub for connecting digital cameras and other devices 6] The docking stand 500 is connected to a power source (not shown) and is configured to charge the inserted computing device 100. The docking stand 500 with the connected computing device 100 and the TV 506, or companion electronic device with the optional keyboard and mouse, together form a phone powered computing system, providing enhanced and complemented functionality to the computing device 100.

7] PhoneTube is a computing and entertainment solution that delivers PPC benefits to the users, enabling the computing device to become a large-screen computing, browsing, email and productivity solution unburdened by the limitations of a small screen. PhoneTube provides a simple, cost-effective way to connect computing devices to a TV or other large-format display to convert non-internet enabled TV's and monitors to become internet-enabled, and/or to connect computing devices to a second display to enable enhanced operation and functionality.

8] PhoneTube is a software and hardware solution that provides a way of utilising inherent computing device, and companion electronic device processing power, user environment elements, resident user-data and web-access for increased convenience with minimal complexity. Because computing device elements are scaled and optimized on the companion electronic device.

9] PhoneTube enables users to use functions of their computing device and or companion electronic devices through the TV interface. The functions may include but are not limited to:
Email and web browsing
Photo and movie viewing
Enhanced usability of resident general purpose productivity software
Access to phone-based compute solutions and operator services
Downloadable applications
Video conferencing
Music management and playback
Gaming 1] PhoneTube hardware may come in the form of a push-in/slide-in desktop dock as described above that users simply place their computing device into to enable connectivity between the computing device and the companion electronic device. The hardware could comprise, for example, the following items:
Base cradle
Connector and signal board that routes out signals from the phone, through the dedicated mechanics and/or horseshoe adapter to provide appropriate HDMI/USB signals.
Horseshoe adapter, where appropriate, that mates up with phone-based I/O and combines them into one single wiring harness that connects to PhoneTube's standard connector
USB connectors and other interface connectors.

3.5 mm audio connector

RCA phono connector

HDMI connector

Full sized QWERTY keyboard with integrated multi-touch trackpad

Power supply

Optional TV clip-on attachment

1] The base cradle has system connectors to connect with computing devices, either directly, or via a horseshoe adapter. The base cradle functions as a hub for connecting the computing device to an external display, such as a TV screen or other displays, and also to connect a wireless keyboard to the computing device so that the user can interact with the computing device and or companion electronic device The wireless keyboard might also comprise an integrated trackpad for more convenient interaction.

2] The horseshoe adapter securely connects to the specific input/output connectors of the computing device, and on the other side, the adapter connects to the specific system connectors of the PhoneTube cradle. The computing device specific horseshoe adapters make it possible to use various computing device models with the same cradle. Apart from providing connectivity for different types of computing devices, the horseshoe adapter also functions as a support means to hold the computing device firmly in the cradle. The multimedia output of the computing device is thus linked to the companion electronic device and or the external display, while the power supply of the PhoneTube charges the connected computing device 100.

3] Optionally, a TV clip-on attachment might be provided to place the PhoneTube cradle (with the attached computing device) in a desired position, for example, on the top or at the side of the TV frame. Such arrangement might be practical in case the user wants to use the video conferencing function. The clip-on attachment, or the horseshoe adapter, or the cradle itself might be tiltable to provide optimum viewing angle for the computing devices camera so that it's always facing the user. The camera might be on the back of the computing device since the user doesn't have to see the computing devices display screen, as applications are now displayed on the TV screen. Therefore, computing devices with only a back-facing camera are now capable to provide video conferencing functions. The other advantage is that the camera on the back of the computing device usually has a better resolution than the camera on the front. Therefore, high quality video conferencing might be implemented using the PhoneTube and the attached computing device.

4] PhoneTube enables a UE to be driven through the TV or a companion electronic device.

Figure 36:
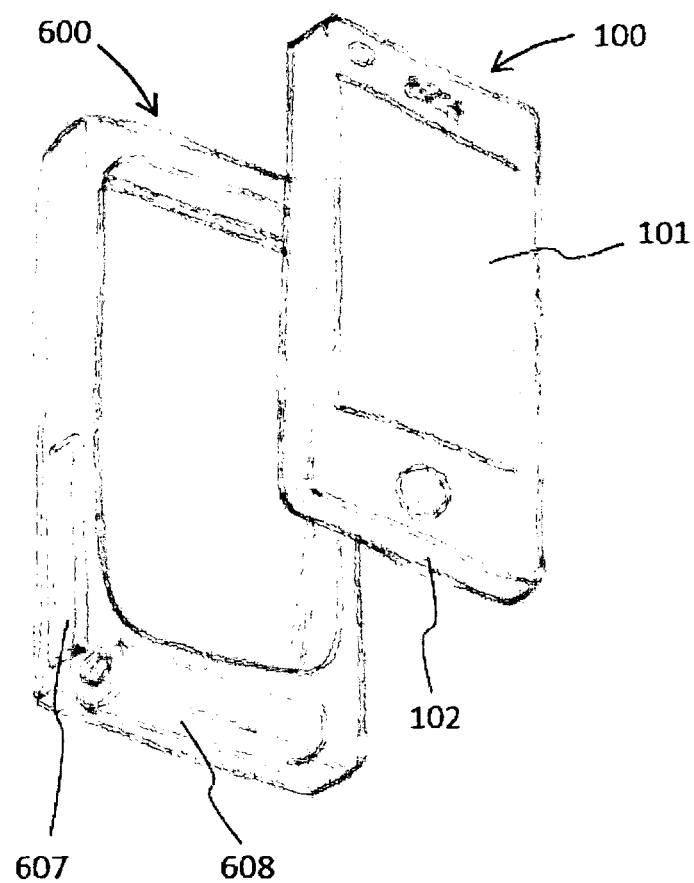
Figure 37:
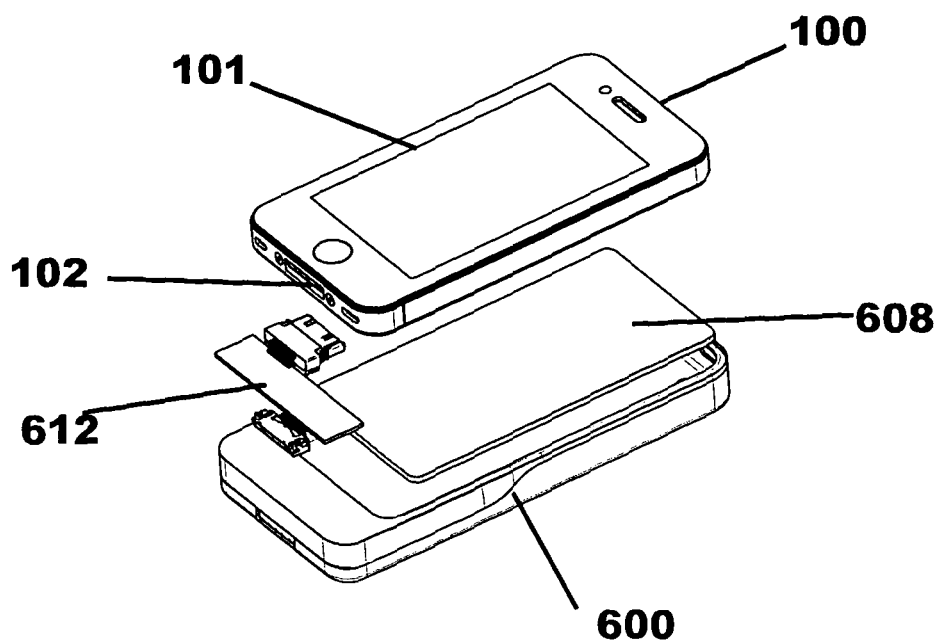
Figure 39:
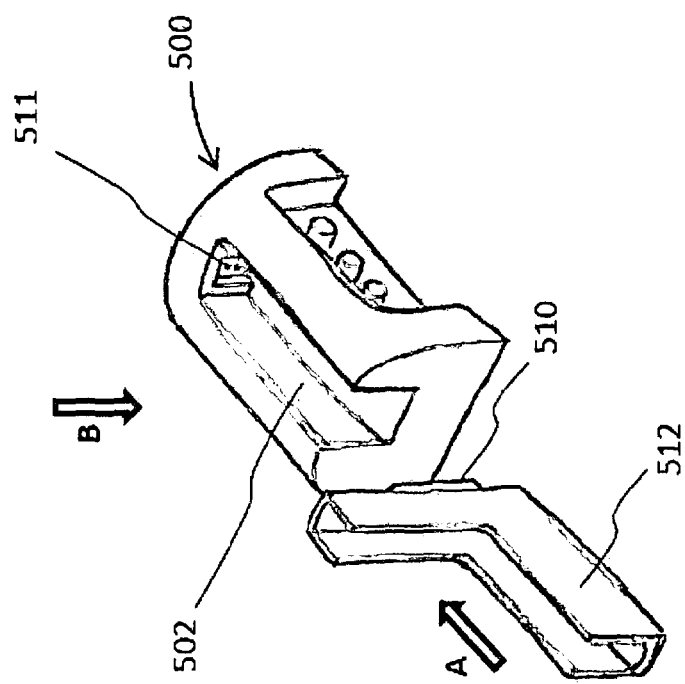

5] In a potential embodiment of PhoneWrap, the horseshoe adapter is replaced with a cover 600 for the computing device 100, the cover 600 substituting or alleviating some of the parts found in the previous embodiments. As shown on FIGS. 36 and 37, the cover 600 might serve as an adapter between the companion electronic device connectors 102 and the cradle's system connector 502, or alternatively, the cover 600 might comprise a wireless transceiver 607 to connect wirelessly to the PhoneTube cradle 500, which is also fitted with an appropriate wireless transceiver. When connecting wirelessly, there is no need for a regular cradle, into which the computing device 100 would be inserted, thus the modified cradle can be implemented in a simplified form. The PhoneWrap cover 600 might also contain extra battery 608 to provide longer operation time for the companion electronic device 100 and might also contain a cooling system (not shown) to keep the computing device 100 cool enabling additional computing resources to be activated in the computing device 100 and the wireless transceiver 607. Charging of the computing device 100 might be done using the computing devices regular charger but alternatively, any companion electronic device capable of receiving computing device 100 with PhoneWrap cover 600 might be used to charge the computing device 100 and the extra battery 608. However, the PhoneWrap cover's extra battery or the computing devices own battery might be used to power an external accessory such as any of the companion electronic devices 200, 300, 400, 500, in embodiments 1 to 6 respectively, thus alleviating the need for a battery in the companion electronic devices 200, 300, 400, 500 or connecting the companion electronic devices 200, 300, 400, 500 to a power outlet. In a specific arrangement depicted on FIG. 37, the PhoneWrap cover 600 might replace the back cover of computing device 100, thus making it possible to remove the internal battery of computing device 100 and use extra battery 608 instead. In this arrangement there is no need for two separate batteries, thus the Phone Wrap cover 600 becomes a more integral part of computing device 100. FIG. 36 also shows adapter means 612 to connect the computing devices ports 102 to the system connectors of any PPC companion electronic device. An example of the system connector 511 is shown in FIG. 39.

6] The PhoneWrap's wireless transceiver 607 and its base cradle counterpart (not shown) functions primarily to connect the computing device 100 wirelessly to the TV 506, or companion electronic device Therefore, the base cradle 500 might be substituted with a dongle connecting to the multimedia inputs of the TV 506 or Companion Electronic Device An example wireless protocol to implement this embodiment is WiFi. However, other wireless transmission technologies might be used instead. The phone cover 600 with wireless transceiver 607 can be permanently left attached to the computing device 100, thus the user doesn't have to attach the computing device to a cradle to begin using the PPC system. The cover 600 will also provide added protection to mechanical impacts or other environmental threats.

7] The computing device 100 might remain in the user's bag or pocket as long as the PhoneWrap cover 600 is on the computing device and the computing device is within range of the PhoneTube cradle 500 or dongle. An accessory wireless keyboard might be used to trigger the connection between the computing device 100 and the companion electronic device 506. Alternatively, the connection might be initiated automatically, by the companion electronic device once the computing device 100 is within range of the companion electronic device 506 or upon user interaction with the computing device 100 or the companion electronic device 506.

Adapter Means

Figure 38:
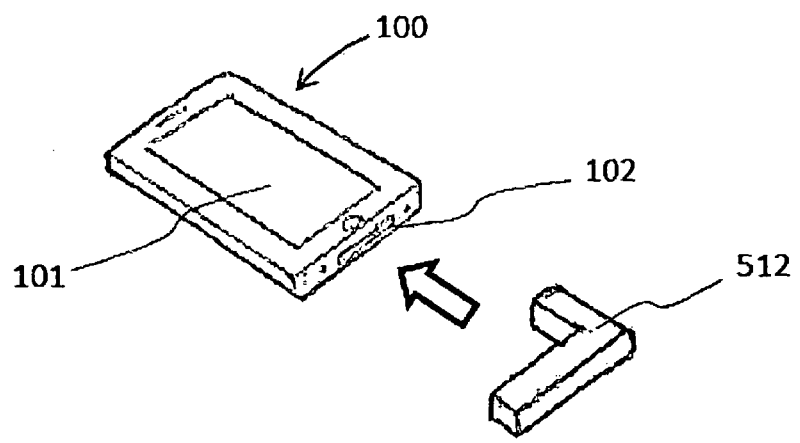

8] Potential adapter means for use with various embodiments of the PPC systems will be described with reference to FIGS. 38, 39 and 40, using the docking companion electronic device 500 as an example. The same or similar adapter means might be used in conjunction with any of the companion electronic devices 200, 300, and 400 of other embodiments.

9] Since computing device 100 might have its own specific connectors 102 and interfaces, adapter means might need to be used to provide a suitable mechanical and electrical connection to the system connector 511 located in the docking area 502 of docking stand 500, or corresponding docking areas 202, 302, 402 of other embodiments. Different kinds of computing devices have different connector layouts, and in some cases, connectors might be located on more than one side of computing devices 100. An L-shaped bracket 512 might be used to connect along its internal edges to the appropriate computing device connectors 102 along the outer edges of the computing device 100. The L-shaped bracket 512 is connected to computing device 100 as shown by the arrow on FIG. 38.

10] As indicated on FIG. 39, L-shaped bracket 512 slides into docking stand 500 in the direction of arrow A or arrow B and connects to the docking station's system connector 511 along its outer edges, either on the sides or along the bottom, or any suitable area. computing device 100 might be attached either before or after connecting bracket 512 to docking stand 500. The L-shaped bracket might have computing device specific connectors along one edge, or both edges. Bracket 512 might have different types of connectors along its edges, making it possible to adapt different kinds of computing devices to docking stand 500. Multiple connectors on bracket 512 might also allow insertion of computing device 100 in various orientations, such as landscape and portrait orientations.

11] However, bracket 512 might be implemented in different shapes, such as a bar-shape, U-shape, or in the form of a rectangular bracket, enclosing computing device 100 along 1, 3, or 4 sides respectively. It is not beyond the scope of the invention to provide a bracket that is similar to cover 600 of embodiment 4, fully enclosing the computing device 100 from at least 5 sides. It is seen that an L-shape provides optimal connection to many computing device types with different connector layouts while also providing adequate support to hold computing device 100 in docking area 502.

Figure 40:
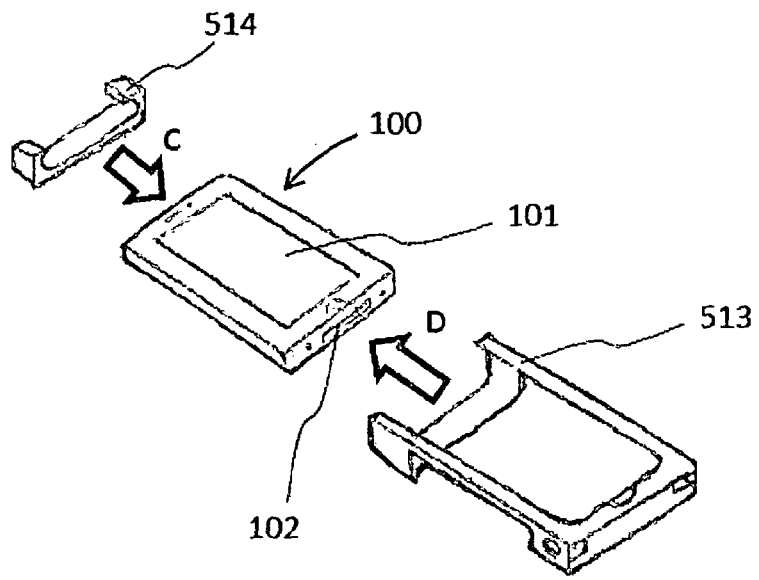
Figure 41:
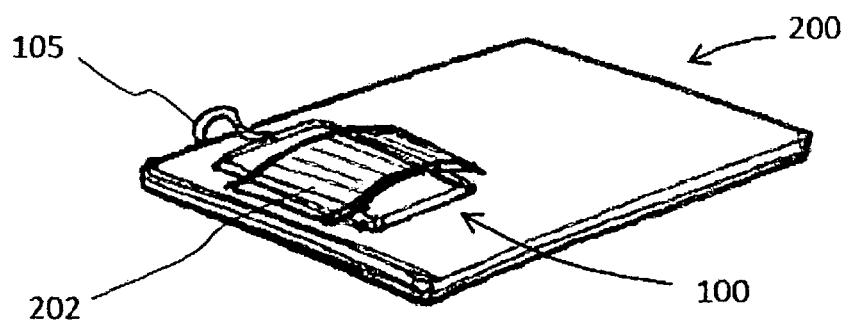
Figure 42:
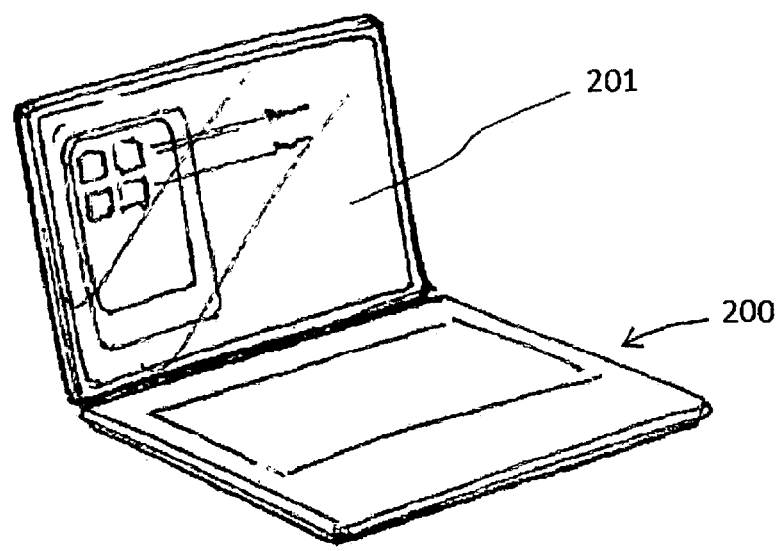
Figure 43:
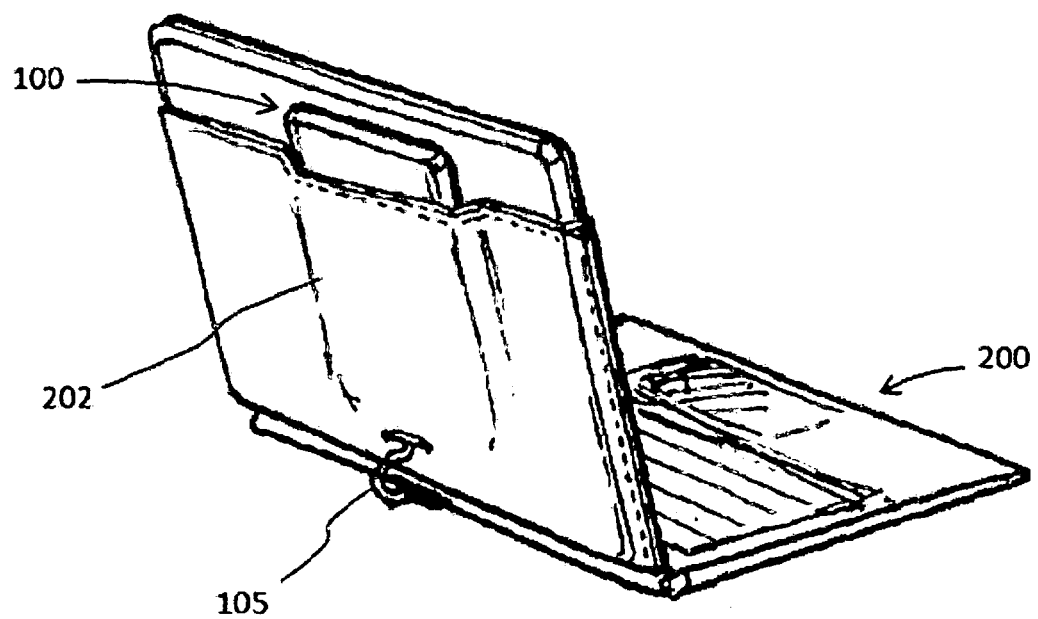
Figure 44:
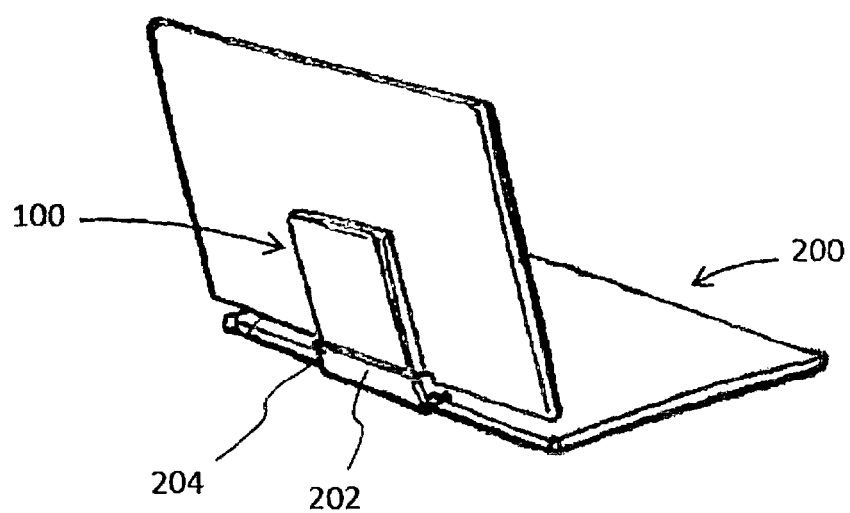
Figure 45:
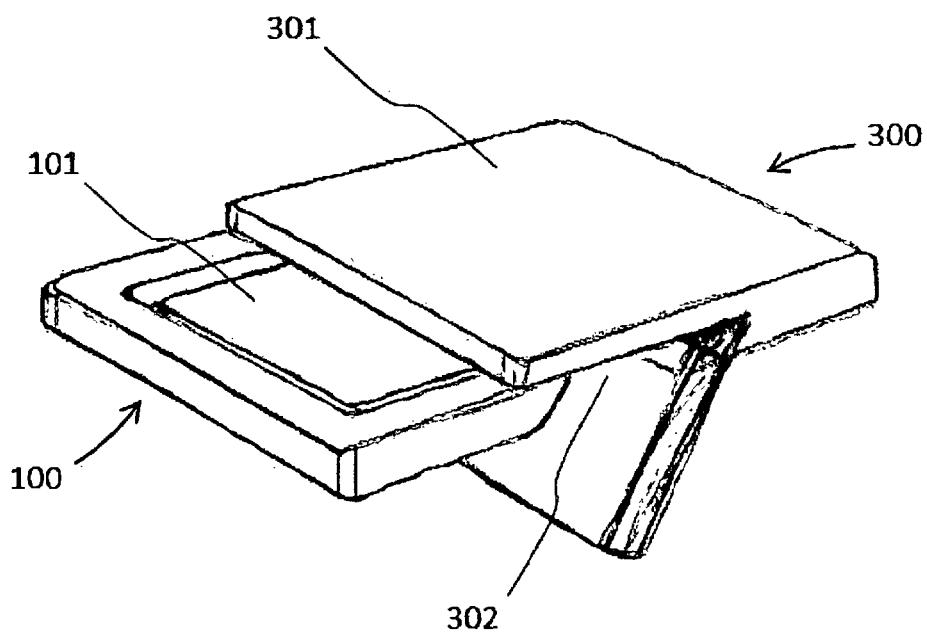
Figure 46:
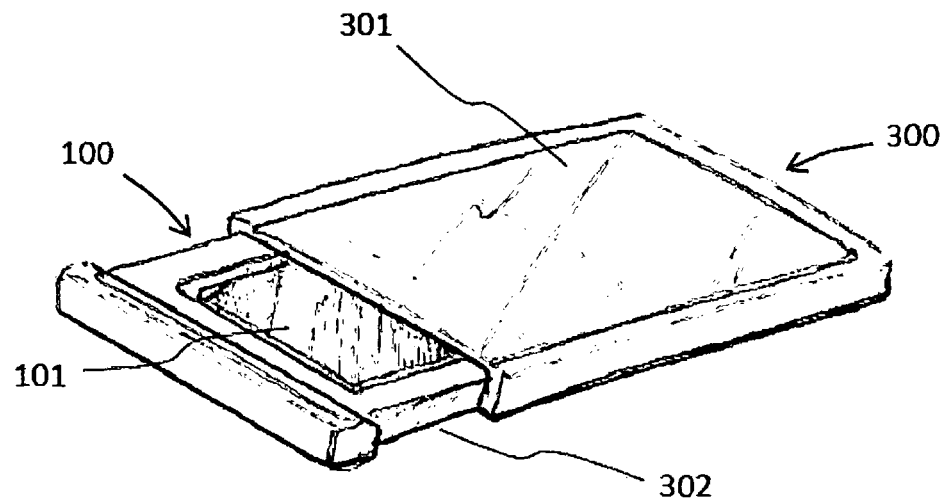

12] In one embodiment, depicted on FIG. 40, bracket 512 is replaced with a cassette 513. computing device 100 slides into cassette 513 in the direction indicated by arrow C. Optionally, cassette 513 might have a counter-part 514 that can be connected to cassette 513 or to computing device 100 as indicated by arrow D. Cassette 513 and counter-part 514 might be implemented as a single element, and might also be implemented as part of the chassis of either of companion electronic devices 200, 300, 400. Bracket 512 might be used as counter-part 514. The cassette 513 might be implemented with fixed outer dimensions that make it possible to attach any inserted computing device to any of docking areas 202, 302, 402, 502, while also providing a rigid construction when used in conjunction with companion electronic devices 200, 300, 400, or 500.

Further Embodiments of the PPC System

13] FIGS. 41-55 illustrate further alternatives for connecting a computing device 100 with companion electronic device 200 or 300 to arrive at a PPC system according to the invention. The computing device might be simply connected to companion electronic device 200 by wire 105 as shown on FIGS. 41 and 42. In this case, docking area 202 might be formed by a strip of leather or textile, or it might be in the form of a pouch as on FIG. 43. The computing device 100 might be attached to the back of display 201. However, when using wire 105, docking area 202 is optional or it might comprise an USB port or similar, and the computing device 100 might be placed simply on the desk next to companion electronic device 200. The docking area 202 might also be part of the hinge 204 that connects the two main parts of companion electronic device 200, as depicted on FIG. 44.

Figure 47:
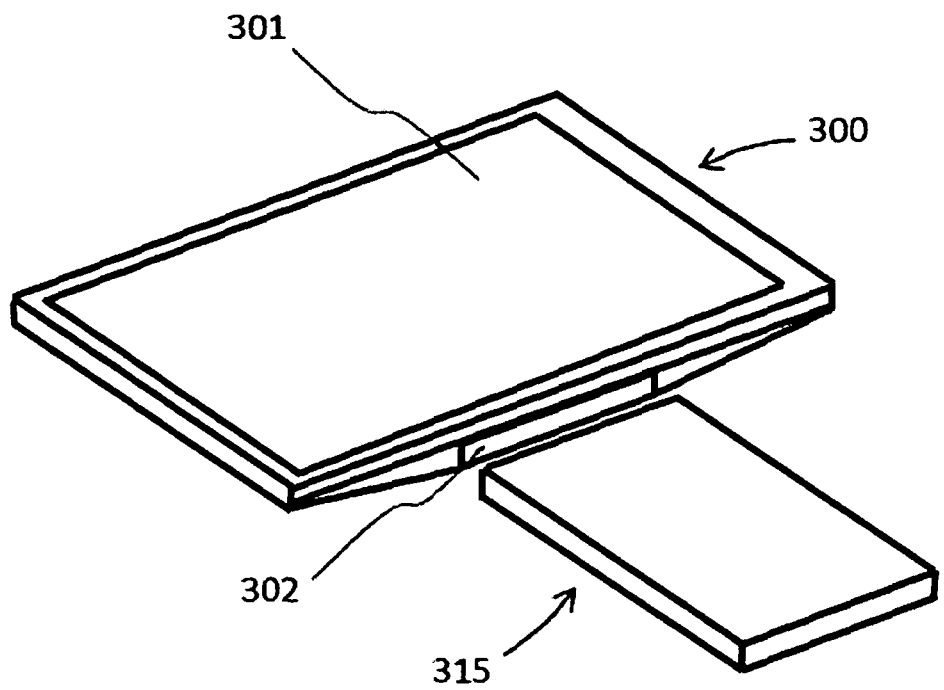

14] The computing device might be inserted and fully enclosed into the companion electronic device as shown on FIGS. 45 to 49. The Computing device might be placed behind a flap panel covering the docking area 302 (FIG. 45), or might be connected via a slide-in element shown on FIGS. 46, 47 and 48. FIG. 47 also depicts a cartridge 315 that might accommodate the computing device and, if necessary, any adapter means or alternatively, the cartridge 315 might contain a wireless module for communication with a mobile phone in the vicinity of device 300. Display 301, front and rear chassis and bezel of device 300 can be re-used for both docked and wireless configuration. The rear of device 300 has a configurable central element that will fit cartridge 315 containing either the computing device or the wireless module.

Figure 48:
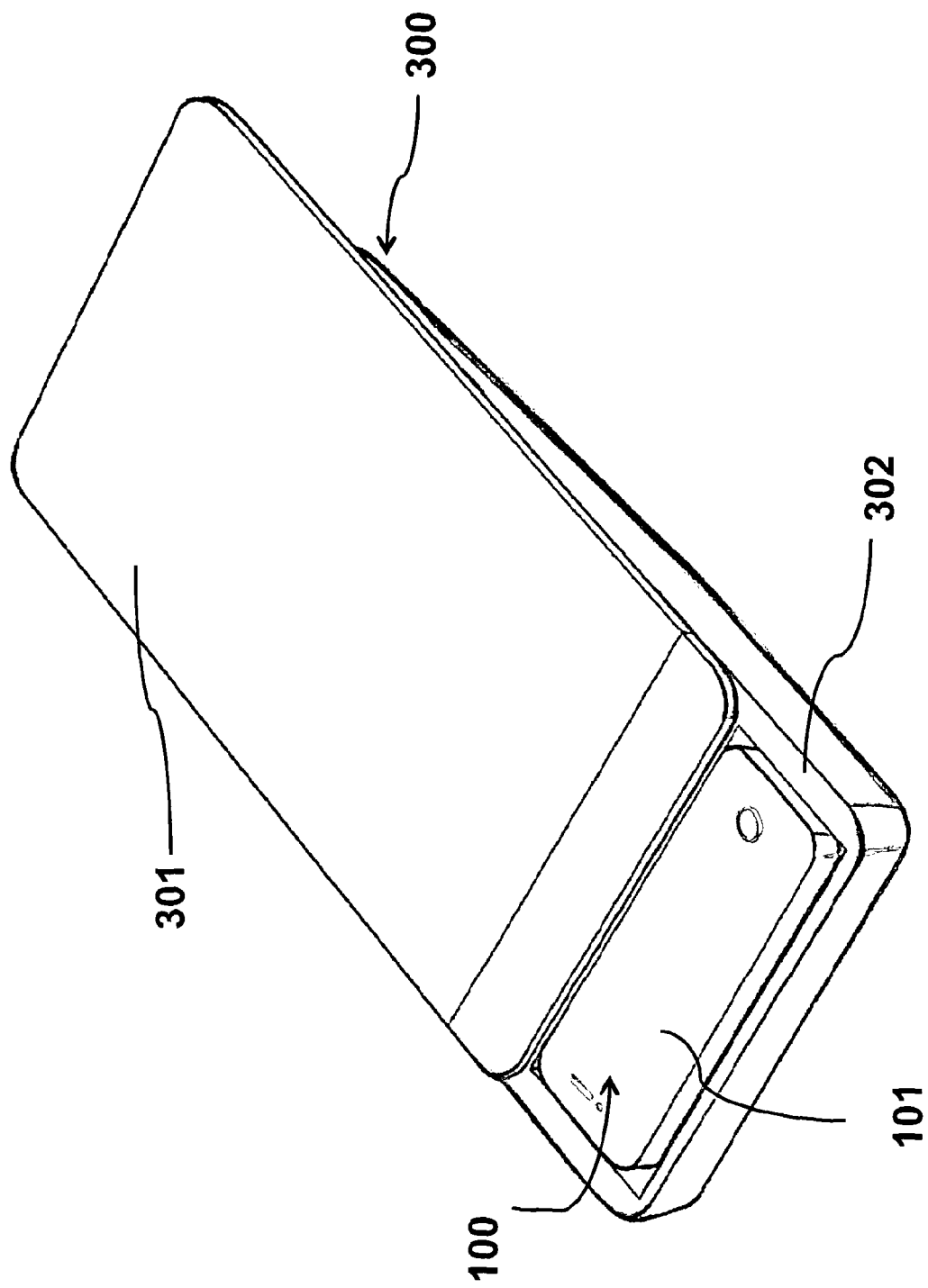
Figure 49:
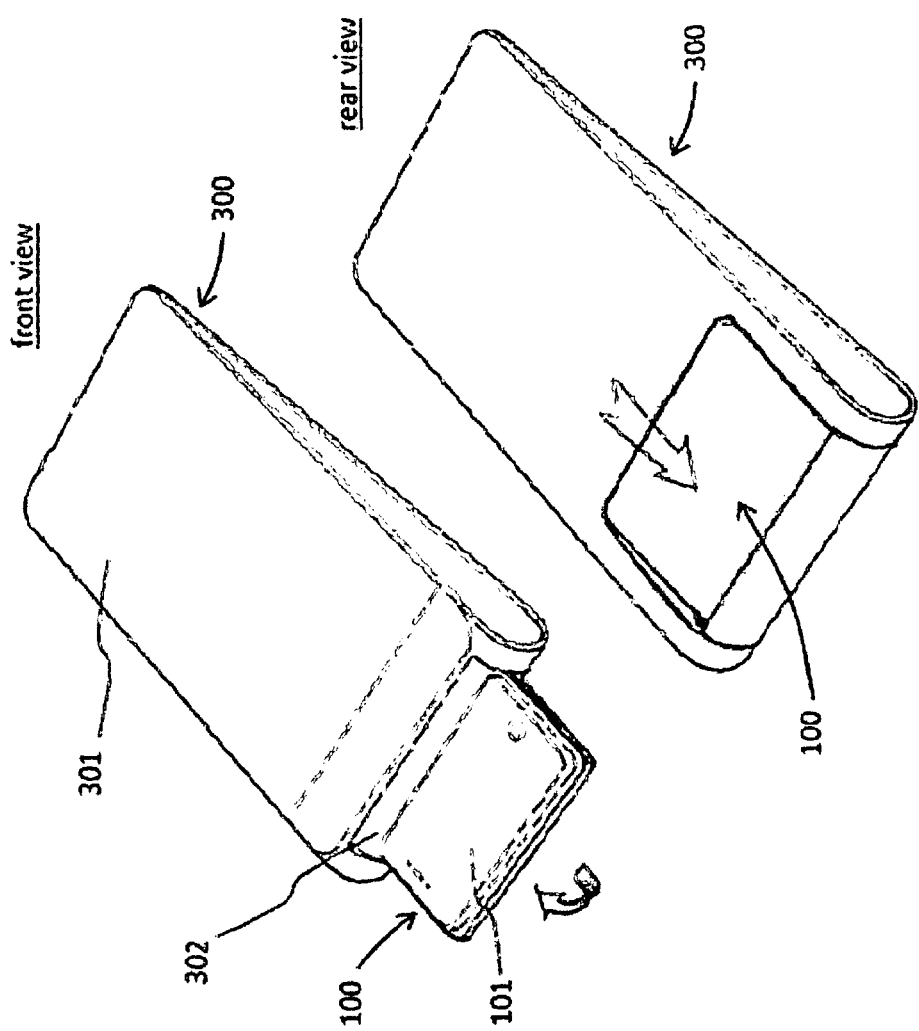

15] In an alternative arrangement shown on FIGS. 48 and 49, the docking area 302 might be located at the edge of the chassis of device 300, and might provide means to attach the computing device to the companion electronic device 300 via a rotatable connector that allows using the computing device 100 either alongside the display 301 (FIG. 49—front view) or flipped into the back side of the chassis of the companion electronic device 300 (FIG. 49—rear view).

Figure 50:
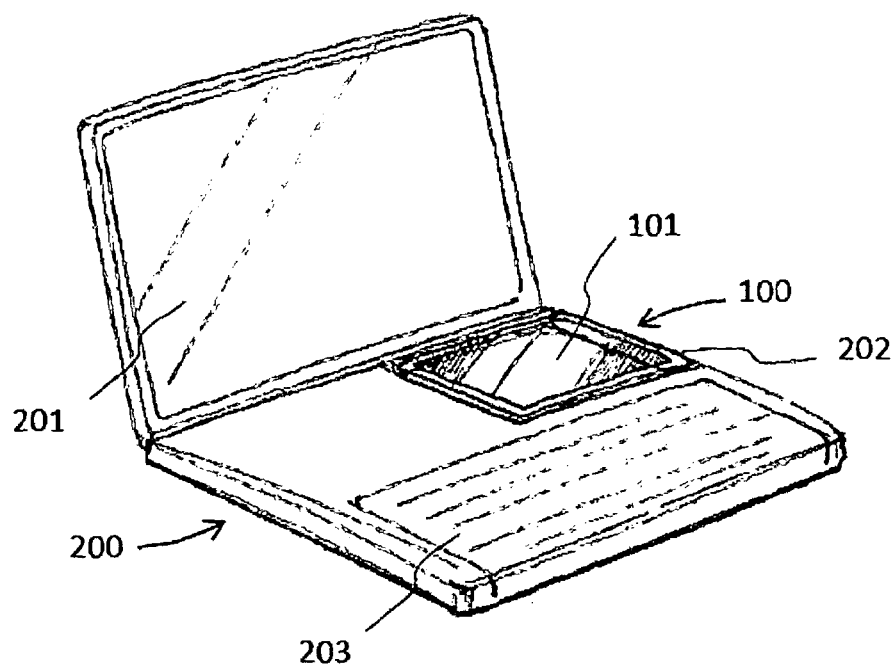
Figure 51:
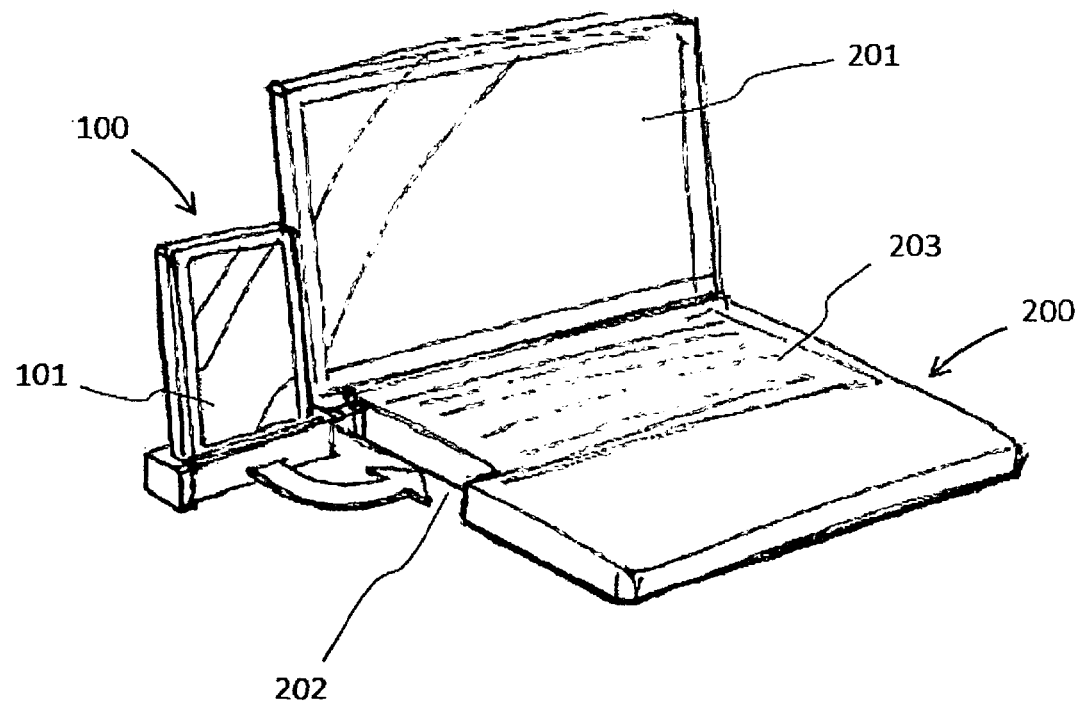
Figure 52:
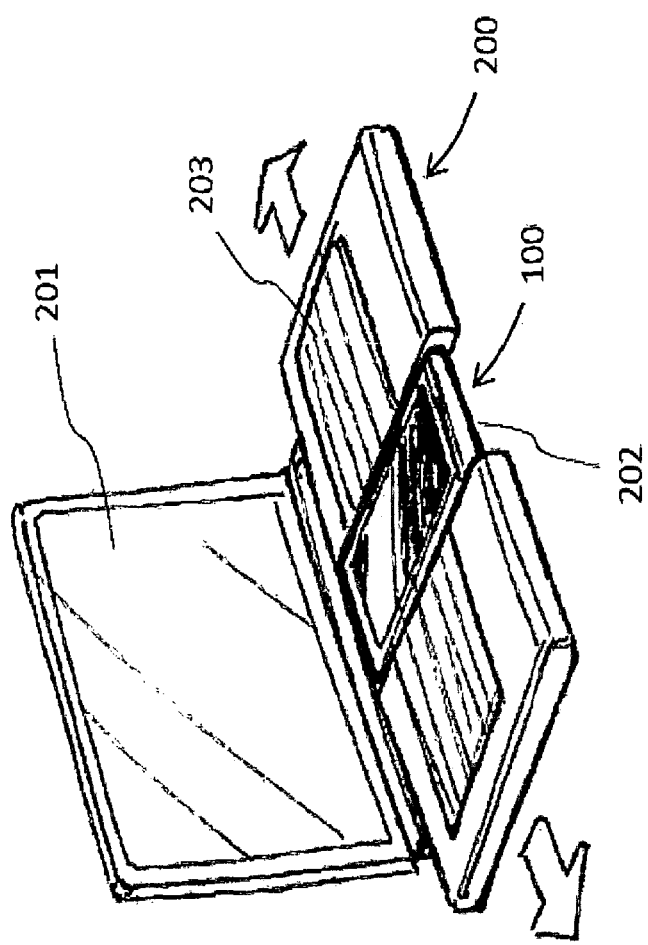
Figure 53:
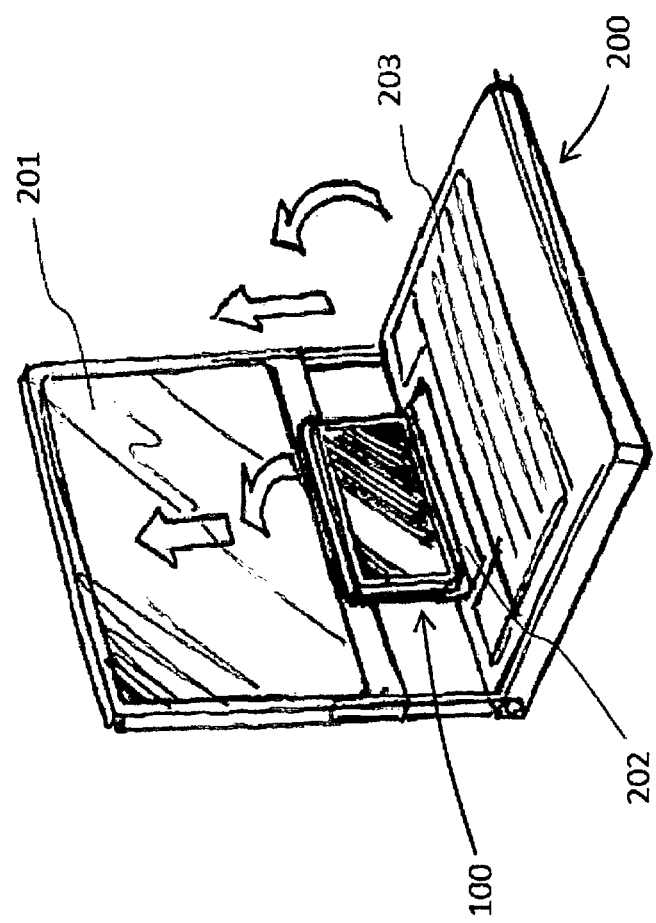
Figure 54:
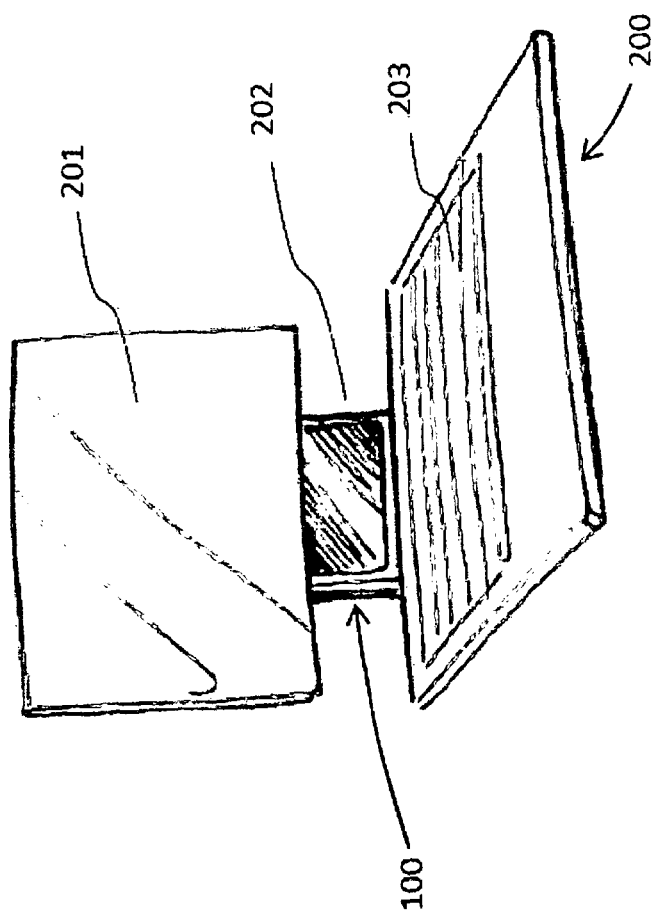

16] FIG. 50 illustrates a modified companion electronic device 200 with its docking area 202 located between keyboard 203 and display 201. On FIG. 8*l*, the docking area 202 also allows using the computing device 100 alongside display 201. The docking area 202 might be part of the keyboard 203 as shown on FIG. 8*m*. The two parts of keyboard 203 can be pulled apart to accommodate computing devices of various sizes. As shown on FIGS. 53 and 54, the display 201 might be raised so that the docking area 202, between the keyboard 203 and the display 201, can also accommodate computing devices of various sizes.

Figure 55:
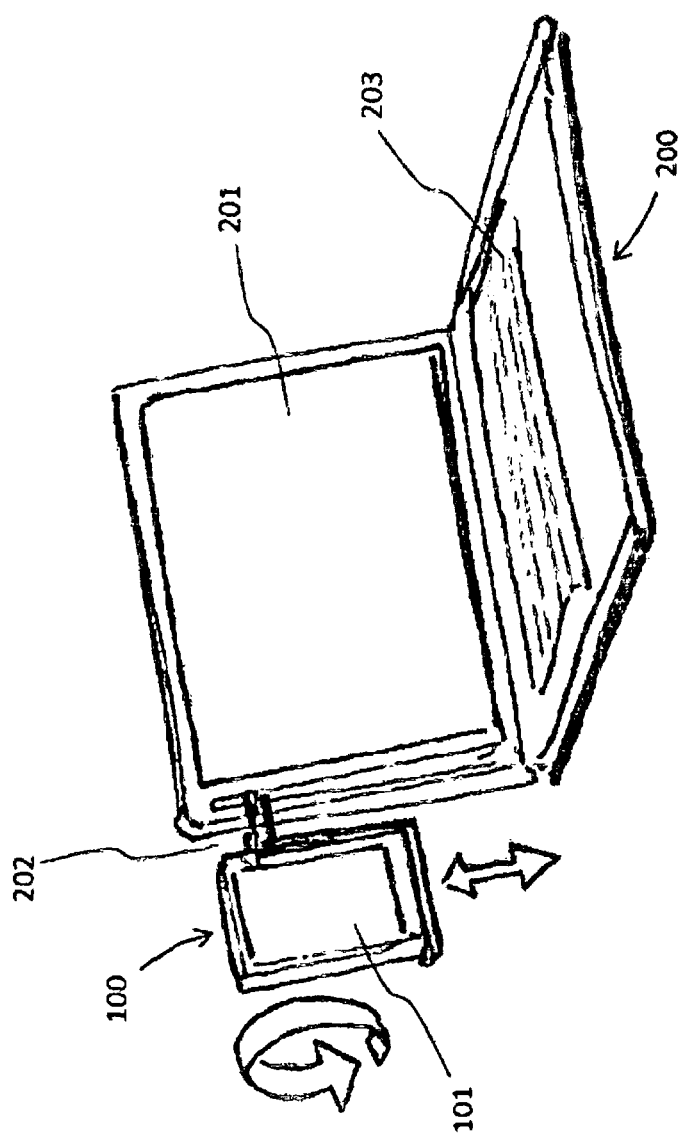
Figure 56:
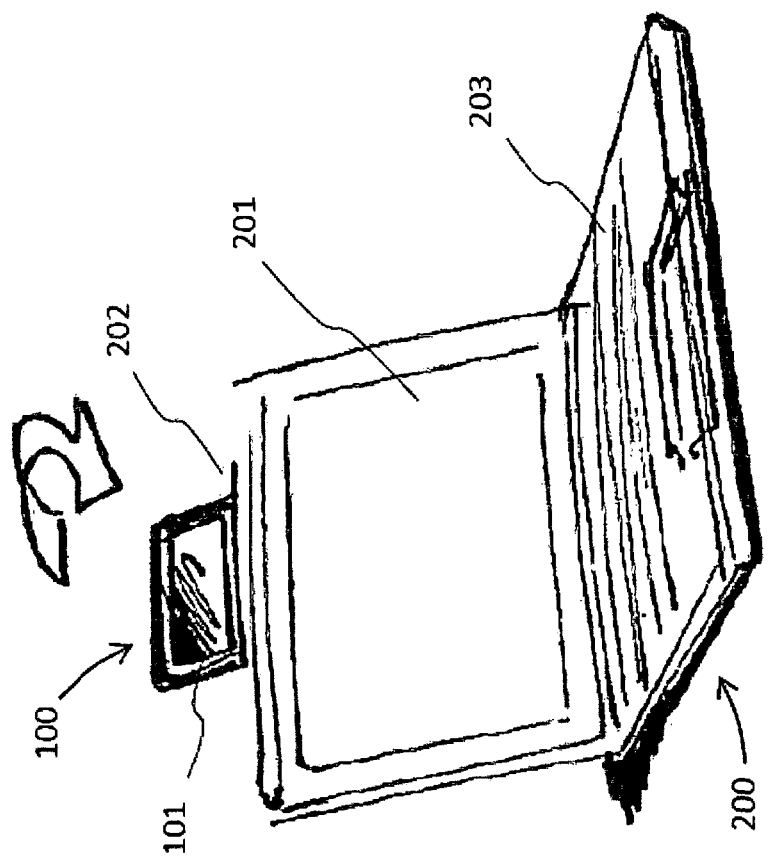
Figure 57:
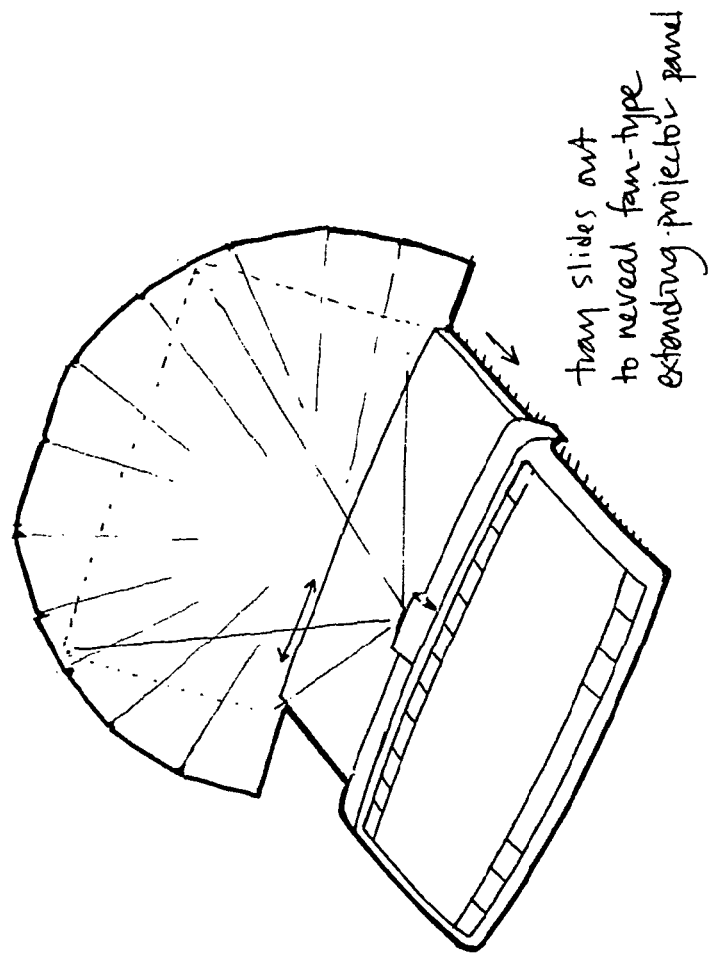
Figure 58:
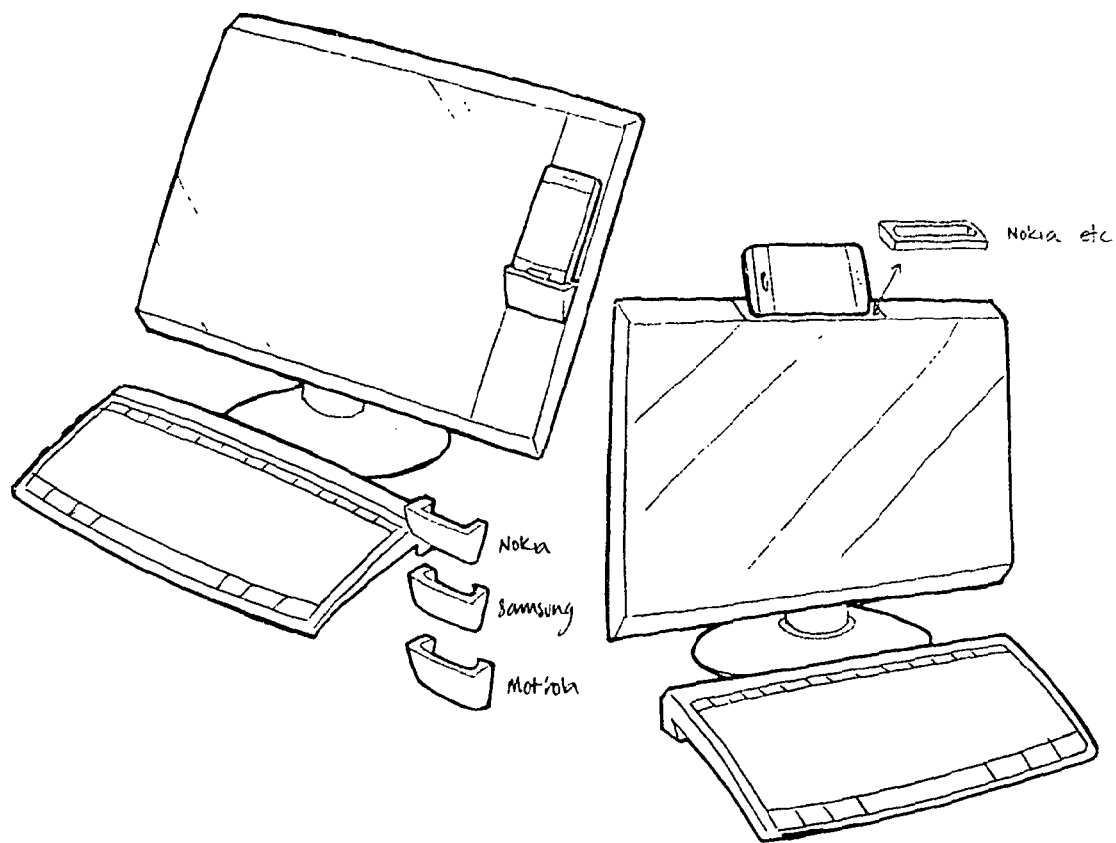
Figure 59:
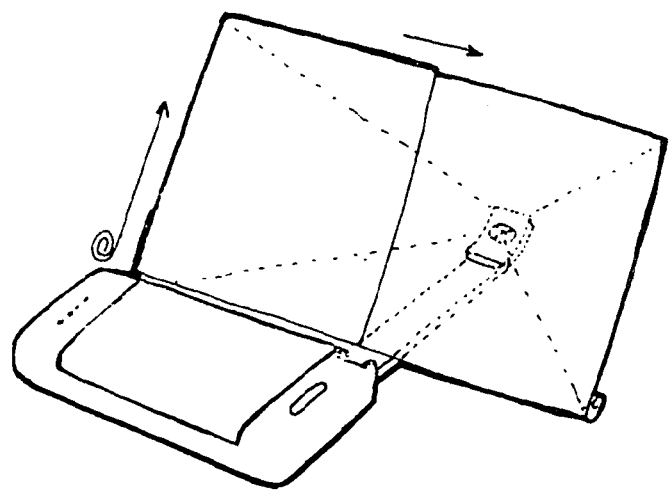
Figure 60:
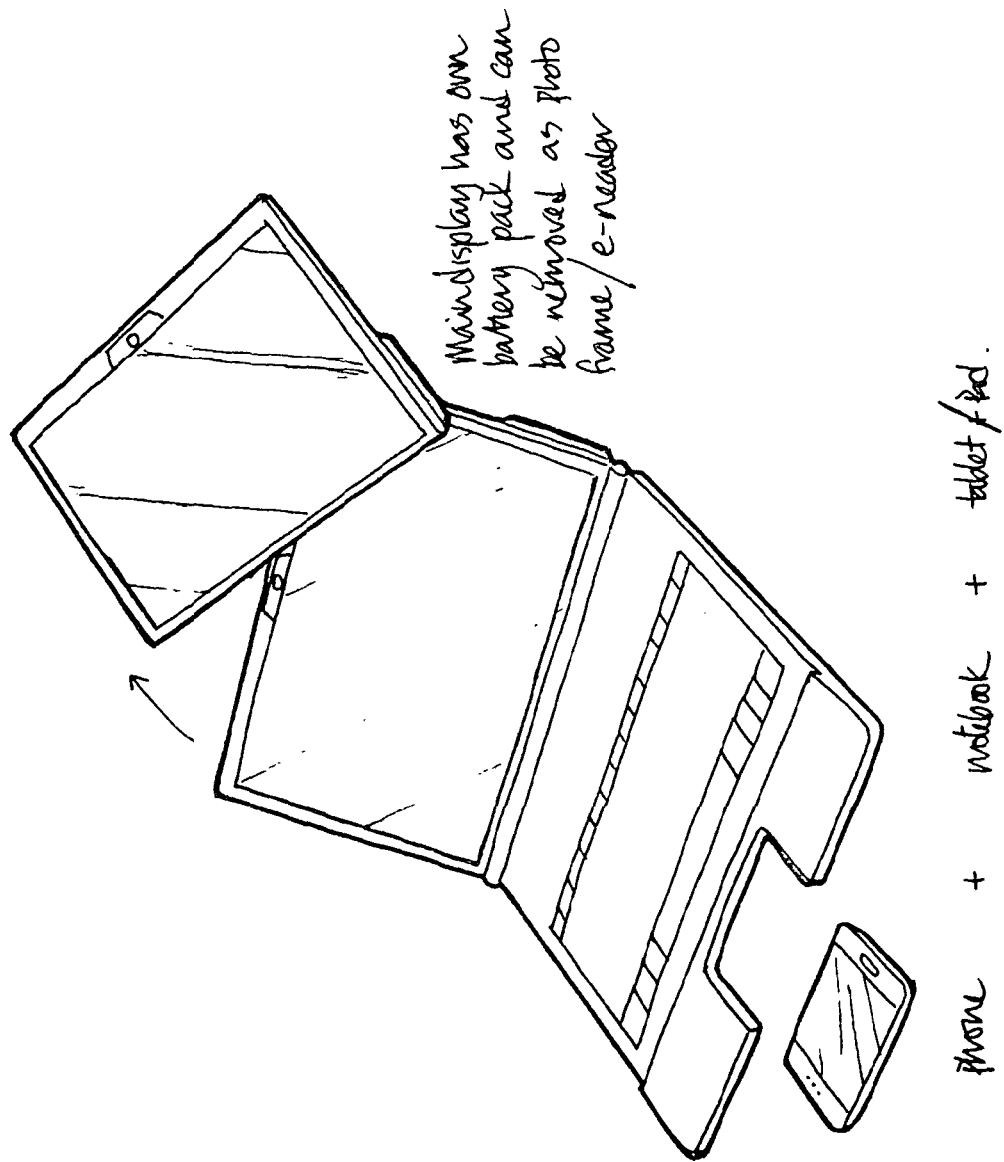
Figure 61:
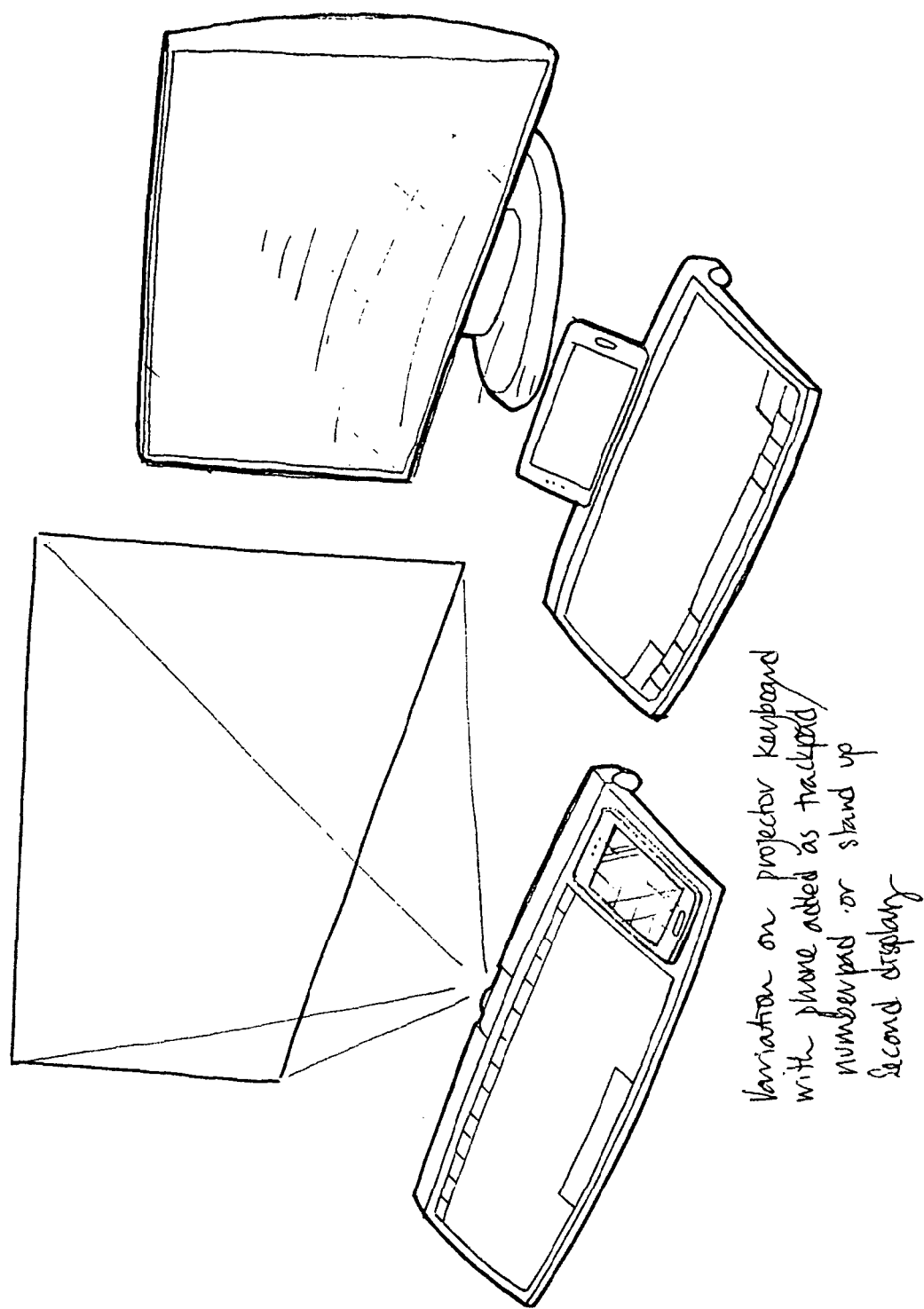
Figure 62:
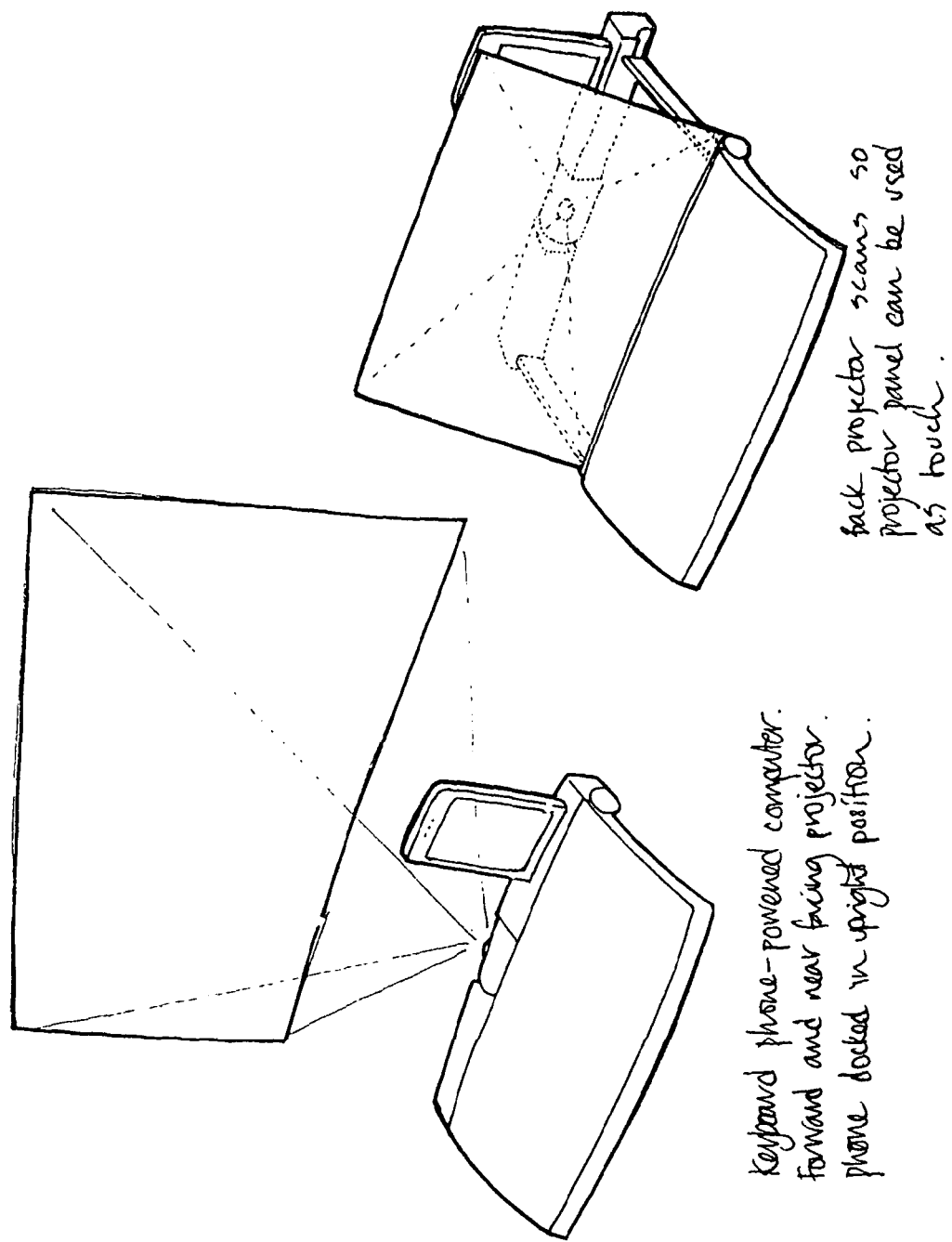
Figure 63:
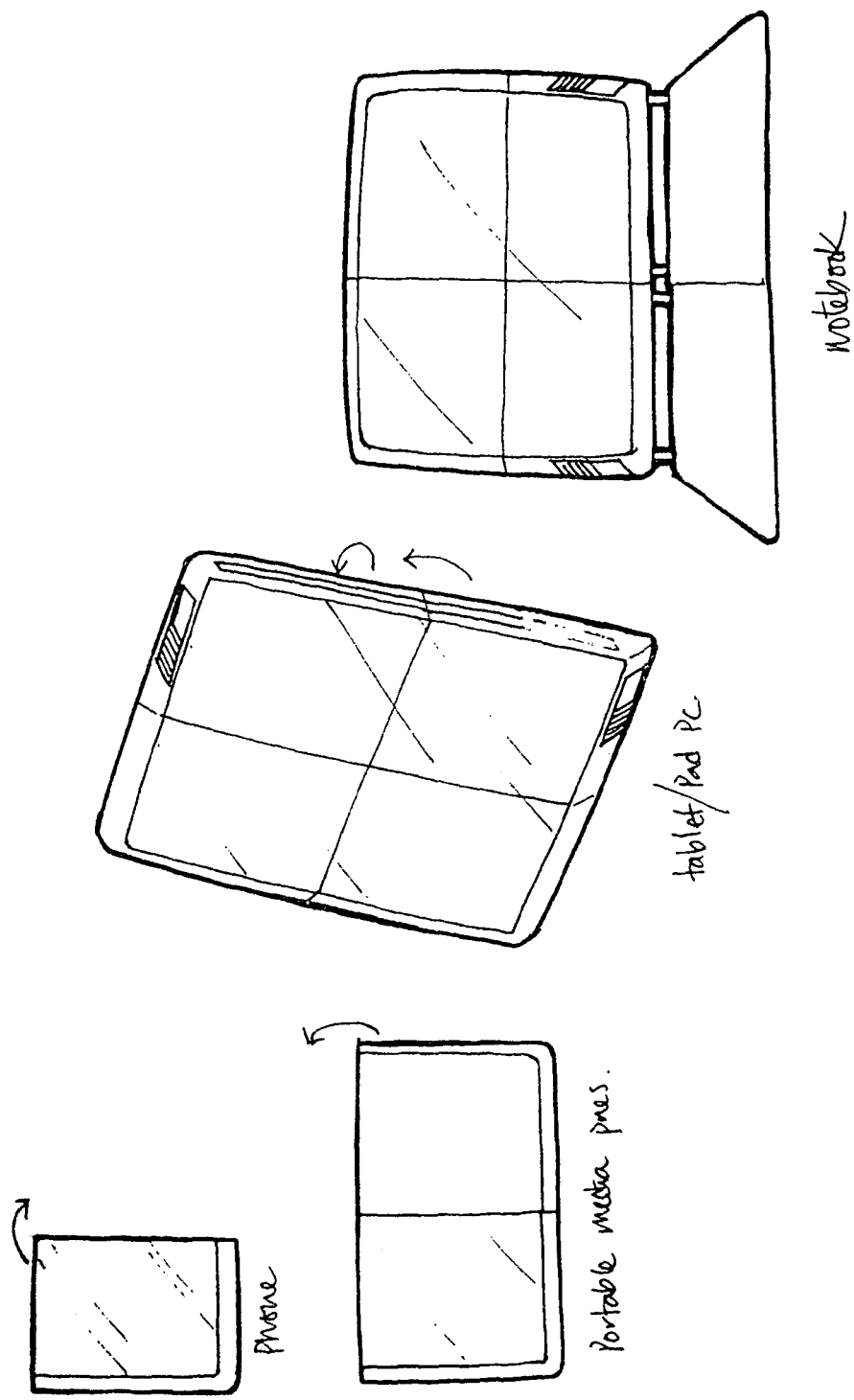
Figure 64:
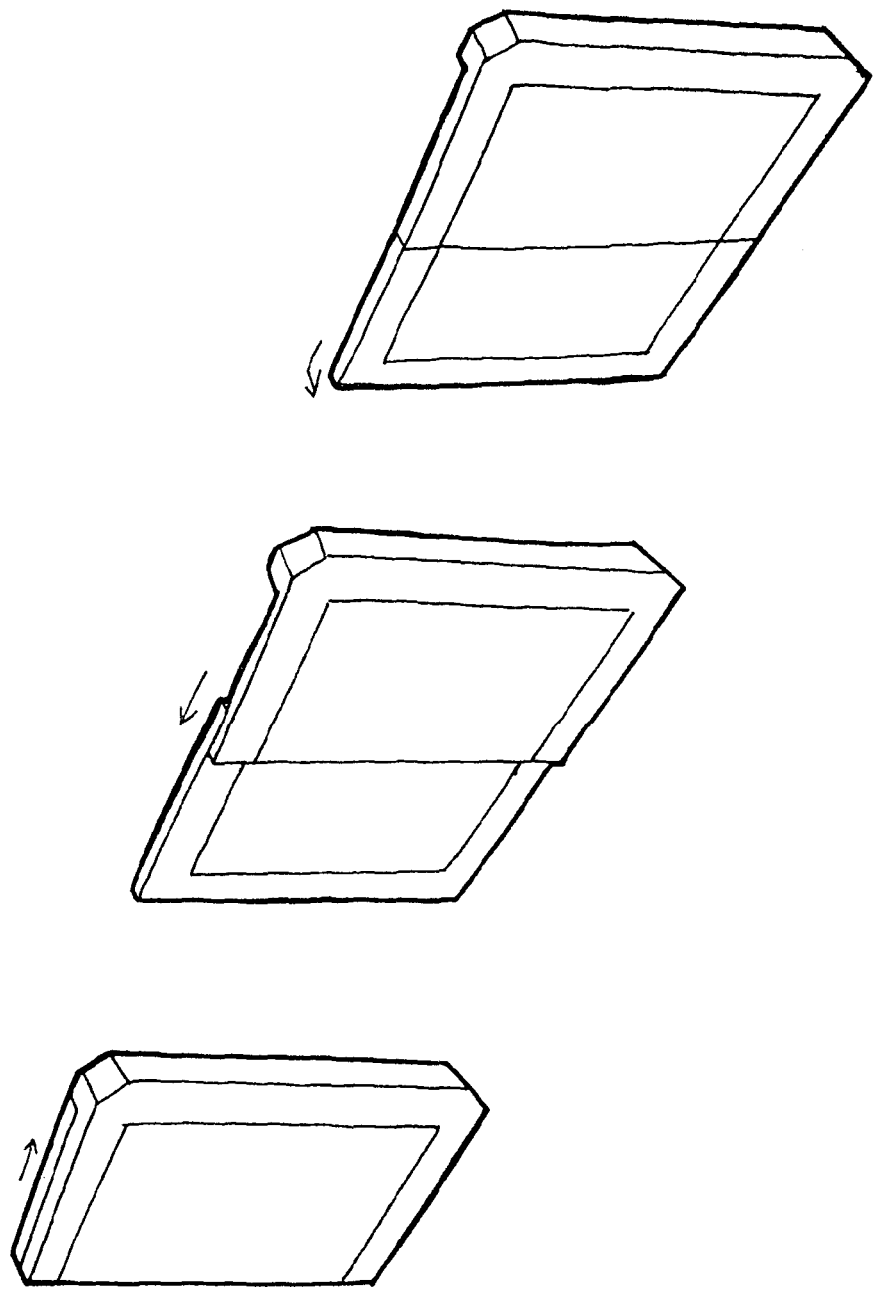
Figure 65:
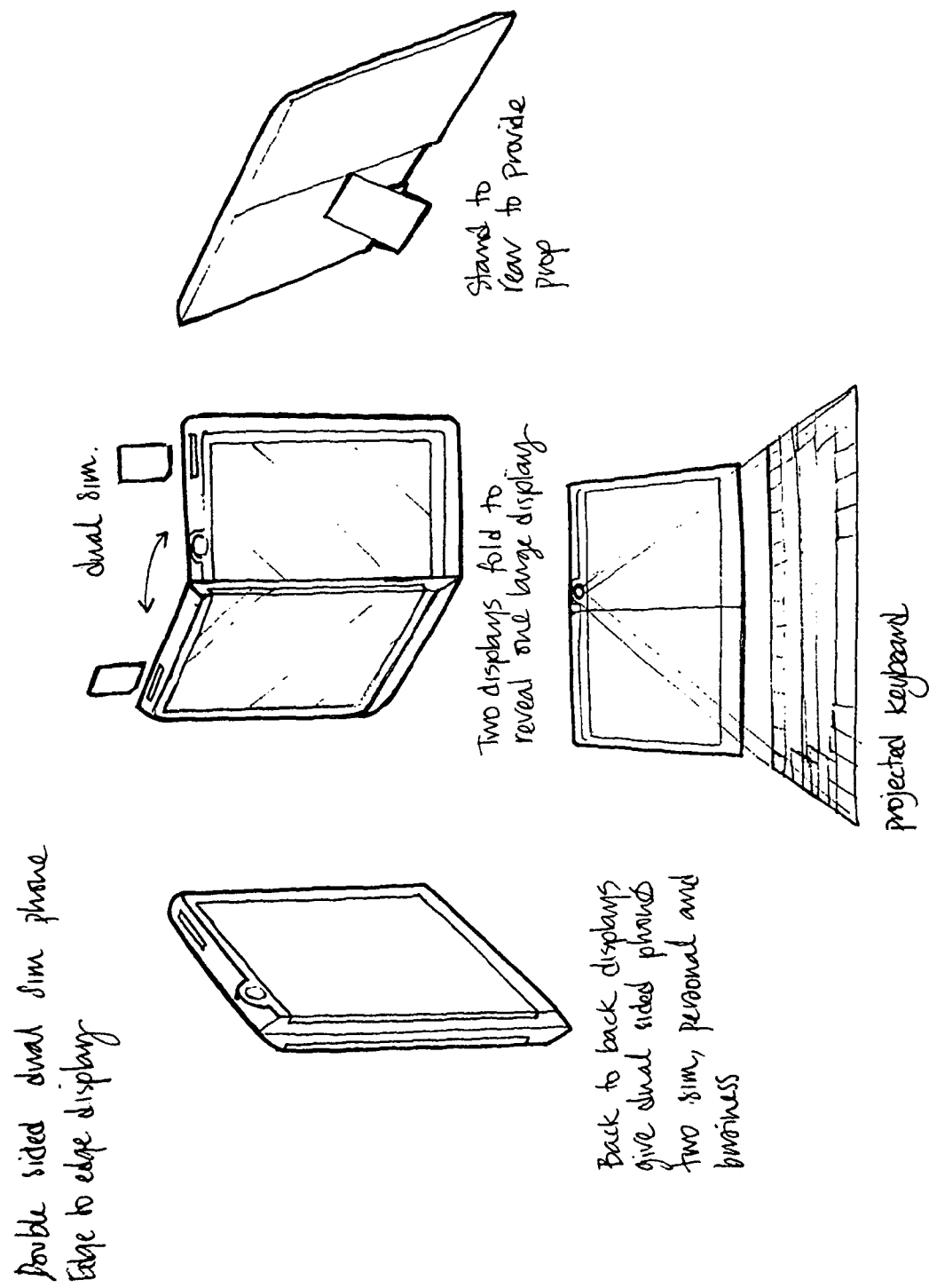
Figure 66:
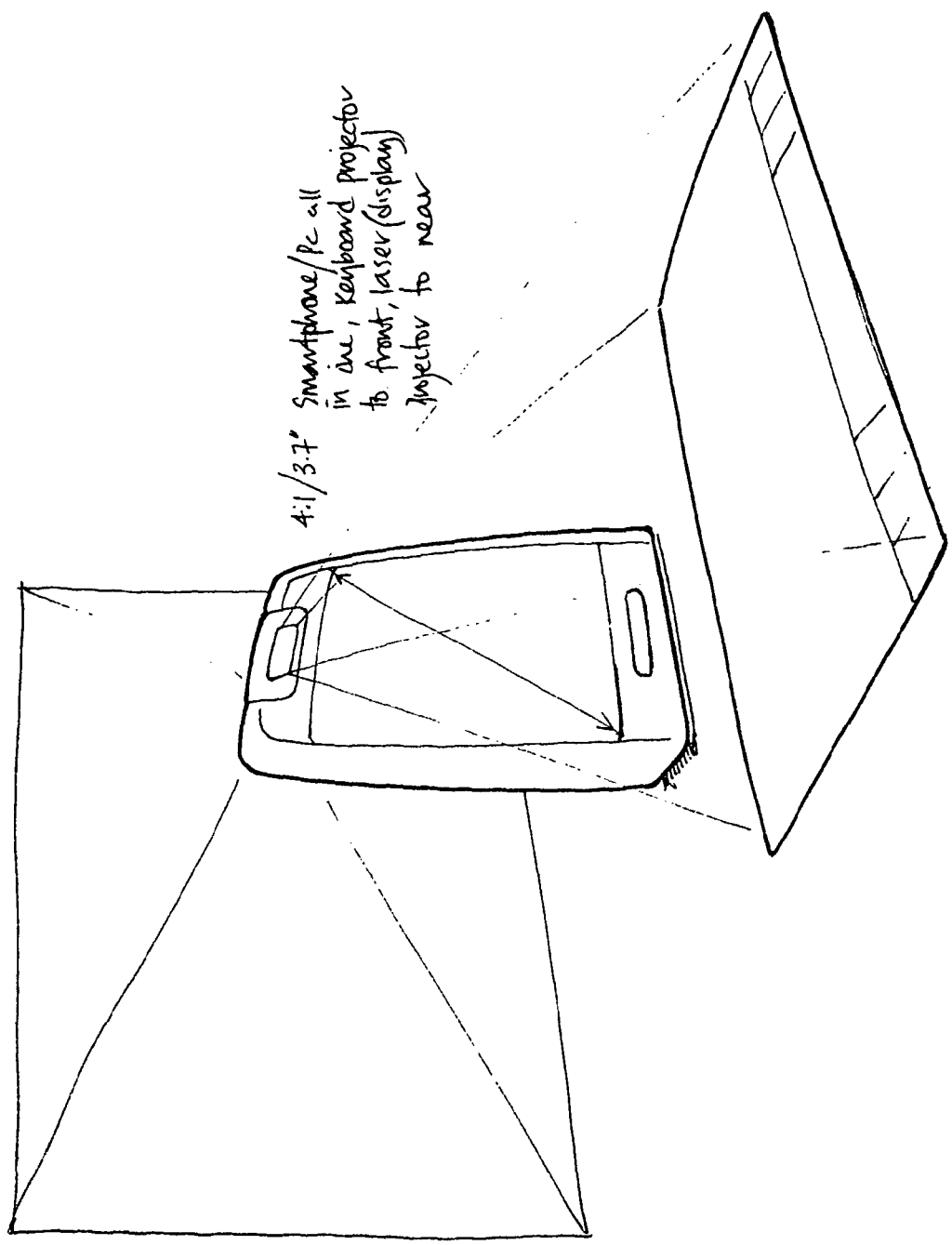
Figure 67:
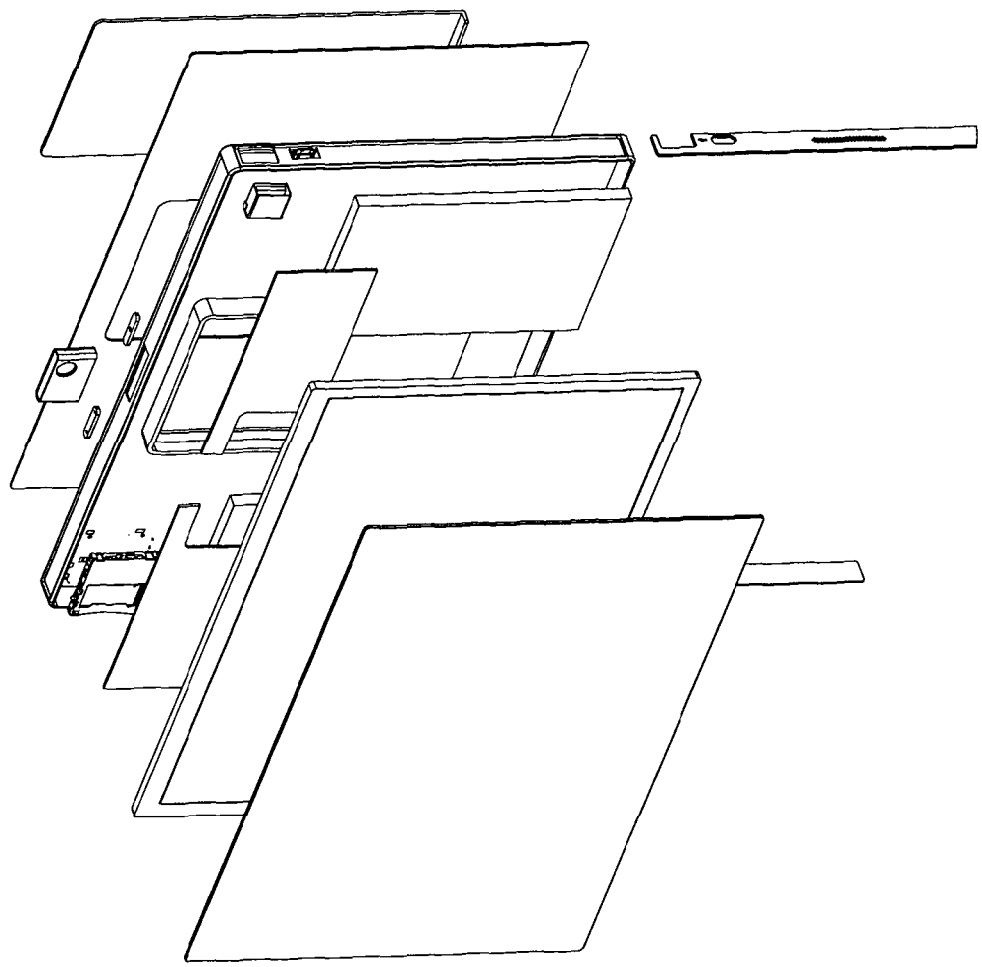
Figure 68:
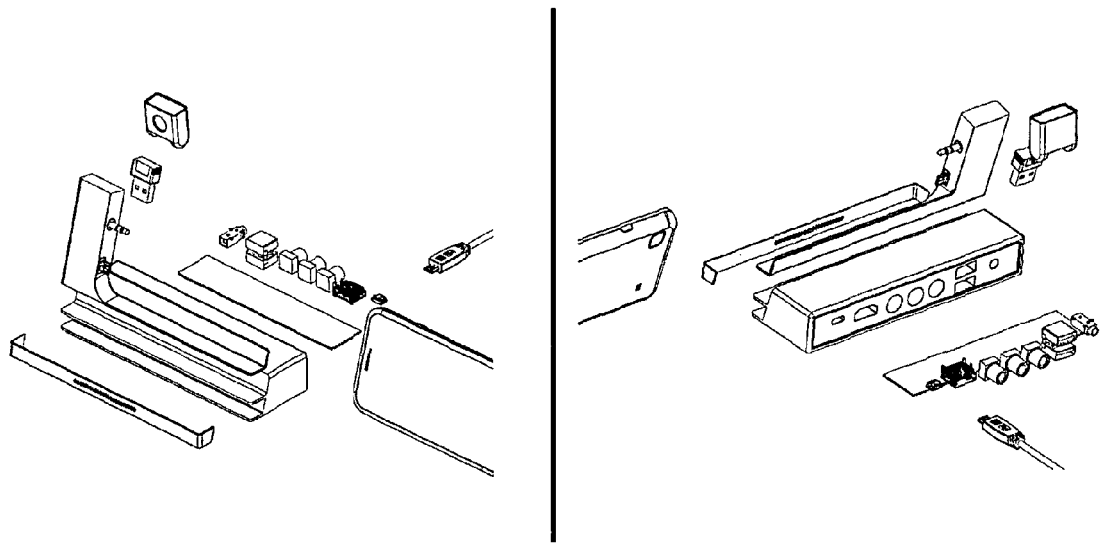
Figure 69:
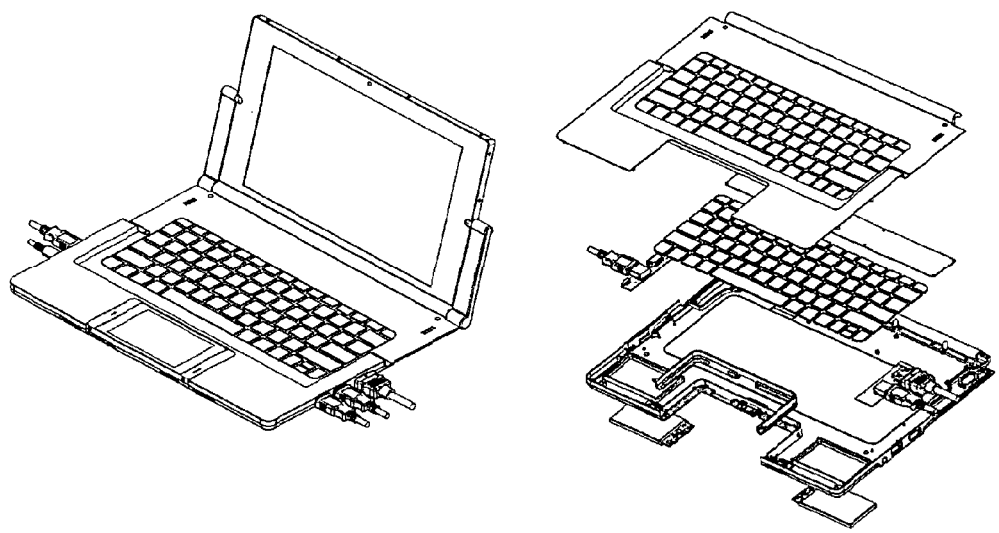
Figure 70:
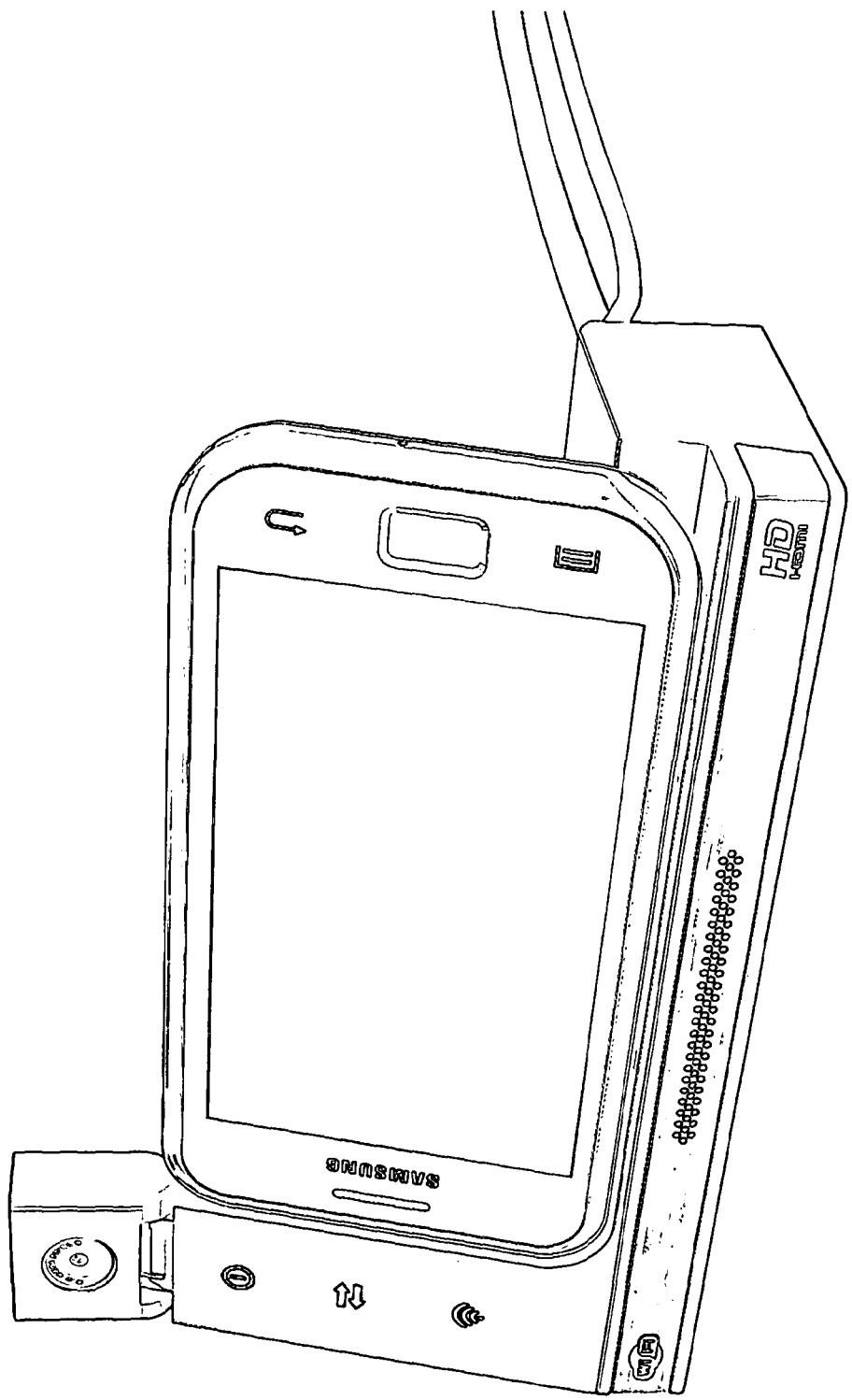
Figure 71:
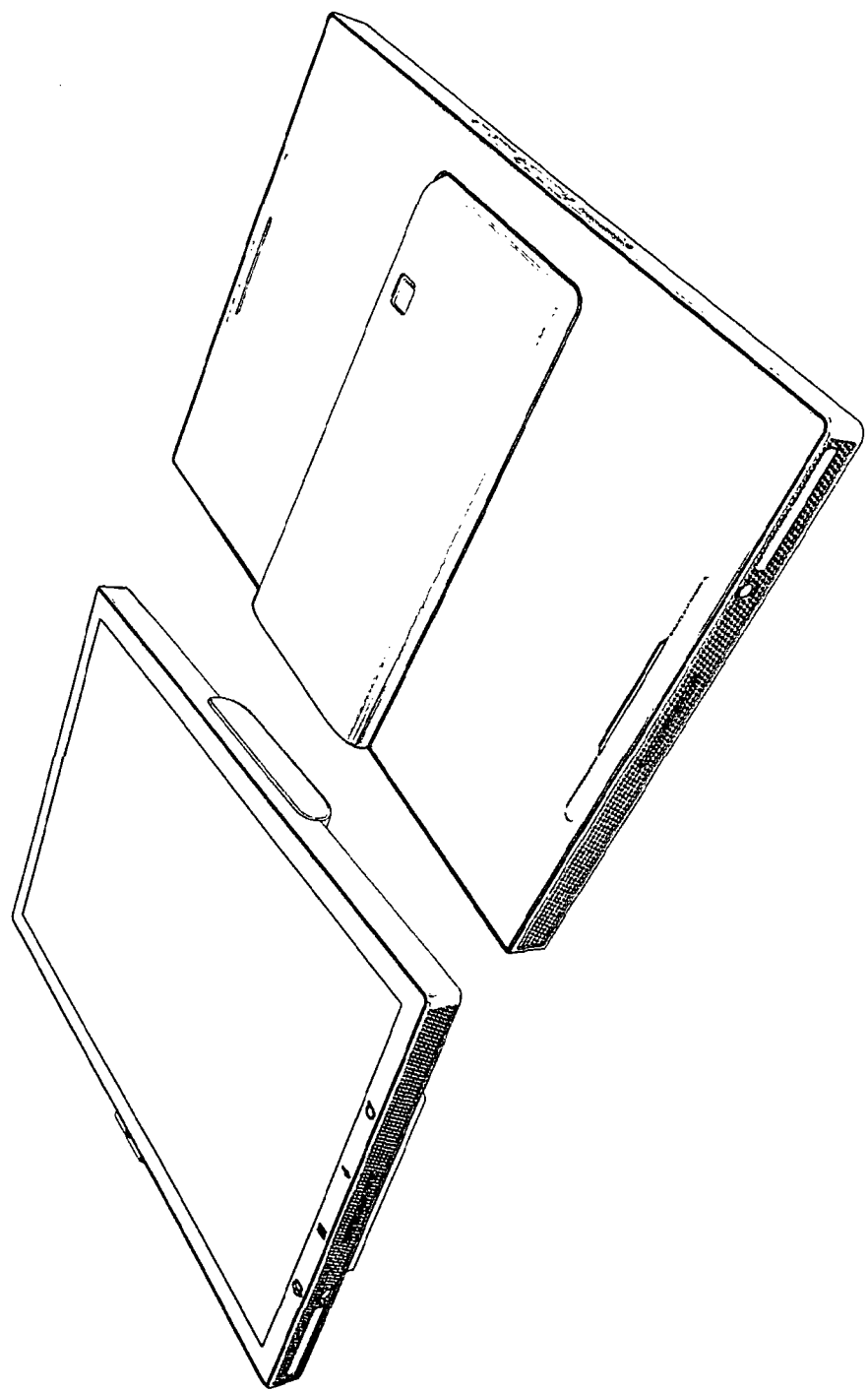
Figure 72:
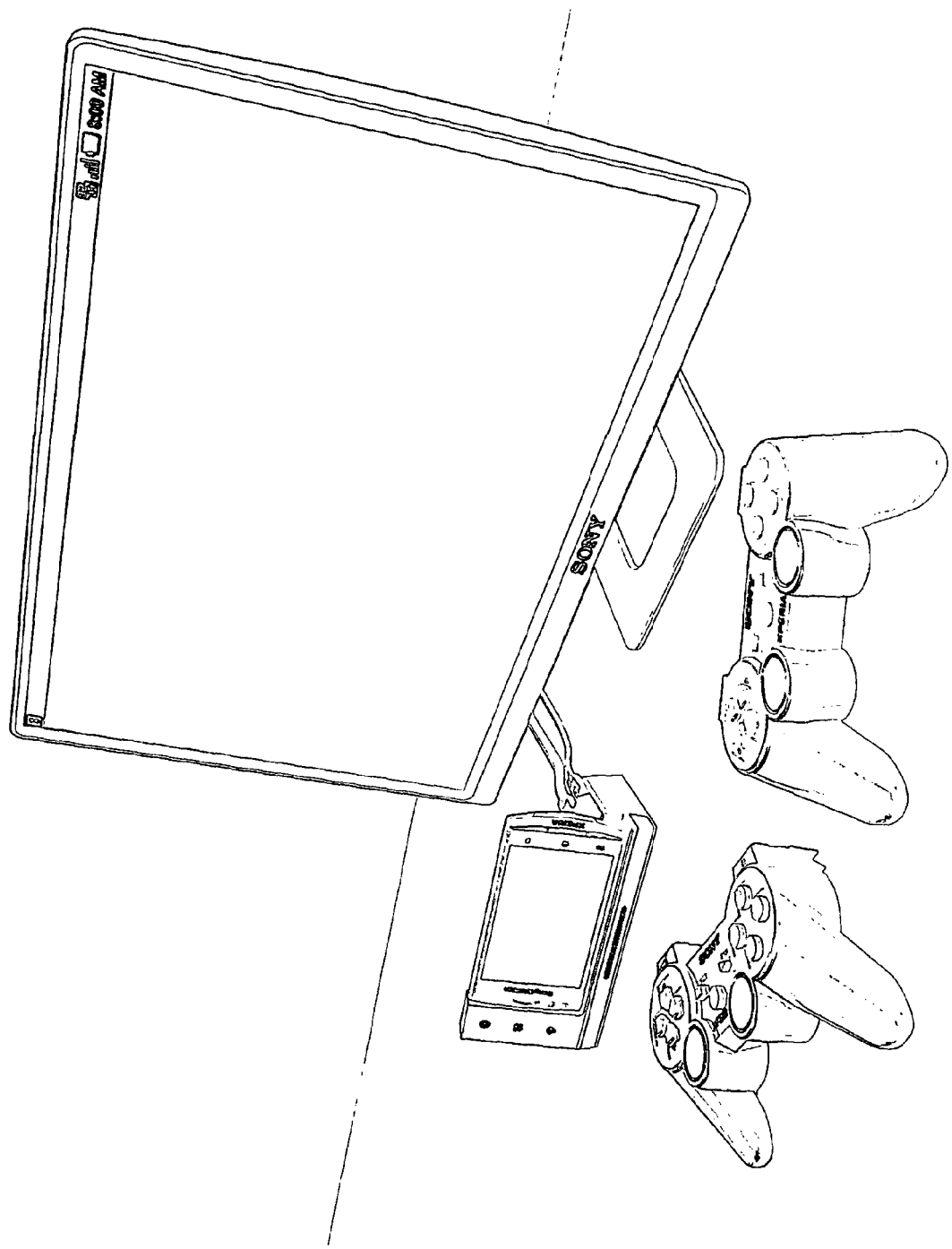
Figure 73:
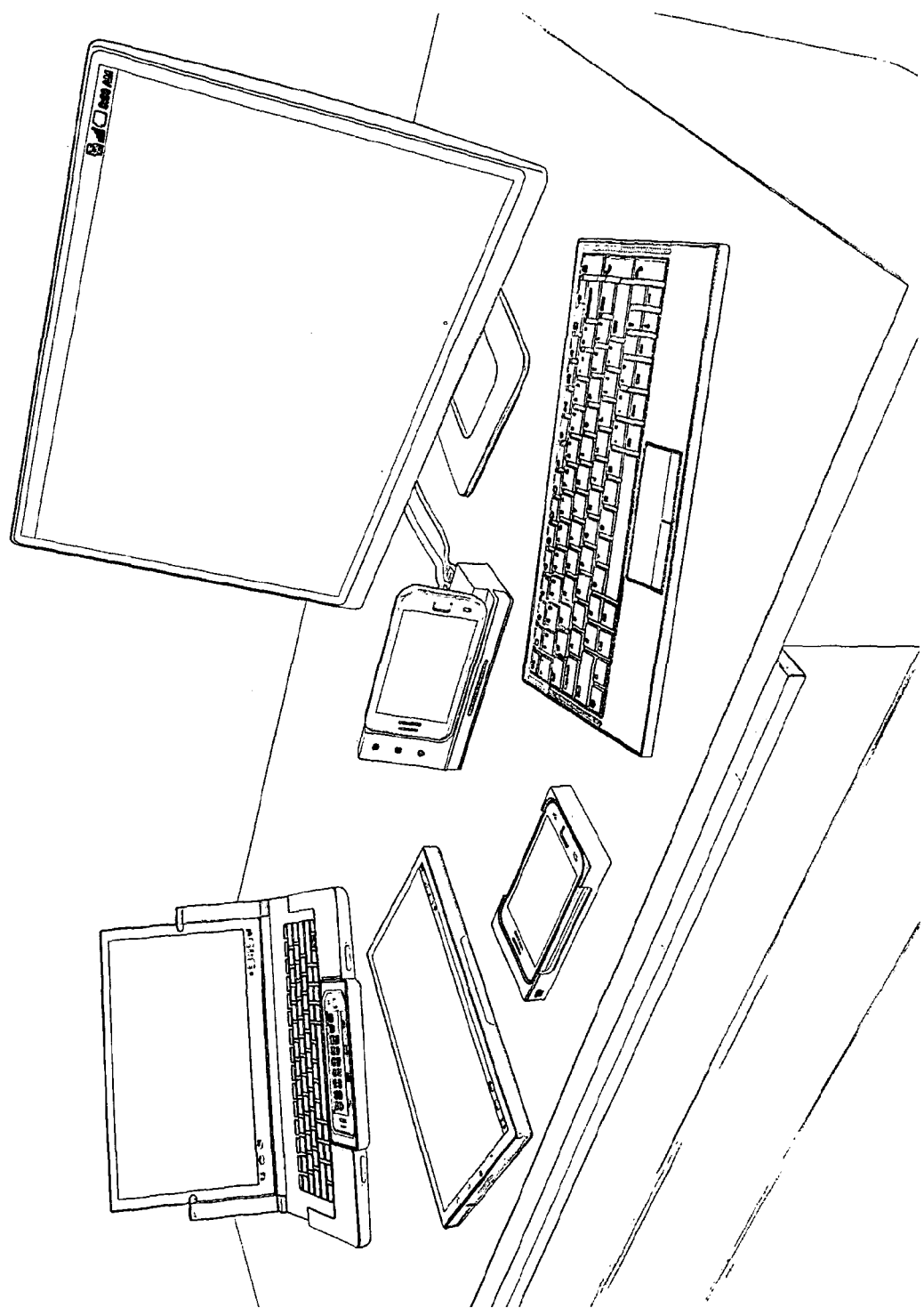
Figure 74:
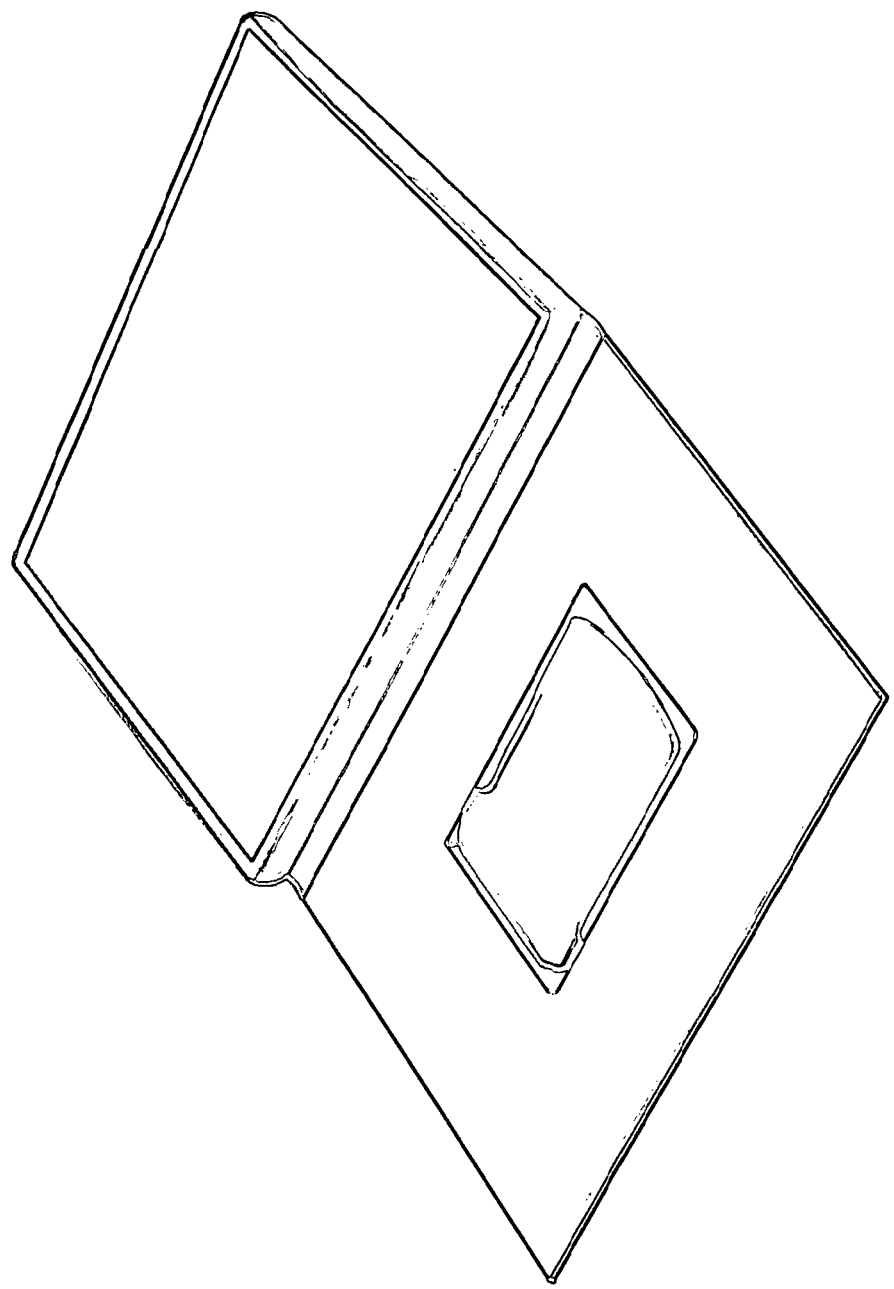
Figure 75:
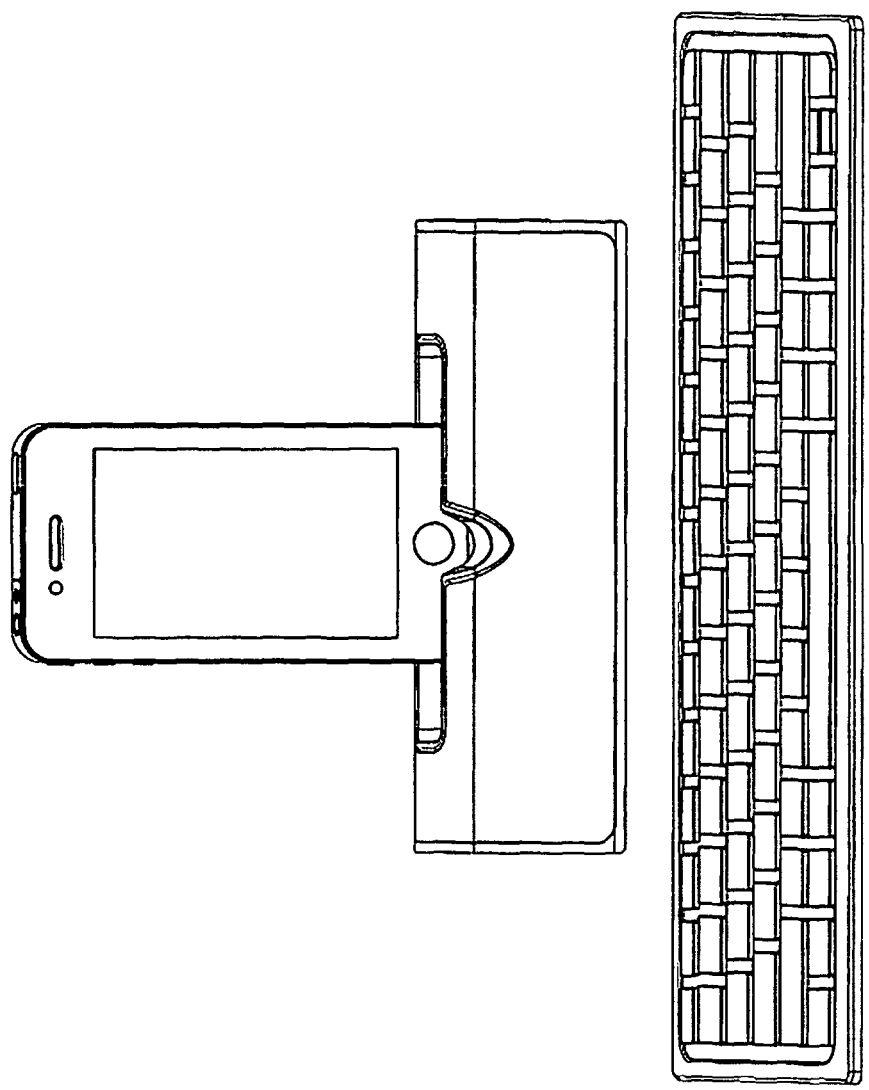
Figure 76:
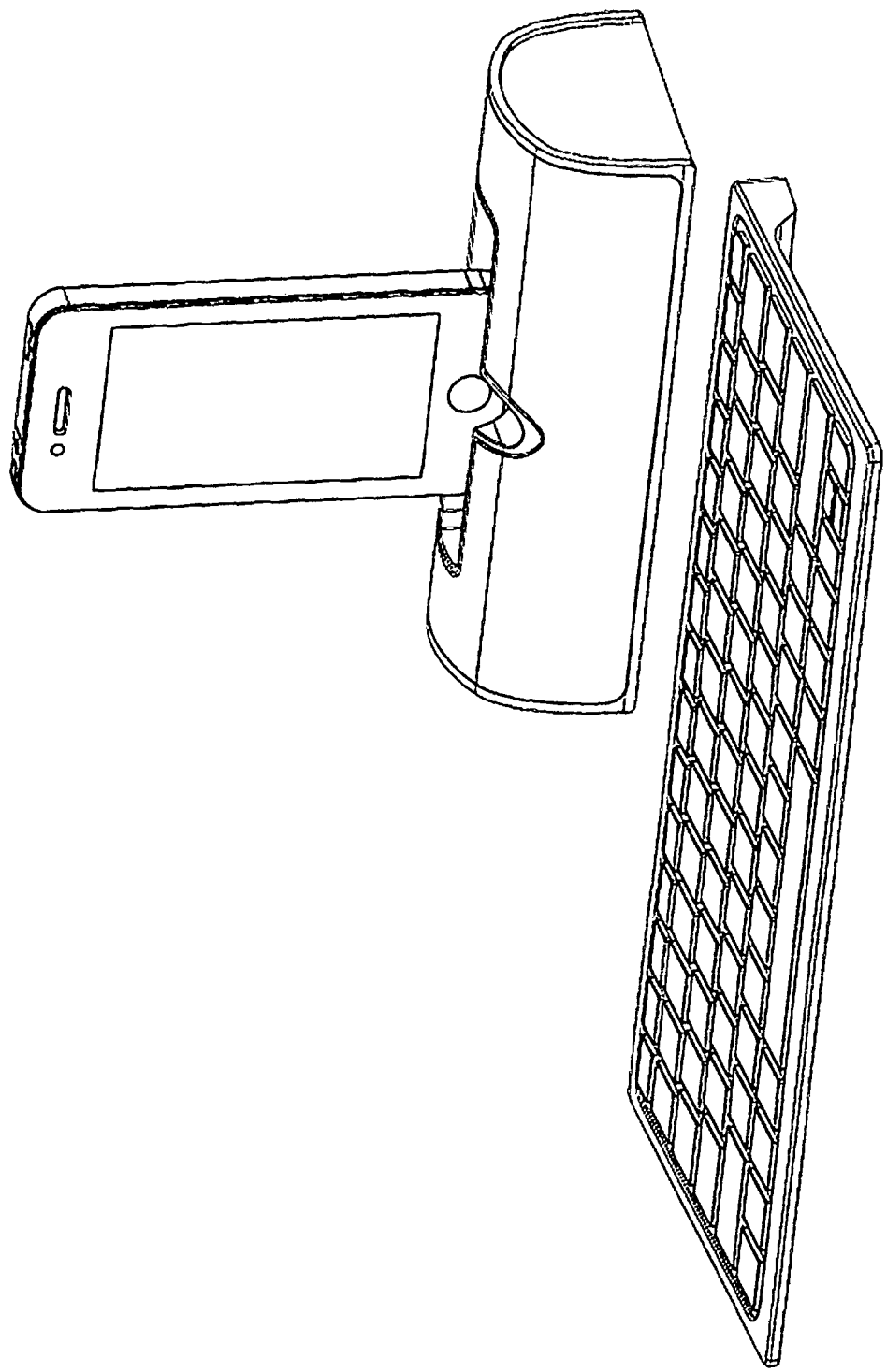
Figure 77:
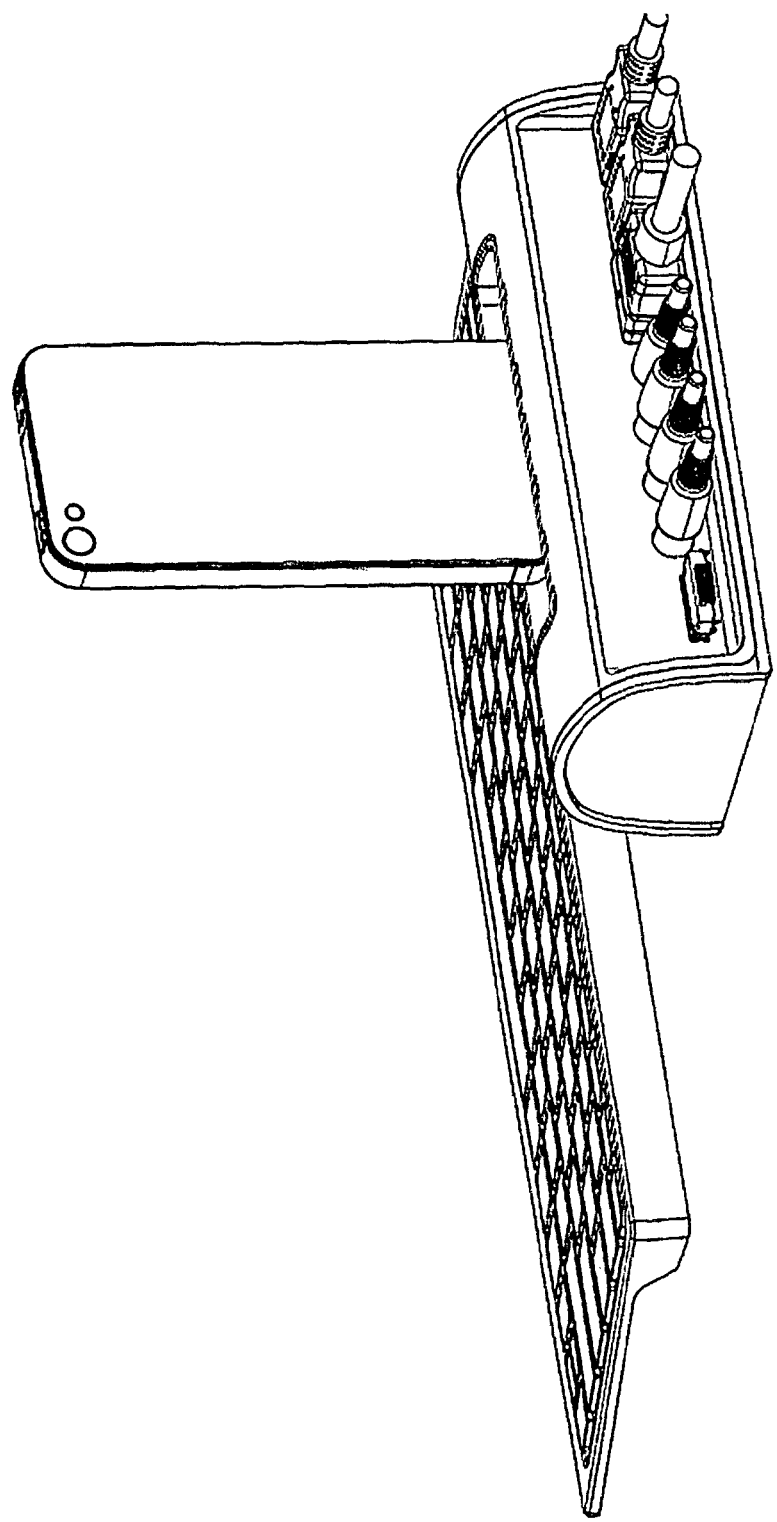
Figure 78:
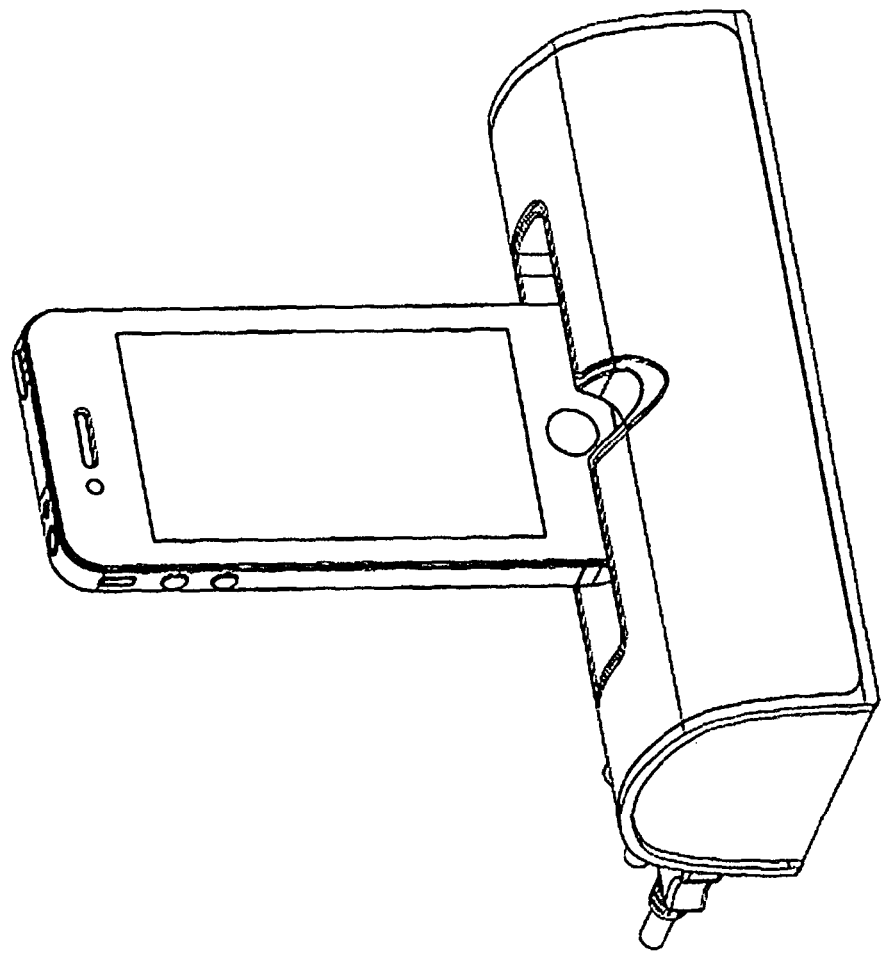
Figure 79:
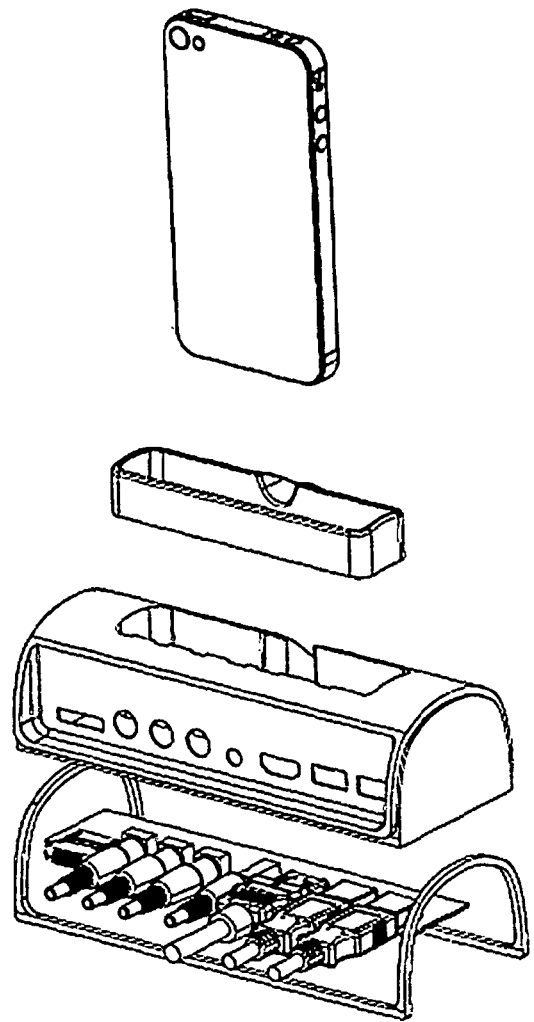

17] FIGS. 55 and 56 depict yet another solution, wherein the computing devices 100 is connected to a docking area 202 formed in the frame of display 201. Any further docking areas might be implemented without departing from the scope of the invention. Connection between the computing device 100 and any of the companion electronic devices 200, 300, 400, 500, 600 might be achieved with or without a docking area, either directly, or using adapters, wires, or wireless means.

18] A variation on several of the above embodiments may utilize a cable connection between the Computing Device and the Companion Electronic Device. The cable may be fixed to or removable from either device and may be retractable.

Example System Architectural Embodiments

Base architecture embodiments could take the form of almost any combination of the HW/OS and software elements described above. Examples of possible combinations include (refer to FIGS. 18-24):

Computing Device Type I+Companion Electronic Device Type IV+SW Config C
   Computing Device Type I+Companion Electronic Device Type I+SW Config C
   Computing Device Type I+Companion Electronic Device Type I+SW Config C
   Computing Device Type I+Companion Electronic Device Type I+SW Config B
   Computing Device Type IV+Companion Electronic Device Type I+SW Config B
   Computing Device Type II+Companion Electronic Device Type III+SW Config D
   Computing Device Type IV+Companion Electronic Device Type VI+SW Config Z
   Computing Device Type IV+Companion Electronic Device Type VII+SW Config Z
   Computing Device Type I+Companion Electronic Device Type III+SW Config A
   Computing Device Type VI+Companion Electronic Device Type I+SW Config C or almost any other combination (note that in the figures and above we use Roman numerals; we may also use the equivalent Arabic numerals in this text).

Figure 29:
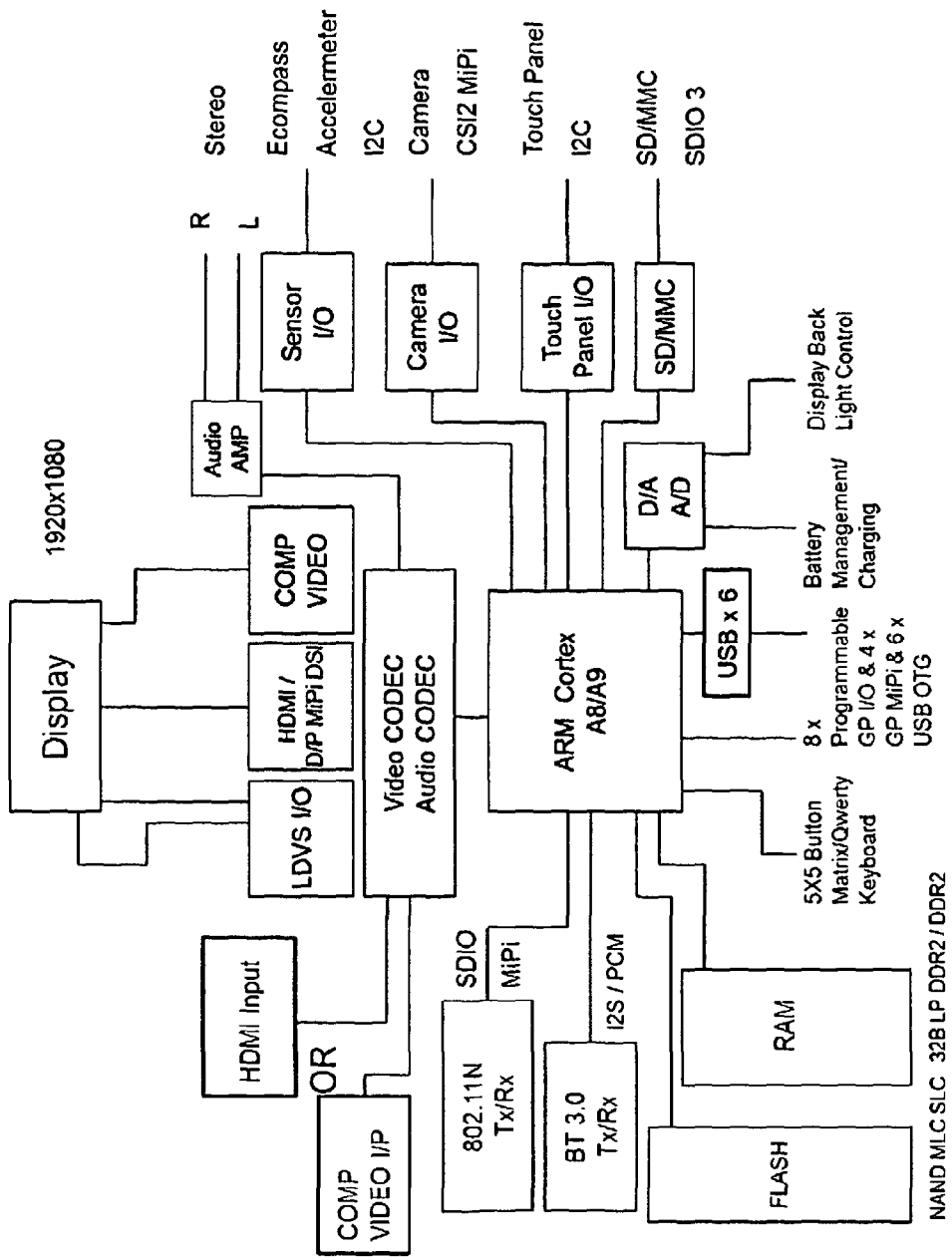

A given device within a system will, of course, have its own internal architecture. An example hardware block diagram for a Companion Electronic Device is shown in FIG. 29.

Example PPC System/PPC Enabler Embodiments

Example PPC enabler embodiments include the following. These examples do not preclude any others.

1. "Smart Computing Device/Pass-through Companion Electronic Device"—Computing Device sends display information directly to Companion Electronic Device which is displayed with no modification, The Companion Electronic Device may provide user controls, with the results shared with the Computing Device.
2. "Smart Computing Device/Adapting Companion Electronic Device"—Computing Device does appropriate UI adaptation for Companion Electronic Device with one or two OSes, and the result is sent to and displayed on Companion Electronic Device
   2.1. Two OSes which may be the same or different OSes share a common kernel
   2.2. Single OS generates the computing device user environment and a secondary user environment; for use on the computing device or the companion electronic device.
3. "Slave Computing Device/Smart Companion Electronic Device"—Companion Electronic Device runs one OS, all applications, etc., using data from the Computing Device. Variations of this embodiment could include:
   3.1. Computing Device data could be accessed and or modified in real time
   3.2. Computing Device data could be copied to Companion Electronic Device with modifications periodically sent back to Computing Device/synchronized.
   3.3. An intermediary device, such as a local or a cloud server, copies and/or synchronizes data between the Computing Device and the Companion Electronic Device.
4. "Intermediary"—A server/computing device that is independent from both the Computing Device/handheld device and the Companion Electronic Device, and itself adapts output/UI/etc. from the Computing Device for use/display on the Companion Electronic Device. Variations of this server/computing device concept could distribute any of applications, data or UE elements across any of the three or more devices in the system.
5. "Smart Computing Device/Smart Companion Electronic Device"—Companion Electronic Device with its own OS builds and displays its own UE that may include but is not limited to requested elements of the Computing Device UE and/or content, data, application results, applications themselves, input/output, etc. The Companion Electronic Device could have its own storage, applications, input/output, etc. and may or may not be usable when Computing Device is not connected.

The Smart Computing Device/Smart Companion Electronic Device embodiment is elaborated in the next section.

Figure 25:
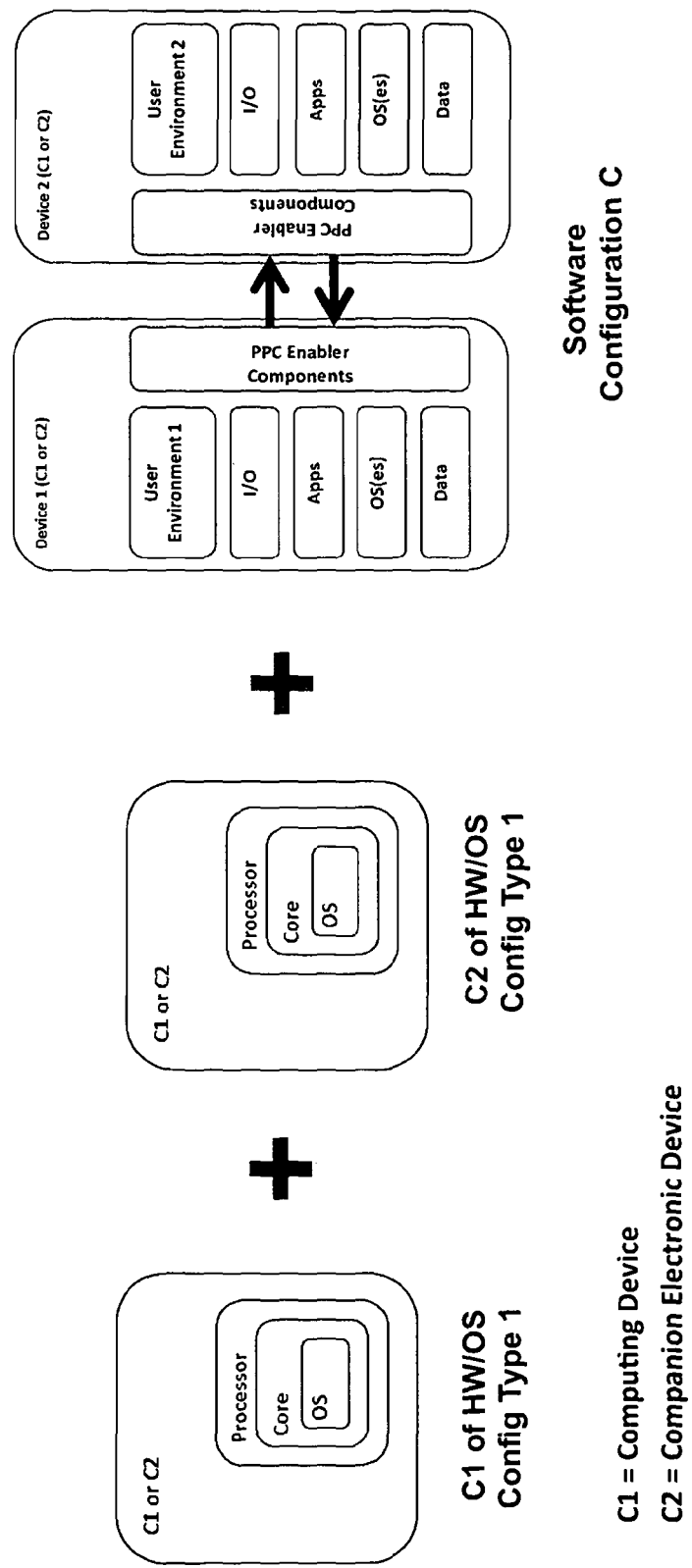

Elaboration of "Smart Computing Device/Smart Companion Electronic Device" Embodiment PPC enabler embodiment 5, "Smart Computing Device/Smart Companion Electronic Device", (FIG. 25) above has many advantages over other possible embodiments and is elaborated here.

As described in PPC enabler embodiment 5 above, Companion Electronic Device with its own OS builds and displays its own UI/UE that could include requested or provided elements of the Computing Device UE and/or content, data, application results, applications themselves, input/output, etc. The Companion Electronic Device could have its own storage, applications, input/output, etc., and may or may not be functional when the Computing Device is not connected.

"Smart Computing Device/Smart Companion Electronic Device" Characteristics

Potential characteristics of the "Smart Computing Device/Smart Companion Electronic Device" embodiment include:

1. Relying on the Computing Device connected directly or indirectly to a companion electronic device to run at least some applications,
2. Relying on the Computing Device connected directly or indirectly to a companion electronic device to create at least some intermediate UE elements that will be eventually be incorporated by the Companion Electronic Device into its own UE For the purposes of this disclosure, "UE elements" may refer to graphics assets, GUI gadgets or widgets, display images, partial display images, input/output control methods, audio, commands, haptic or other feedback method instructions, application results, application content (e.g., web page, phonebook entry, etc.), or any other component or part of a component of the user environment, or a description or tokenization thereof.

3. Relying on services or other methods/capabilities present in the Computing Device connected directly or indirectly to a companion electronic device such as OS and/or hardware/and or applications to help prepare intermediate elements (e.g. display image, data or audio streams) that are independent of the configuration of the Companion Electronic Device that may then be incorporated into the Companion Electronic Device's UE, with or without modification.

For the purposes of this disclosure, "services" may include those such as formatting graphical elements for a particular resolution, density and/or orientation as required by the companion device; Employing techniques to take advantage of larger screen real estate which may be available, such as preparing to display more information than would otherwise be possible on relatively smaller screen real estate; or the same information with more fidelity (e.g. higher resolution, colour depth, etc); one or two way communications or networking; input or output; electrical power; processing power; application execution, etc.

3.1. The Computing Device services' actions may require information to be shared between the Computing Device and Companion Electronic Device, and could include:

3.1.1. Instructions from the Companion Electronic Device to Computing Device to behave in certain ways in order to assist the Companion Electronic Device in providing its separate user environment 3.1.2. Using input and output peripherals and or elements of the Companion Electronic Device in place of or in parallel to the Computing Device's own and vice versa 3.1.3. Rendering display graphics for a particular screen resolution, density or orientation 3.1.4. Using network connection elements of the Companion Electronic Device in place in parallel or in a multiplexed way to the Computing Device's own, or vice versa 3.1.5. Creating an intermediate user environment, that could include GUI, input/output elements, etc.

4. Companion Electronic Device inserting the Computing Device display image (or not) or elements thereof, which is built from elements provided by the computing device which could be a window within the Companion Electronic Device UE or could be more.

5. Modifying (stretching/rendering/etc.) (or not) the Computing Device screen image display or a part or element of to be sized and adapted appropriately for the Companion Electronic Device display configuration, Processing and intelligence for this occurs on the Companion Electronic Device, and the Companion electronic device instructs the computing device to provide elements that can be incorporated into the companion electronic device UE.

6. At certain times combining elements of the intermediate environment from the Computing Device with locally generated elements on the Companion Electronic Device; Processing and intelligence for this combination step occurs on the Companion Electronic Device.

Figure 3:
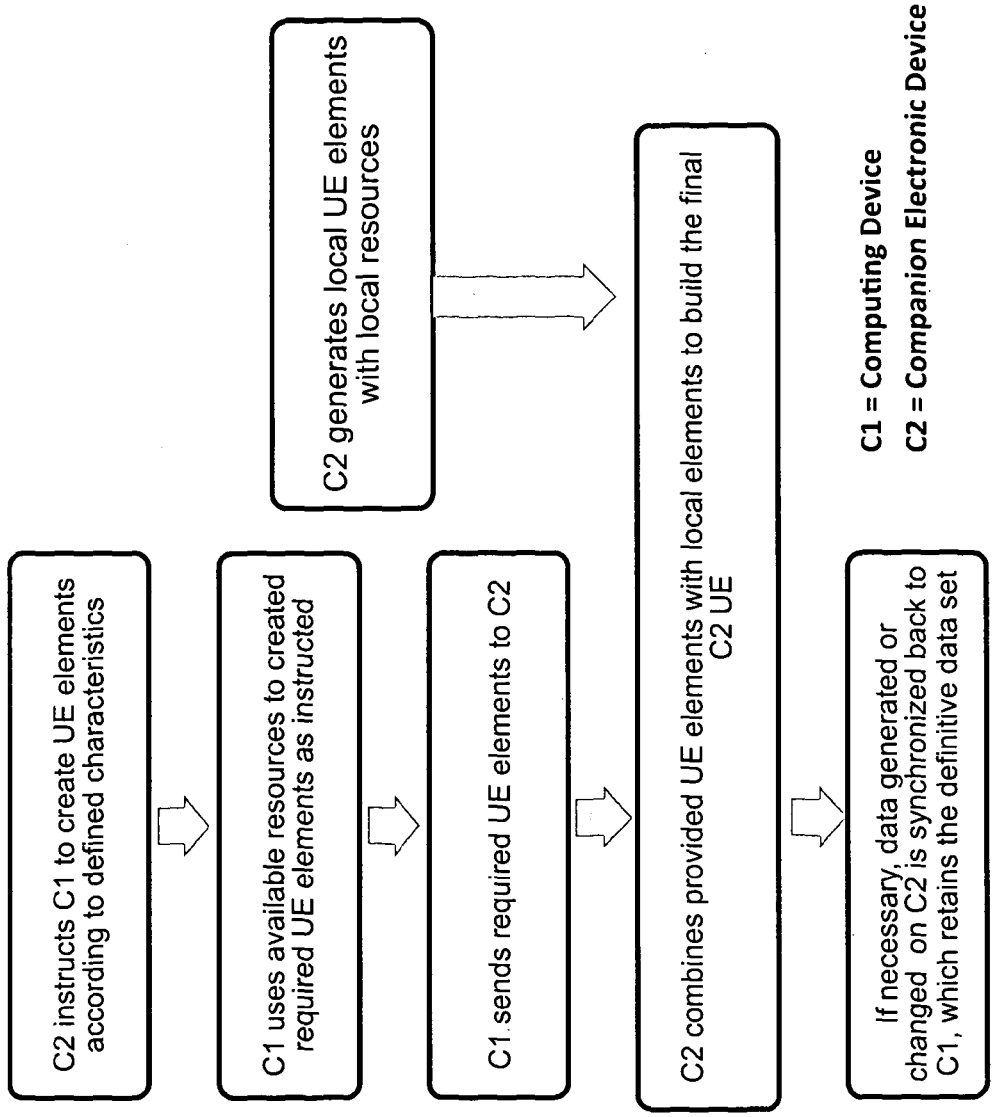

See example UE generation flow in FIG. 3.

7. Following this adaptation step, displaying the combination of the Computing Device UE and the Companion Electronic Device UE on a display connected to physically, wirelessly or over a network or incorporated in the Companion Electronic Device; In parallel outputting audio and/or other associated feedback, such as audio or haptic feedback, from Companion Electronic Device that may have originated on either Computing Device or Companion Electronic Device.

8. An embodiment could include peripheral, input device, output device, etc. handling and/or notification by the Companion Electronic Device to the Computing Device, with the benefit of abstracting these additional elements from combinations of the Computing Device hardware, software and/or UI.

9. An embodiment of this invention could be to send tokens representing elements of the Computing Device environment, i.e., abstracting those elements, rather than sending the elements themselves, reducing processing power, bandwidth and other system requirements of the two devices, which are then used to generate those elements on the Companion Electronic Device. Tokens may be novel or may use industry standard or de facto standard methods such as XML, Flash, etc.

9.1. The Companion Electronic Device could use those tokenized elements in whole or in part within its own UE 9.1.1. An embodiment could be for the Companion Electronic Device to query the list of applications available (possibly as tokens) on the Computing Device which are then used by the Companion Electronic Device to build an application selection screen within its own UI. The Companion Electronic Device's application selection screen could combine applications residing on Computing Device and Companion Electronic Device and run on either the Computing Device or the Companion Electronic Device.

10. Because the Companion Electronic Device environment is generated locally, certain interactions with or actions of the Companion Electronic Device may not require continuous interaction with the Computing Device or use of Computing Device resources, helping to conserve Computing Device resources (processing, power consumption, etc.) and reduce interface bandwidth and power requirements 10.1. An embodiment of this characteristic could be to transmit a lower resolution video stream from the Computing Device to the Companion Electronic Device which is then upscaled on the Companion Electronic Device for output on a larger display, thus reducing the processing requirement on the Computing Device and, by extension, the power consumption of the Computing Device, and by extension the interface bandwidth requirements and interface power consumption.

10.2. A further embodiment of this characteristic would enable the Computing Device to switch off or put into sleep mode certain Computing Device resources that are not required in a linked state when the Companion Electronic Device has its own processing and I/O resources. For example, the Computing Device might switch off or put into sleep: Display, display driver, audio drivers, portions of memory, other system elements, etc.

10.3. A further embodiment of this characteristic could be batch transfer of data from the Computing Device to the Companion Electronic Device (e.g., songs in a playlist) to eliminate the need to continually transfer data 11. Because the Companion Electronic Device environment is generated locally, the Computing Device's own environment may or may not be used independently of the Companion Electronic Device's environment, e.g., to answer a call.

12. Because resources on the Computing Device are employed less than they might be in models where the Computing Device takes responsibility for generating the Companion Electronic Device user environment, it is more likely that multiple Companion Electronic Devices could be used simultaneously with the Computing Device, for example in different rooms of a house. Variations of this could allow for simultaneous use of the same Computing Device applications on different Companion Electronic Devices or alternatively restricting certain applications or portions thereof from different companion electronic devices.

This could also enable application developers to create applications which have multi-user use cases.

12.1. An embodiment could include the Companion Electronic Device receiving bitmap (or other) representations of the display from the Computing Device with a software program on the Companion Electronic Device that analyses those bitmap representations with the intent of adapting the content to display more appropriately on the display of the Companion Electronic Device. For example, soft buttons, text or other UE elements and controls could be differently laid out over the different area available on the Companion Electronic Device display. A further embodiment could instead receive, similarly analyse, and re-purpose non-bitmap image or video data such as SVG- or Flash-based data.

12.1.1. Another possible embodiment is to have Computing Device UE library calls routed to Companion Electronic Device which implements the rendering and could possibly adapt the intended layout to different display configurations.

12.2. Another benefit is greater potential for the Computing Device to work with multiple Companion Electronic Devices, because the Computing Device does not have to generate the user environment for the Companion Electronic Device.

13. The OS and other software for the Companion Electronic Device may be loaded from the Computing Device initially and/or periodically (or not); Benefits of this approach include:

13.1. The Companion Electronic Device could more easily be enabled to work with multiple types of computing devices, including with different OSes.

13.2. The Companion Electronic Device is more "generic", with at least some of the Companion Electronic Device software designed to match the capability of the specific computing device software.

13.3. The Companion Electronic Device software can be updated periodically via the Computing Device without requiring independent data connectivity on the Companion Electronic Device 14. The Computing Device's data and/or applications may or may not be copied to and synchronized continuously between the Computing Device and the Companion Electronic Device reducing the amount of data that is moved around within the system.

14.1. An embodiment of this idea could allow for applications to be run locally on the Companion Electronic Device 14.2. An embodiment of this idea could synchronize via a local or remote server rather than directly between the two devices "Smart Computing Device/Smart Companion Electronic Device" Use Case Examples Distribution of application, input/output, and user element generation tasks between Computing Device and Companion Electronic Device could take many forms and could vary from time to time, for example according to the current use case, or according to optimum use of and or to enable the conservation of system resources. Example use cases and task distribution scenarios:

1. Web browsing through Companion Electronic Device user environment
1.1. Scenario A task distribution example
1.1.1. Internet communications using Computing Device cellular or WiFi connection
1.1.2. Web content interpretation and rendering on Computing Device
1.1.3. Rendered web page sent to Companion Electronic Device on demand
1.1.4. GUI frame/gadgets generated on Companion Electronic Device
1.1.5. Web page from Computing Device and GUI frame/gadgets from Companion Electronic Device combined by Companion Electronic Device
1.1.6. Resulting final and complete user environment output by Companion Electronic Device
1.2. Scenario B task distribution example
1.2.1. Internet communications using Computing Device cellular or WiFi connection
1.2.2. Received data sent directly to Companion Electronic Device on demand
1.2.3. Web content interpretation and rendering on Companion Electronic Device
1.2.4. GUI frame/gadgets generated on Companion Electronic Device
1.2.5. Web page from Companion Electronic Device and GUI frame/gadgets from Companion Electronic Device combined by Companion Electronic Device
1.2.6. Resulting final and complete user environment output by Companion Electronic Device
1.3. Scenario C task distribution example
1.3.1. Internet communications using Companion Electronic Device cellular or WiFi connection
1.3.2. Received data sent from Companion Electronic Device to Computing Device
1.3.3. Web content interpretation and rendering on Computing Device
1.3.4. GUI frame/gadgets described on Computing Device according to instructions from Companion Electronic Device
1.3.5. Rendered web page sent to Companion Electronic Device on demand
1.3.6. GUI element description sent to Companion Electronic Device on demand
1.3.7. GUI generated on Companion Electronic Device according to element descriptions sent from Computing Device
1.3.8. Web page from Computing Device and GUI frame/gadgets from Companion Electronic Device (based on Computing Device element description) combined by Companion Electronic Device
1.3.9. Resulting final and complete user environment generated by and output by Companion Electronic Device
2. Watching streaming video though Companion Electronic Device user environment
2.1. Scenario A task distribution example
2.1.1. Internet communications using Computing Device cellular or WiFi connection
2.1.2. Video stream decoding and rendering on Computing Device
2.1.3. Video frames sent to Companion Electronic Device on demand
2.1.4. GUI frame/transport control gadgets generated on Companion Electronic Device
2.1.5. Video frame from Computing Device overlaid with GUI frame/transport gadgets from Companion Electronic Device, by Companion Electronic Device
2.1.6. Resulting final and complete user environment generated by and output by Companion Electronic Device
2.2. Scenario B task distribution example
2.2.1. Internet communications using Computing Device cellular or WiFi connection 2.2.2. Video stream decoding and rendering on Computing Device
2.2.3. Video frames sent to Companion Electronic Device on demand
2.2.4. GUI frame generated on Companion Electronic Device
2.2.5. GUI transport control gadgets generated on Computing Device
2.2.6. Video frame from Computing Device combined with GUI frame from Companion Electronic Device, by Companion Electronic Device
2.2.7. Resulting video within GUI frame generated by and output by Companion Electronic Device
2.2.8. GUI transport controls output on Computing Device
2.2.9. Transport control input and resulting actions managed by Computing Device
2.3. Scenario C task distribution example
2.3.1. Internet communications using Computing Device cellular or WiFi connection
2.3.2. Video stream decoding and rendering on Computing Device according to resolution requirement instructions from Companion Electronic Device
2.3.3. GUI frame/transport control gadgets generated on Computing Device
2.3.4. Video frame from Computing Device overlaid with GUI frame/transport gadgets from Computing Device, by Computing Device
2.3.5. Combined video frame and GUI overlay sent to Companion Electronic Device on demand
2.3.6. Input/output controls, such as touchscreen or mouse pointer, generated and/or managed by Companion Electronic Device
2.3.7. Final and complete full-screen view from Computing Device displayed by Companion Electronic Device and combined with input/output controls to form complete user environment The novel step in many of these embodiments is a significant reduction amount of the data and the number of times it is moved around the system.

New Technology Features

The PPC concept pioneers many new technology features. Some of these features may apply to one or a number of the possible form factor/use scenario, architecture and PPC enabler combinations, while others may be applicable all possible combinations.

Context Scaling

The concept allows and enables context scaling, in particular but not necessarily exclusively, a "Smart Computing Device/Smart Companion Electronic Device" embodiment could include:

1. Display scaling
1.1. Because the Companion Electronic Device is responsible for generating the user environment, the Computing Device need not be aware of user environment characteristics, such as the resolution of the Companion Electronic Device display. The Companion Electronic Device scales, aggregates and otherwise combines resources from the Computing Device and/or the Companion Electronic Device or just the Companion Electronic Device itself appropriately The Companion Electronic Device could do this for a range of Companion Electronic Devices and or each Companion Electronic Device could do this aggregation and combining independently.
1.2. The Companion Electronic Device could undertake appropriate display and display asset/element (such as UE graphics or video) scaling, if such mechanisms are not already present in the Computing Device OS, or in combination with such mechanisms in the Computing Device OS.
1.3. Elements provided by the Computing Device could be scaled to full or partial Companion Electronic Device screen sizes using mechanisms already present in the Computing Device OS. The Companion Electronic Device may instruct the Computing Device system to prepare UE elements for the alternative screen size, which could be the full size of the Companion Electronic Device display or a portion thereof. Android is an example of an OS that could run on Computing Device and be instructed to or "managed into" providing appropriately scaled elements by Companion Electronic Device.
1.4. Applications could be rebuilt/replaced to run in the Companion Electronic Device environment to leverage the larger display, using graphics, data and other assets present on the Computing Device. For example, the Computing Device's application launcher could be replaced as previously described in Section 6. An embodiment could be for the Companion Electronic Device to query the list of applications available (possibly as tokens) on the Computing Device which are then used by the Companion Electronic Device to build an application selection screen within its own UI. The Companion Electronic Device's application selection screen could combine applications residing on Computing Device and Companion Electronic Device and run on either the Computing Device or the Companion Electronic Device.
2. Application scaling, which could include:
2.1. Optimising the experience of the application to Companion Electronic Device environment e.g., Use of surround sound software speakers in the Companion Electronic Device or use of a trackpad interface
2.2. Additional feature availability (functionality scaling), such as adding printing capability when docked and or connected to a Companion Electronic Device
2.3. Full PC-style browser when connected, such as by changing user agent profile and UE. Another example would be to use Computing Device as a modem with local Companion Electronic Device browser
2.4. Enhanced application A/V experience such as 3D graphics and surround sound
2.5. Taking advantage of OS system capabilities which allow applications to use greater or lesser screen real estate, if it is available, such Android's Fragments or similar capability in other OSes.
2.6. In another example, applications (or the system on behalf of applications) could recommend to display or automatically display on the most appropriate screen if multiple screens or cameras that are available in the system, for example a smaller screen in a Computing Device and a larger screen in a Companion Electronic Device. For example:
2.6.1. Telephony applications could display on the smaller Computing Device screen whilst a word processor or browser could display on the larger Companion Electronic Device screen.
2.6.2. Video or movies could display on the larger Companion Electronic Device screen, perhaps with transport controls on the smaller Computing Device screen.
2.6.3. A camera on a computing device or on a companion electronic device to act in a modified way using different focus and or other settings when it is used in a specific mode such as video conference mode for example.

3. OS scaling, which could include:
3.1. Additional applications and/or new OS or capability (running locally on the Companion Electronic Device), for example:
3.1.1. Peripheral drivers, etc.
3.1.2. New applications
3.1.3. Power/thermal management
3.1.4. Optionally using an additional and perhaps more familiar OS such as a PC OS on the Companion Electronic Device.

Intelligent Status and Mode Management

Figure 4:
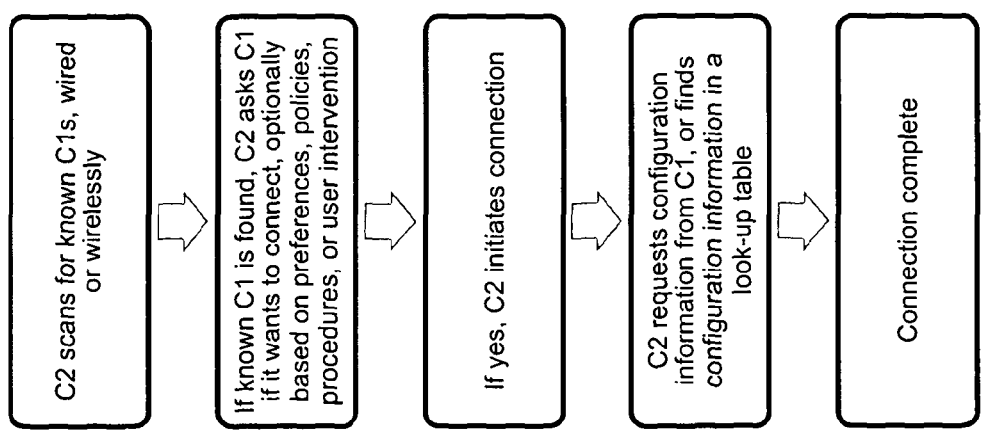
Figure 5:
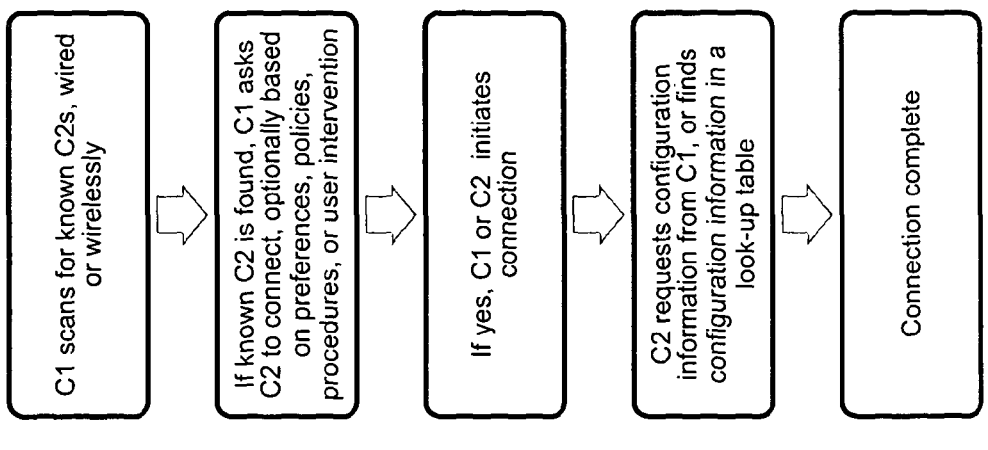
Figure 6:
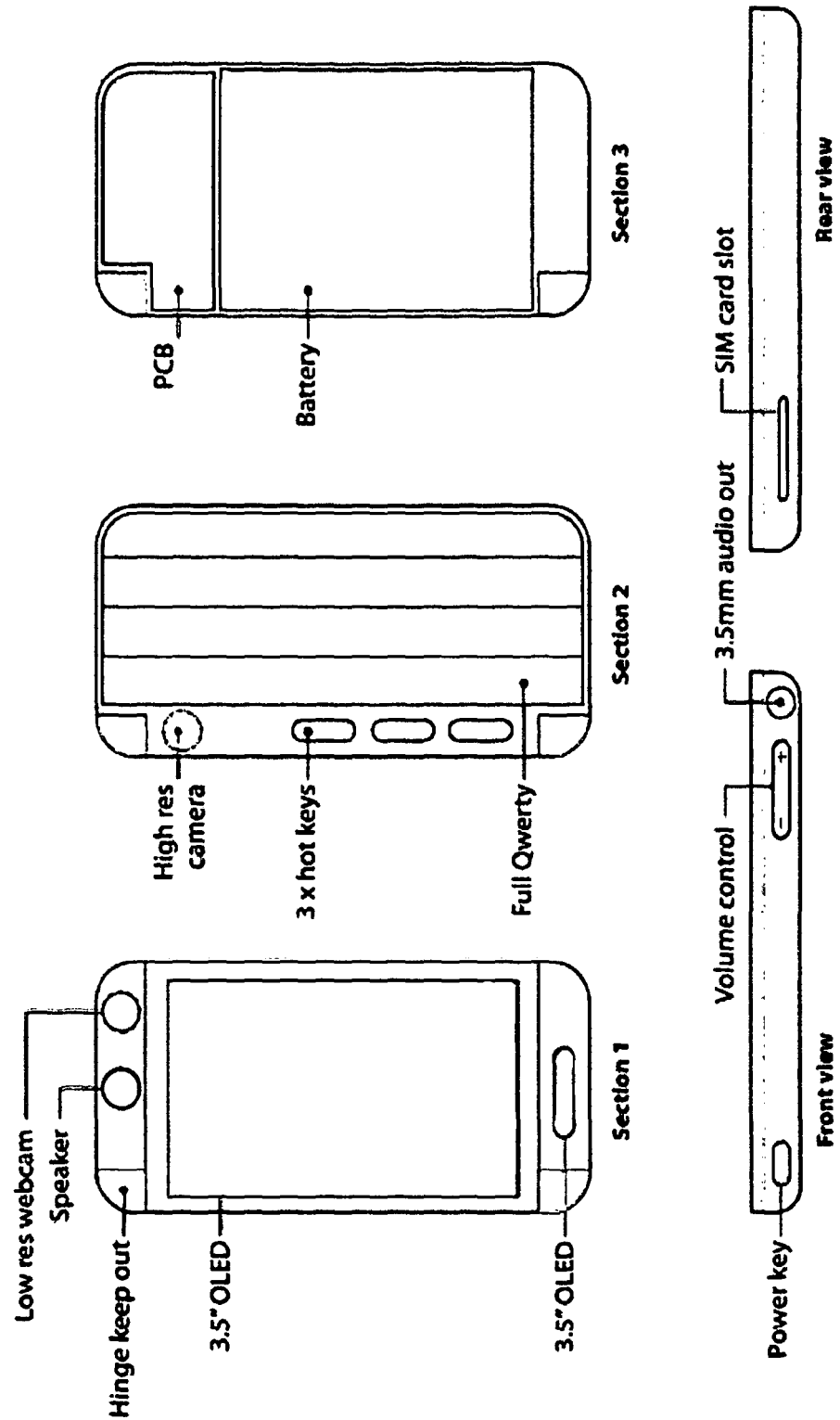
Figure 7:
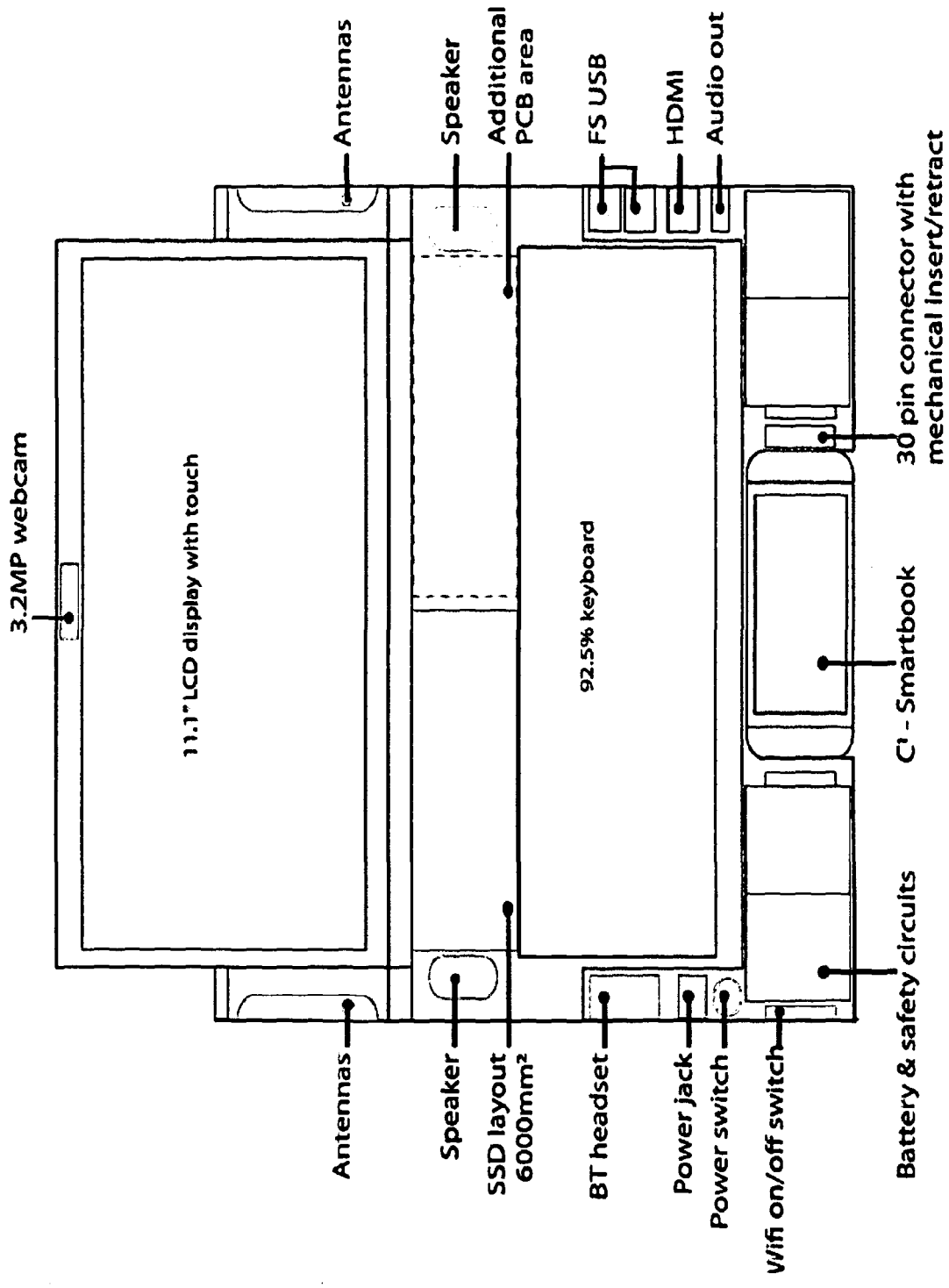
Figure 8:
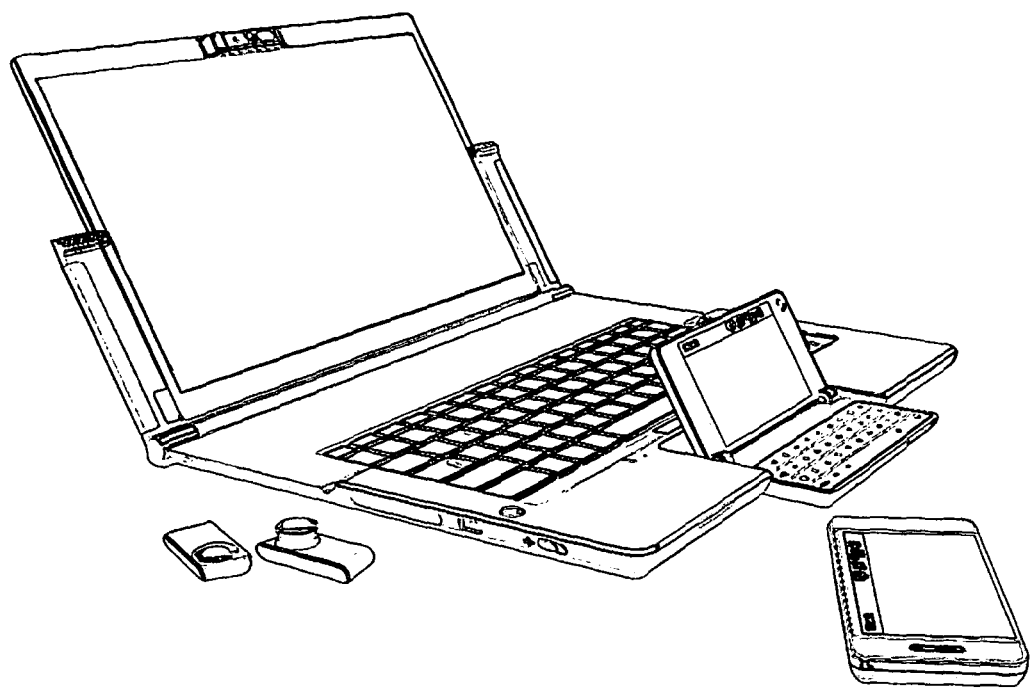
Figure 9:
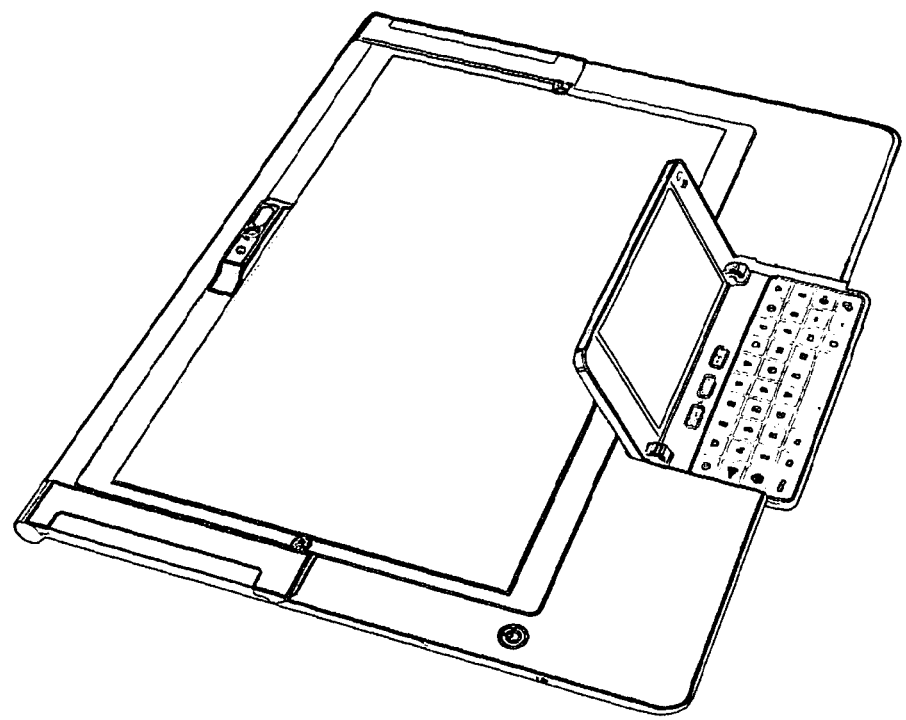
Figure 10:
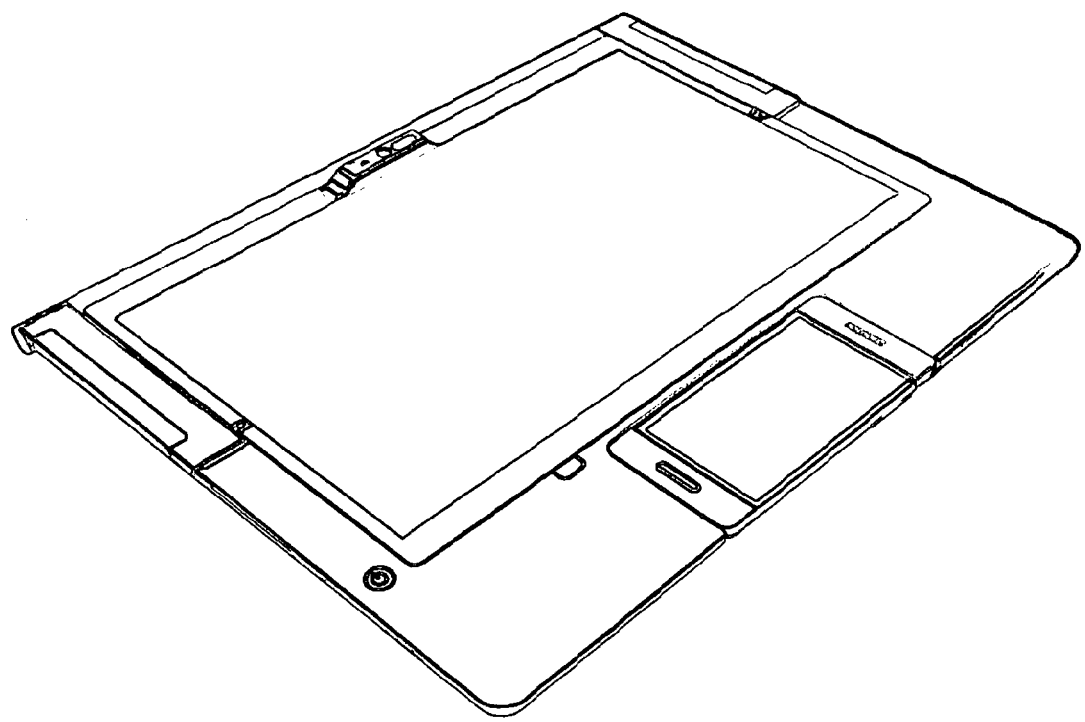
Figure 11:
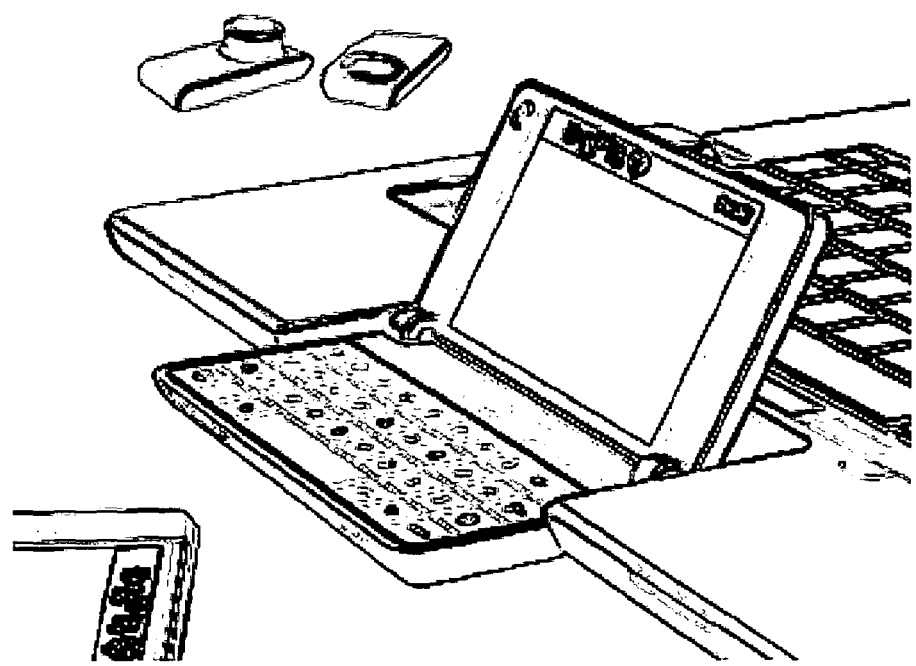
Figure 12:
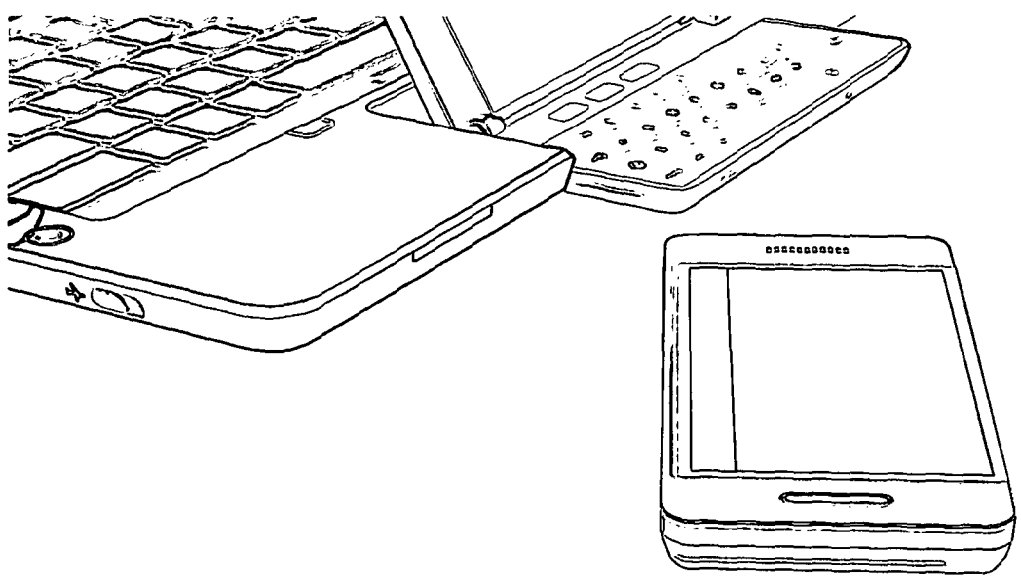
Figure 13:
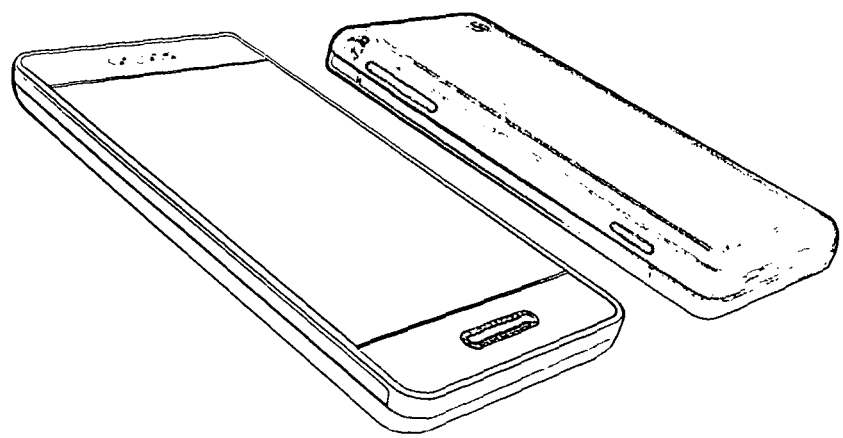
Figure 14:
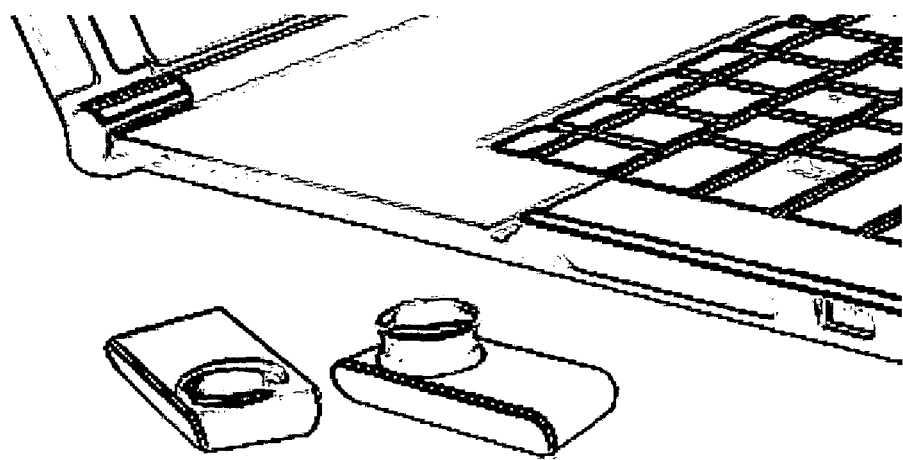
Figure 15:
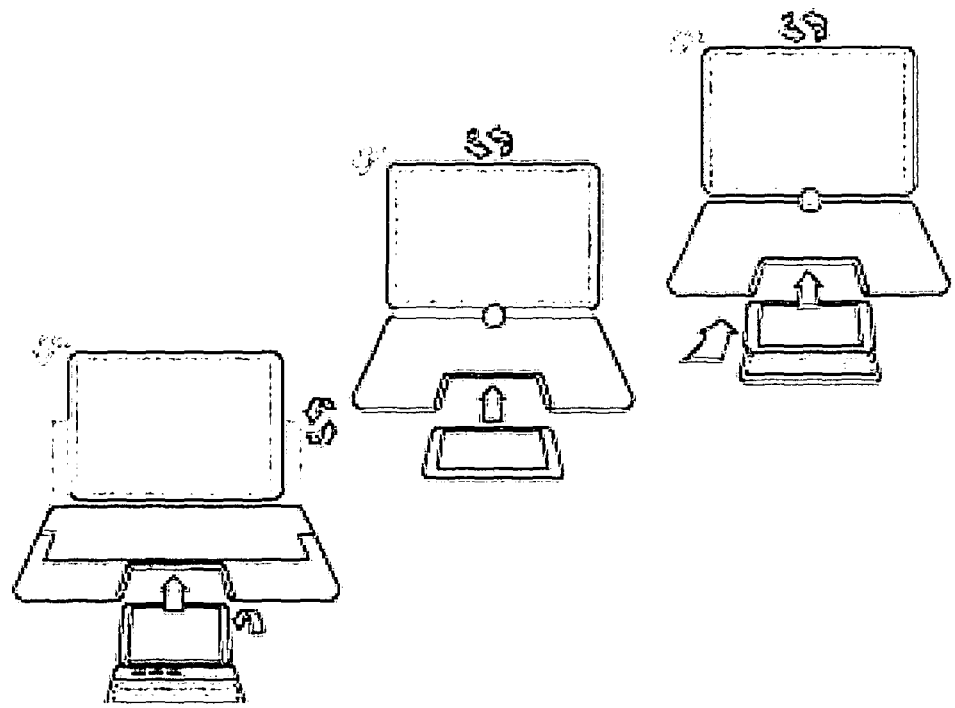
Figure 16:
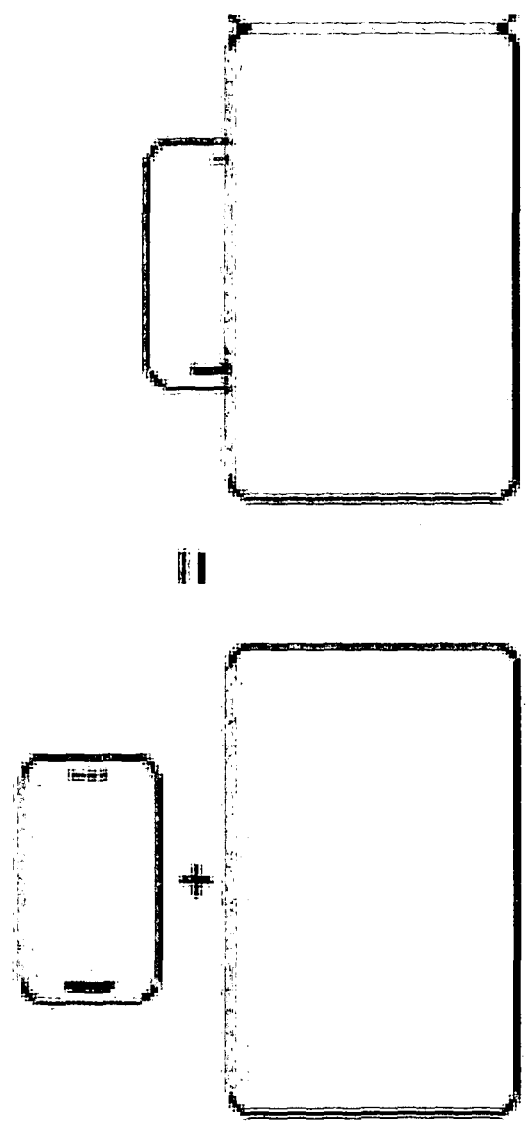
Figure 17:
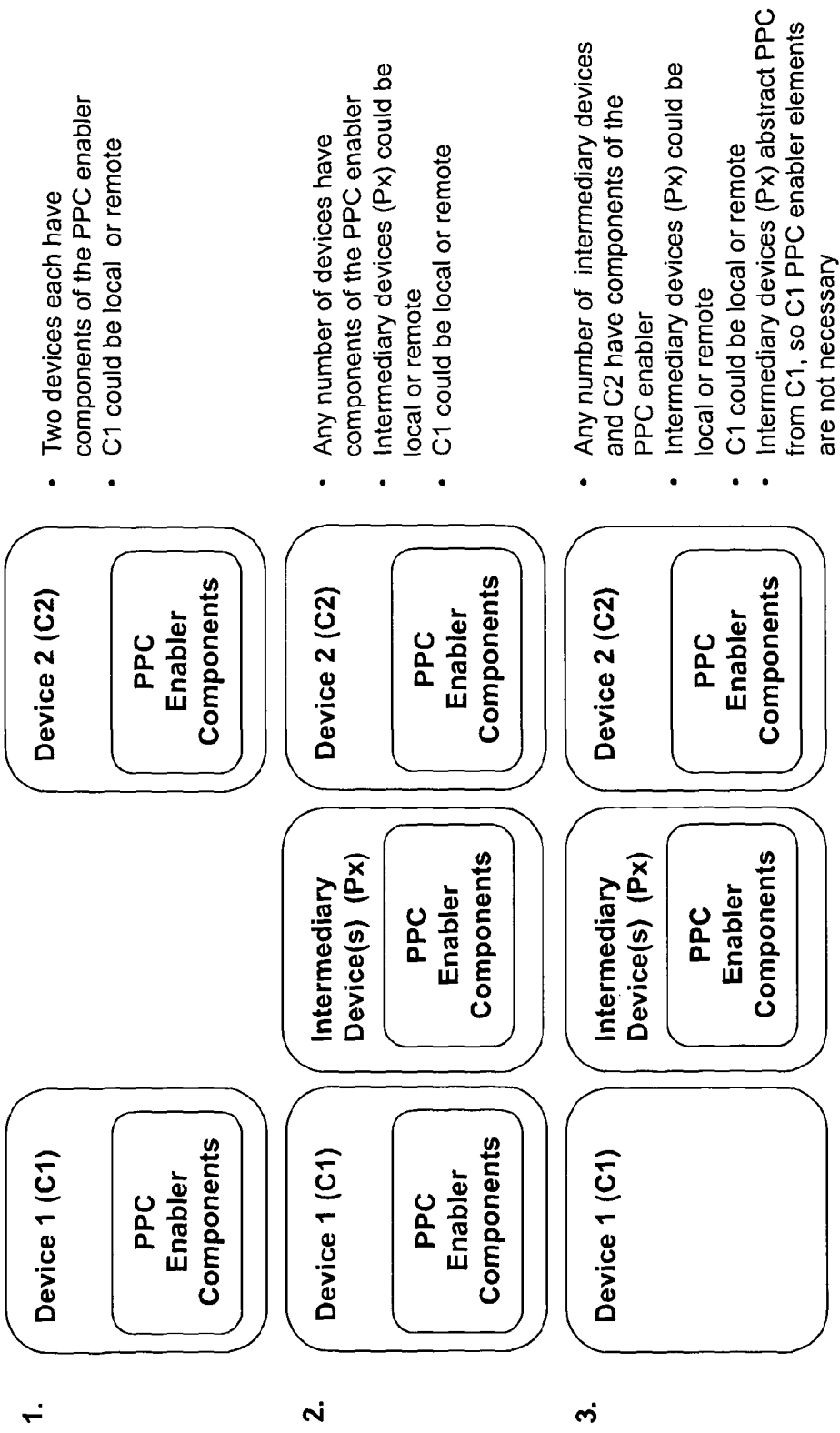

The PPC concept includes a number of functionalities to intelligently or manually manage status and modes.
1. Preference settings
1.1. Computing Device and Companion Electronic Device could each be a master or a slave device—For example, one Computing Device could be a master to another Computing Device (which still being a slave to the Companion Electronic Device), acting as a game controller, for example.
1.2. The Companion Electronic Device can be a dumb device or a smart device.
1.3. The extra functionality can be a drop out box or a plug in device
1.3.1. Drop out box=PhoneWrap, for example, a portable dock that attaches to the mobile device which in turn connects wirelessly to a Companion Electronic Device or an add on module to the Companion Electronic Device.
1.3.2. Plug-in device=Computing Device docks into Companion Electronic Device or an intermediate device.
1.4. The settings on the Computing Device can tell the Companion Electronic Device what preferences the user wants and what mode they want to be in; or the settings on the Companion Electronic Device can tell the Computing Device what preferences the user wants and what mode they want to be in
1.4.1. Companion Electronic Device user preferences are stored on Computing Device so that user preferences can be consistent across multiple Companion Electronic Devices
1.4.2. Computing Device user preferences, for example Computing Device application settings are also stored on Computing Device
1.5. Also, the settings on the Computing Device can tell the Companion Electronic Device what preferences the user wants and what mode they want to be in.
1.6. Companion Electronic Device could automatically detect the Computing Device and ask if it wants to connect; Computing Device answers based on a user preference on Computing Device.
See example detection flows in FIGS. 4 and 5.
2. Switch off
2.1. The switch off devices can be a soft switch off or a hard switch off
2.2. Soft switch off can be turning down system elements, changing mode, etc.
2.3. The Computing Device can remember what the last user status was, and what the last preference settings were when the Computing Device user last logged in to the Companion Electronic Device, or vice-versa.
2.4. The Companion Electronic Device unit can have auto-switching between Computing Device mode and computer mode and headset mode (Bluetooth or wired headset)
3. Antennas
3.1. Computing Device and Companion Electronic Device could have independent antennas
3.2. Switch antennas based on mode between the Computing Device and Companion Electronic Device could have conductive or inductive coupling of Computing Device antennas to the Companion Electronic Device to improve radio/antenna performance of the Computing Device.
4. Telephony mode—Examples include:
4.1. Using the Computing Device user environment rather than the Companion Electronic Device environment to handle incoming and outgoing calls, e.g., displaying incoming call notifications and playing the ringer through a phone handset rather than the PhoneTube and television that it may be connected to.
4.2. Routing call audio through a Bluetooth or wired headset rather than through the audio input/output components of either the Computing Device or the Companion Electronic Device.

Intelligent Power & Processing Management

The PPC concept provides for many benefits of intelligent power and processing management.
1. Prioritizing the Charging Process Traditional charging schemes for Computing Devices and laptops are very simple relating only to the charging of the battery in a single device from any external power source and the operation of that Computing Device when certain charge levels are met within the battery. The new scheme which describes the interaction between the two sets of batteries will require adaptations to the Computing Device charging software, which may be provided dynamically by the Companion Electronic Device on a case by case basis, additional icons on the Computing Device screen and the development of a "configuration" or "settings" application to allow the user to modify the charging behavior and limits.

Adding to the power and charging options of the Computing Device is one of the benefits of PPC. The additional set of batteries that can be contained in the Companion Electronic Device "dock" provides a benefit to the user even without the much broader use options that the dock affords.

There are five separate modes to consider:
Charging of batteries/use of external power in the Computing Device when Computing Device is alone
Charging of batteries/use of external power when Companion Electronic Device is alone
Charging of batteries when Computing Device is docked without external power
Charging of batteries/use of external power when docked and plugged into an external power source
Computing Device charges or powers Companion Electronic Device
In addition it is important that the amount of charge left in the Computing Device and dock, when a device is being charged and the source of that charge are all clear to the user via the displays of the Computing Device and or the Companion Electronic Device dock. This could be achieved by way of example by using icons in the display of the Computing Device and or Companion Electronic Device and arrows to show the direction of charge.
1.1. Charging of batteries/use of external power in the Computing Device when Computing Device is alone—This is simple and will be determined by the Computing Device manufacturer—there is no change required to current methods used.
1.2. Charging of batteries/use of external power when dock is alone.

The batteries will be charged whenever the external power is connected. This can be signaled to the user by the presentation of a simple display (e.g. A battery filling up) or if there is no display by way of example a colour changing LED which will show red when the battery is below a usable limit, for example flash when charging and become green when fully charged. When external power is connected the dock could be driven from this source to conserve the battery charge, excess charge current will be used to charge the Computing Device and Companion Electronic Device batteries if required.

1.3. If the battery is below its useful charge limit the whole dock should be operable from the PSU which should be capable of providing charge to the battery and simultaneously to power to the dock unit.

1.4. Charging of batteries when Computing Device is docked without external power If the Computing Device battery is below a set limit x % and the dock batteries are above y % then the Computing Device battery will be recharged from the dock battery and the Computing Device will be operated from either its own battery or the Companion Electronic Device dock battery.

If the Computing Device battery is below a set limit m % and the Companion Electronic Device dock batteries are below n % then both could conserve their power for themselves. This assumes the batteries are running low and the user would want to keep the function of the dock Companion Electronic Device. This behavior can be changed by the user. By way of example, it can be overridden by the user in the "settings" application to allow "emergency" use of the dock battery to power the Computing Device.

These limits x, y, m and n should be configurable via software. The limits can be factory defined in the software prior to shipment or can be set up by the user.

The display of the Companion Electronic Device may show that the dock is charging the Computing Device as well as showing its own charge status—it may use of two different symbols for the two batteries to avoid confusion. The system may also use different warnings to indicate that low battery condition exists on either the Computing Device or Companion Electronic Device.

All indications related to charging and charge status of the Computing Device may be visible at all times on the Companion Electronic Device dock display as the Computing Device display may be turned off in some situations to conserve power or be used for another application (e.g. as a mouse).

1.5. Charging of batteries/use of external power when Computing Device is docked and dock is plugged into an external power source When connected the external power may be used to provide power to the Companion Electronic Device dock and or the Computing Device and recharge all or some of the batteries of either device.

The display of either the Companion Electronic Device and or Computing Device shows which battery is charging as well as the charge status of the other battery—the system may use different symbols for the different batteries to avoid confusion.

If the Companion Electronic Device dock does not have a display it may have another indicator which indicates to the user that it is charging the Computing Device.

One method of controlling the charging schemes is the use of USB "on the go" with the dock and Computing Device able to interchange their master/slave identities within the scheme.

1.6. Computing Device charges/powers Companion Electronic Device In some cases, the user may wish for Computing Device to power or charge Companion Electronic Device, for example when external power is not available for Companion Electronic Device, and its batteries are very low or are depleted. In that case Companion Electronic Device could be powered and/or charged by the batteries or external power connected to Computing Device, based on user action or user preference settings.

1. Up Scaling and Downscaling

It is critical in any mobile solution to maximise the usage time between charges and to efficiently manage the power and thermal characteristics of the unit. The greater the usage time the greater the utility provided to the user. This element of the invention governs the way in which the processors (especially multicore units) in the Computing Device are controlled to maximise performance and reduce current drain and heating impact. This control covers but is not limited to, Computing device and companion electronic device system and processor and memory clock rates the number of cores active at any time and overall processor active periods, the variability of clock rate selection dependent on battery charge state as well as a deep sleep mode used in the computing device and or companion electronic device(s) when not connected to each other. The clock rates used will vary by mode as defined elsewhere in this document and may also depend on the intensity of CPU usage required. Prior art exists for the manipulation of clock rates within a PC or Computing Device as a single device. The novel part of the invention is that the clock rate used for a given state or for a given type of content e.g. web browsing or game play will vary based on the available power to the overall system specifically the case where a Computing Device unit or a Companion Electronic Device is wirelessly and or physically docked and connected to external power this may take the form of additional batteries and or power for another source such as mains power in a physically docked mode the Computing Device and Companion Electronic Device units will be able to increase/decrease the System voltage and or current (or an element of the system voltage, and or current e.g. processor or memory only) to in addition the system clock speed (processor, memory, bus, and internal/external interfaces), can be adjusted as can settings such as the display brightness, system element power states (e.g., audio electronics is switched off if no audio required), enabling/disabling I/O ports or internally buses etc enabling an optimum overall configuration of the Computing Device and Companion Electronic Device dependent on the application and the available power to the system. The effect of physically docking and or connecting wirelessly or otherwise the Computing Device or Companion Electronic Device may enable an enhanced active or passive thermal solution such as a fan or a heat sink to be enabled with the Computing Device and or Companion Electronic Device or in another device in one embodiment a cooling system on the companion electronic device could be used to cool a physically connected (docked) Computing device, Cooling systems will allow the Computing Device and or the Companion Electronic Devices to be kept cooler allowing System voltage and or current (or an element of the system, e.g., processor or memory only) to increase in addition the system clock speed (processor, memory, bus, and internal/external interfaces) could also increase their speeds in an extreme case to in effect allow "overclocking" of the system of the Computing Device or Companion Electronic Device in a connected mode e.g. to operate outside of its typically performance boundaries through the use of this enhanced cooling system Further changes to the performance of the system could be made depending on the system preferences such as display brightness, system element power states (e.g., audio off if no audio required), enabling/disabling ports, etc. This will allow an optimum configuration of the system based upon the application being executed on the Computing Device and or Companion Electronic Device, the available power to the system and the thermal environment of the Computing Device and or the Companion Electronic Device.

In another embodiment the computing device(s) and the Companion Electronic Device(s) can communicate to each other their respective battery and or thermal states and based upon a policy, preference or procedure can reassign the computational tasks currently being executed or scheduled to be executed to each other or to a server they may be connected to in order to reduce power consumption on either device or to reduce the thermal activity on either device or to put the activity on to a device or server which has enhanced thermal capabilities so as to more effectively deal with thermal loads in the overall system.

The upscaling/downscaling of the Computing Device or the Companion Electronic Device docked/connected system parameters could be invoked by these application-specific power availability or thermal characteristic based on one or any combination of these methods.

Additionally, Computing Device and/or Companion Electronic Device could request or require to distribute processing tasks between each other dynamically, based upon battery voltage and or thermal status for example, when the two devices come into close proximity of one another or when one's battery power is low.

In these or in other embodiments, the Computing Device and the Companion Electronic Device may additionally communicate other status information to each other in order to facilitate upscaling/downscaling or other behavior modifications, such as one device using capabilities of the other device in preference to its own. Examples of such status communications could include but are not limited to: Available general purpose processing power, availability or presence of specific processing capability (such as the presence of a graphic processing unit). available runtime or storage memory, battery capacity, peripheral availability, function availability (e.g., camera).

This invention can be implemented via specific hardware or software/firmware changes to the processors used with the computing devices and or the companion electronic devices or servers connected to them or by software on the devices by an application or at the OS kernel or firmware level or other software means or be used alone or in conjunction with the invention below to create new p states for the smart Computing Device processor when the unit is docked. It is also possible to generate multiple new p states for any processor depending on the charge levels of the batteries within the dock.

2. Solving the Issues of Higher and Lower Voltages and Powers in Multiple Devices Used in Multiple Configurations It is critical in any mobile solution to balance performance (including speed) with the usage time between charges and to efficiently manage the thermal characteristics of the unit. This element of the invention governs the way in which the operational voltages of key components in the system are altered when the Computing Device is docked and therefore able to access an additional power source and different thermal resources. This control covers but is not limited to amending the voltage and current supply within and to the processor units and memory depending on the type of activity being performed e.g. lower voltage for playing background music, higher voltage for encoding video or playing games. It also covers the amendment of the voltage and current of processor units and memory depending on the battery charge status and also the amendment when physically connected to the Computing Device. E.g. the computing device uses a higher voltage when able to access the companion electronic device power source and able to utilize its enhanced thermal capabilities. Prior art exists for the manipulation of silicon voltage within a PC or Computing Device as a single device. The novel part of the invention is that the voltage used for a given type of content e.g. web browsing or game play will vary based on the available battery charge and can therefore be higher when the Computing Device is physically connected and able to use the thermal resources and power supply capability within the companion electronic device.

The Computing Device could have multiple or variable power supplies of different voltage, or power for example, that could be used for lower power/higher performance, etc. software and or hardware contained within the processors present with the computing device or elsewhere within the computing device and or software running on the computing device such as Firmware, RTOS, OS and or applications could enable or invoke these modes. The companion electronic device could also have multiple or variable power supplies of different voltage, or power for example, that could be used for lower power/higher performance, etc. software and or hardware contained within the processors present with the companion electronic device(s) or elsewhere within the companion electronic device(s) and or software running on the companion electronic device(s) such as Firmware, RTOS, OS and or applications could enable or invoke these modes.

This invention can be implemented via specific software on the devices at the kernel level or firmware level or be used alone or in conjunction with the invention above to create new p states for the smart Computing Device processor when the unit is docked. It is also possible to generate multiple new p states for any processor depending on the charge levels of the batteries within the dock.

The Companion Electronic Device can instruct the Computing Device to operate in particular modes and therefore to use (or not) particular Computing Device resources. Different classes of Companion Electronic Devices could instruct the Computing Device to operate in different ways. See, for example, PPC enabler architecture splits.

There may also be thermal/mechanical/electromechanical elements in the dock which are designed to work in conjunction with the Computing Device and provide additional cooling and or heat dispersion, for example to allow the Computing Device processor to operate at a higher clock rate (for example but not limited to outside of its nominal performance envelope, i.e., overclocking) without overheating than it could when not docked with such a thermal solution not present.

Alternatively or additionally, the Companion Electronic Device could invoke physical dispersion of memory usage in either the Computing Device or Companion Electronic Device. This physical dispersion of memory usage would result in heat generated by memory usage to be spread out over a larger physical area that it would be if the Computing Device or Companion Electronic Device continually accessed physically adjacent portions of memory. In addition to reducing overall heat generated, an additional benefit could lower power consumption, for example, by making the use of active cooling measures such as fans or other techniques, or passive cooling measures, less necessary. Furthermore, bill of material cost and system complexity could be reduced by the exclusion of these cooling elements. Also, the elimination of these cooling components could enable smaller, lighter, thinner and less complex devices.

Additionally, because the Companion Electronic Device contains its own processor and memory, the Computing Device will generate less heat and use less processing power than it would if it were generating the Companion Electronic Device environment as well as operating its own system. Additionally, memory, processing power, etc., that would otherwise be needed on the Computing Device to run the Companion Electronic Device environment as well as the Computing Device environment are not necessary, also enabling smaller, lighter, less complex devices.

Arm (or Other Auxiliary) Antennas

As previously mentioned, either Computing Device or Companion Electronic Device could have auxiliary antennas, or could bridge antennas, for use by the other device. In the case of a laptop-style Companion Electronic Device, for example, these antennas could be located in the display arms.

1. This can improve reception and transmission
2. A larger antenna in Companion Electronic Device can achieve same performance (or better performance) at a lower power as a smaller antenna can achieve in a Computing Device at higher power.
3. Companion Electronic Device WiFi could act as a bridge between the Computing Device and a more distant access point, improving effective throughput to the Computing Device.

Bluetooth Functionality
1. Computing Device and Companion Electronic Devices could include Bluetooth headset communication, implemented for example as a "sidebar" that docks into the device:
a. The sidebar can pop out so the user can make a call
2. Bluetooth device behavior could be determined by policies, preferences or procedures. Examples include:
a. The Bluetooth headset could switch on when the Computing Device rings and is answered. Bluetooth headset could be docked and switched off, then automatically switched on at an incoming call.
b. Switching on at incoming call will reduce the apparent time taken to connect when the call is answered.
c. Active Bluetooth headset audio could trigger a behavior of Computing Device, Companion Electronic Device or another device, for example turning off the display or music playing while in call.

Wi-Fi On/Off

Computing Device and/or Companion Electronic Devices could include WiFi or other wireless communication capability. The devices could allow for WiFi functionality to be managed in common.

WiFi provides an alternative to the Computing Devices cellular connection. It provides many advantages to both the user and operator in reducing cost. The disadvantage of WiFi is that it requires a relatively high current and therefore has a significant negative impact on battery life. This invention maximizes the use of and users control of WiFi as a lower cost connection whilst protecting the overall battery life.

Could implement policies to turn on or off WiFi based on Computing Device/Companion Electronic Device configurations, and location or other methods. For example, a feature could enables the Computing Device to switch off the WiFi in the Computing Device. This and other WiFi functionality could be controlled through preferences, policies and procedures. Examples include:

User can turn WiFi on and off with a physical switch in the dock or a software switch based on connection to the dock The WiFi status, i.e. on or off, will be visible to the user at all times through use of either an LED on the dock or message or icon on the screen of the dock and/or Computing Device.

User can set WiFi to be the preferred connection if available

When the Computing Device is roaming or in a specific location (detected by the cellular network or cell ID on which it is camped) the Computing Device can select WiFi as its preferred connection automatically and turn on the WiFi radio. This will significantly reduce data roaming costs when a WiFi connection is available. When it sees its home network code again it will turn off the WiFi radio if the user has set the default state to be WiFi off to conserve battery performance.

When it is physically docked and able to access greater battery power the Computing Device can enable WiFi automatically or based on instruction from Companion Electronic Device. The Companion Electronic Device can send differentiated instructions based on information provided by the computing device and or Companion Electronic Device.

When it detects that external power is connected the Computing Device can switch on WiFi automatically or be instructed to by the Companion Electronic Device to do so.

When the battery levels fall below a preset level in the Computing Device and/or dock WiFi can be switched off by the software in the Computing Device or the Companion Electronic Device unit to reduce current drain.

An application could include an enable/disable WiFi" function that will allow the Computing Device to turn on or off the WiFi radio based on the nature of the operation being performed. E.g. when the web browser is launched it will turn on the WiFi radio but when the page is closed the Wifi hardware and software will be shut off to conserve power. This function could also be made available to third party application developers via an API.

WiFi on/off based on location as derived from cell ID, GPS, or other, etc.

Signal-Less Display

Future embodiments of the phone powered computing concept may have a wireless display to allow the display to fully rotate, be separate or to be removed from the Computing Device, e.g., Tablet style device with optional full hard key keyboard and mouse Wireless optional module, also referred to as PhoneWrap, that may contain additional batteries, enhanced antenna, other electronics.

Multi-Modal Opportunities

Different types of Computing Devices and Companion Electronic Devices have their own characteristics, such as different screen sizes, input methods, etc. The multi-modal PPC solution allows both Computing Devices & Companion Electronic Devices to work with essentially infinite different Companion devices, and in many different ways.

Some examples of the multi-modal nature the PPC concept include:
1. The device can be all in one, or different modules can be applied for different personalities.
1.1. "Device" could be Computing Device or Companion Electronic Device or other devices.

1.2. "Module" could be a software module or a hardware module, or a combination thereof including but not limited to as referred to in other embodiments in this document.

1.3. "Personalities" could be combination user environment elements, form factor, user interface look or feel, user interface type, power profiles, processing profiles, data access profiles, user configuration profiles (different display, audio, I/O) etc.

2. Modal use cases may include, for example:

2.1. Companion Electronic Device alone—In the "Smart Computing Device/Smart Companion Electronic Device" embodiment, Companion Electronic Device could operate on its own without connecting the Computing Device since it has its own OS, processor, memory, etc. The Companion Electronic Device could also run its own apps 2.2. Computing Device as a master 2.3. Companion Electronic Device as a master 2.4. Computing Device with multiple Companion Electronic Devices 2.5. Computing Device as modem for Companion Electronic Device. For example, Companion Electronic Device providing additional wired or wireless connectivity for Computing Device Computing Device used independently while connected wired or wirelessly to the Companion Electronic Device, e.g., answer a call with Computing Device Computing Device as input device peripheral for the Companion Electronic Device, e.g., transport controls for video, game controller, mouse, etc., or vice versa, for example, as a "phone mouse":

2.5.1. The Computing Device can become a mouse (e.g., using the camera in the Computing Device to detect movement in 2D or using sensors to detect movement in 3D) and could have:

2.5.1.1. An accelerometer 2.5.1.2. An optical sensor 2.5.2. The mouse can allow rotational push/pull/zoom/reduce/pinch etc 2.5.3. The Computing Device can be used to "throw" or "flick" pictures or files to the Companion Electronic Device or other devices/units 2.5.3.1. Using sensors 2.5.3.2. Using touchscreen 2.6. The Computing Device can be used in place of a stylus for a touch based Companion Electronic Device display, e.g., by "writing" in the air using sensors to detect movement 2.7. Computing Device could be a remote pointing device 2.8. The Companion Electronic Device can be used as the Companion Electronic Device for multiple Computing Devices 2.9. Sharing/synchronization of data between Computing Device and Companion Electronic Device 2.10. Copying of Computing Device memory to Companion Electronic Device for use independently of Computing Device 2.11. Copying/sharing/using of Computing Device memory for use while Computing Device is connected 2.12. Copying back to the Computing Device and/or the companion electronic device sync 2.13. Security provision, e.g., persistence of data on Companion Electronic Device only while connected to Companion Electronic Device for public kiosk scenarios; private device with permanent persistence; or access to certain classes of data (based on profile settings in either Computing Device and Companion Electronic Device) could be stored on the Companion; data permanently stored on the Companion Electronic Device could be secured and tied to a particular device 2.13.1. SQL or other method could be used to manage file systems 2.13.2. SyncML or other method could be used to sync data between devices 2.13.3. Backup of Computing Device data on Companion Electronic Device to local or peripheral memory 2.14. Gaming mode—Computing Device and Companion Electronic Device could work together in a gaming mode to enable gaming on a larger display. Variations could include 2.14.1. Wired or wireless video/display transmission from Computing Device to Companion Electronic Device to vice versa 2.14.2. The use of wired or wireless gaming controller peripherals as input devices to the Companion Electronic Device or Computing Device operating as a gaming controller for Companion Electronic Device or vice versa 2.14.3. Multiple Computing Devices or Companion Electronic Devices connected for multi-player gaming 2.15. TV mode (10 foot mode)—User environment adapted for a typical living room/television set-up where the display screen and input controls are relatively distant from the user and where there may be multiple users/viewers. This mode is contrasted with, for example, a desktop computing-style mode where the display screen and input controls are relatively close to the user and the user is more likely to be alone. Key adaptations include ensuring that the graphical user interface is legible and comfortable to use at the relatively far distance and that input controls are within reach of the user. Example adaptations may include:

2.15.1. Larger text in the GUI 2.15.2. Re-layout of the GUI, especially simplification 2.15.3. Replacement with alternatives of input methods that require close proximity, such as touchscreen, with those that do not, such as cursor or pointer control 2.15.4. Wireless or otherwise more convenient input controls such as keyboards, trackpads and remote controls Furthermore, TV mode may optimize the experience of typical living room use cases, such as streaming media consumption, by for example, prioritizing those tasks above other system tasks which may be less important for the usage environment, such as realtime incoming email handing.

Also, notification or other behaviors may be adapted to the usage environment. For example, text message or email previews may be displayed on the screen automatically in a handheld or desktop usage environment, where the user can reasonably expect privacy. In TV mode, however, it is more likely that the user may not have privacy and may, therefore, wish that message preview not be displayed. In this example, TV mode could include discrete notification of incoming messages without displaying previews or correspondent details.

2.16. Video conference mode—For example, Computing Device could be held by the user in order to use its microphone instead of relying on a remote mic or mic array on Companion Electronic Device See more about video conference mode in the next section, Multi-use display and camera.

2.17. The Computing Device can be a projector

3. In the "Smart Computing Device/Smart Companion Electronic Device" embodiment, Computing Device doesn't need to know Companion Electronic Device's characteristics 3.1. Required software on the Computing Device could be application level rather than below application-level changes, making it more likely that Companion Electronic Devices could be used generically with "any" Computing Device 4. Modes for multiple users—Useful for families and small businesses and schools 4.1. For small businesses and schools only a few Companion Electronic Devices will be needed, so employees and students just plug in at work/school, and take home their work to plug in at their Companion Electronic Device home device.

4.2. State persistence 4.2.1. The Computing Device or Companion Electronic Device could include permission profiles, for example, to block Facebook at work, or parental controls, access through corporate firewall at work 5. Could be ruggedized device adapted to its environment 5.1. Computing Device could dock into ruggedized Companion Electronic Device dock, for example with a resistive keypad that can be used with gloves, such that an unruggedized Computing Device is transformed into a ruggedized Companion Electronic Device The Companion Electronic Device could also expand capabilities of Computing Device as a work tool, for example.

6. Multi-docking 6.1. The Computing Device can be docked into (wired or wirelessly connected with) multiple Companion Electronic Devices including:

6.1.1. A display 6.1.2. TV 6.1.3. Large home/office display 6.1.4. Keyboard 6.1.5. Wireless charging pad 6.1.6. Induction charging pad 6.1.7. Any other type of device as mentioned throughout this document or other types of devices Multi-Modular Concept A user may be looking for the low cost, optimal performance and portable solution for a given usage case. The nature of the solution will vary between users and even for the same user in different scenarios. This variety means that a modular based approach may provide the greatest utility.

For example, a tablet style device.

In a low cost embodiment the Computing Device will physically dock with the display utilizing all the key components of the Computing Device (accelerometer, compass etc.). This would be an example of an "all in one solution". However the user may wish to keep the Computing Device easily accessible to be able to receive calls whilst using the tablet and choose to connect to the display with a wireless connection. The user will then slide a wireless module into the tablet in place of the Computing Device, enabling wireless connectivity to the Computing Device.

The wireless (or other) capability of the Computing Device may not be sufficient to provide the performance that the user requires in which case an accessory, referred to as PhoneWrap is connected to the Computing Device to improve amongst other things its battery and antenna performance and additional wireless radios if required.

Alternatively, Computing Devices may connect directly without the need for a phone wrap device to a Companion Electronic Device, if it has sufficient capability to do so.

Finally, the user may wish to connect additional speakers, keyboards or other peripherals to the Computing Device or Companion Electronic Device. The elements when used together form a multi modular concept.

See also possible form factor & use scenario figures.

Computing Device could also be used in a laptop like configuration, either docked or wirelessly connected. If Computing Device is not sufficiently capable, the same PhoneWrap could be used with a laptop like solution already described hence the modules can be reused in multiple embodiments.

A further embodiment could be to connect Computing Device to a television or monitor, possibly with an keyboard, trackball or mouse.

Additional configurations of the multi-modular concept include:

1. The user can choose different parts for different uses/preferences (e.g. gaming, office, small business, family). It will be possible to incorporate an Atom processor (or similar, such as an ARM- or MIPs based or other processor) into the Computing Device or Companion Electronic Device, and/or add Windows or other operating systems to a Computing Device or Companion Electronic Device.

2. There could also be 2 or more cores in the Computing Device or Companion Electronic Device, which can be plug-ins.

2.1. Further processing improvements could be provided for Computing Device by Companion Electronic Device or vice versa, for example to render complicated graphics on Companion Electronic Device that are sent back to Computing Device, this could be useful to reduce the thermal load on the computing device 2.2. Companion Electronic Device could instruct Computing Device to dedicate cores in certain use modes, such as gaming.

2.3. Multi OS and multiple core architectures could be managed by a number of different methods, for example using a hypervisor or other form of software or hardware virtualization.

Multiple embodiments of these options are shown in the HIV/OS and SW system diagram, FIGS. 17-25.

3. The Computing Device could take on a context-dependent role that could take advantage of the combined capabilities of Computing Device and Companion Electronic Device. For example, Computing Device could be an advertising or information module, so that the Computing Device shows ads or products (or different personalities) (or links) when a movie or show is playing.

3.1. Enables functionality based on context. For example, because more activities take place through Computing Device/Companion Electronic Device, more is known about the user's preference and activities, becoming more valuable to advertisers, for example. Computing Device or Companion Electronic Device could use information provided the other or the combination of the two.

3.2. Other examples of functionality based on context include: Recommendations for goods, services or activities, based on present or past behaviour or context. For example:

3.2.1. Browsing or media consumption information from Computing Device could be used for EPG viewing recommendation on a television Companion Electronic Device.

3.2.2. Information regarding activity (shopping, content viewing, etc.) on a Companion Electronic Device could be stored on a Computing Device and later combined with location information, for example to:

3.2.2.1. Provide nearby shopping or dining recommendations 3.2.2.2. Offer deals at nearby bricks and mortar outlets for good browsed online.

3.3. Content augmentation, for example, additional information about a program that you are watching.
4. Other products can be plugged into the device(s), including but not limited to:
4.1. Plug-in Femtocell Board
4.2. Plug-in Picocell Board
4.3. Plug-in Wi-Fi unit
4.4. Plug-in TV tuner
4.5. Plug-in large scale projector
4.6. Plug-in wireless receiver
4.7. Plug-in iPod/music player dock
4.8. Other peripherals as described throughout the document.

In whole or in part, these additional products, may form part of the PPC system and can be used to implement some of all of the embodiments incorporated in this document.

Multi-Use Display, Camera & Sensing

The displays, cameras, and sensing capabilities of Computing Device and Companion Electronic Device could be used in multiple ways, including:
1. Presentation mode
1.1. Where the display can be turned around so others can see the display. See, for example, FIG. 33.
1.2. The Computing Device can be used by the presenter as the key device (allowing for example, notes and prompts to be seen by the presenter but not the audience).
1.3. The Computing Device and Companion Electronic Device can run in parallel for a presentation, so the viewer(s) looks at the slideshow/presentation on the Companion Electronic Device display, but also looks at the presenter on the Computing Device display. The presenter talks to and controls the presentation and can point to the device as it knows where it is. The Companion Electronic Device may also display holographic images of the presenter.
1.3.1. The holographic image projection could, for example, allow the presenter to be "present" at the point the where the presentation is being viewed while in reality being physically located somewhere else.
1.3.2. The Computing Device could be used as a controller for the presentation. (See "phone mouse" discussions.)
1.4. Multi-use display modes for the "Smart Computing Device/Smart Companion Electronic Device" embodiment may take advantage of fundamental capabilities of the concept, e.g.,
1.4.1. Computing Device and Companion Electronic Device could swap roles.
1.4.2. When docked or on instruction from Companion Electronic Device, the Computing Device could adapt its behaviour, for by simultaneously generating both the UI elements required of it by Companion Electronic Device along with a local UI on the Computing Device display. This local UI may or may not be related to the Companion Electronic Device's user environment or an application running on the Companion Electronic Device.
1.4.3. Additionally, Companion Electronic Device could send data and/or UI elements to Computing Device for display on the Computing Device screen, for processing, or for storage/sync, concurrently or not currently to activity of the Companion Electronic Device.
2. Modal dual screen use cases, e.g.,
2.1. Windows or notifications "pop up" on Computing Device display instead of Companion Electronic Device display, e.g., for privacy or convenience
2.1.1. This behavior could be based on policy or user preference or a user action to transfer the window from one display to the other.
2.2. In video conference mode, a first image displays on Computing Device while a caller's image is displayed on Companion Electronic Device, or could display more callers in a conference on Companion Electronic Device than would fit on a Computing Device screen.
2.3. Location/position information of the two devices relative to one another could be tracked to determine changes in their relative position or location. Location, position and movement information could be from any single or plurality of methods, e.g., GPS, cell-ID, signal strength, accelerometers, altimeters, e-compasses, cameras, microphones/speakers (e.g., for ultrasonic) or other sensors or systems. Use case examples include:
2.3.1. Using one device as a multi-axis controller for the GUI or other UI of the other device.
2.4. Supporting proximity processing/display use case covered elsewhere in the document, such as:
2.4.1. Distributing processing tasks between Computing Device and Companion Electronic Device
2.4.2. Display UI elements or information on one display or the other.
2.5. Supporting security policies, for example "unlocking" capability or data on one device based upon a security key, preference, policy or procedure when the other device comes within a given distance of the other
2.5.1. Security challenge and or access control could appear either on Computing Device or Companion Electronic Device based on policy
2.6. Positioning could use the two cameras to detect deltas in images between the two devices.
2.7. Use position or orientation of one device to control the relative position or orientation of information available to or displayed on the other
2.7.1. For example, 3D TV requires the user's eyes to be horizontally aligned with the TV. You can't, for example, lie on your side to watch 3D TV. One device could be on your person—for example, Computing Device as glasses or a phone in your pocket. When the orientation of that device moves out of horizontal relative to the TV or other display, the first device could relay its orientation to the second device. The second device could adapt its orientation to match that of the viewer. This could be accomplished by physically moving the display, for example with a motor, or by adapting the orientation in software.
3. The system could decide, based on policies or user settings, to display information on the Computing Device screen or Companion Electronic Device screen, or transfer from one to the other based on modal scenarios, e.g., walking in and out or close proximity of Companion Electronic Device while holding Computing Device
4. Augmented reality mode—A "reality", e.g., a video image, captured on Computing Device could be displayed and augmented with information or interactivity on Companion Electronic Device, or by a server connected to either the computing device or the companion electronic device with the augmentation being either done or displayed on the Computing Device or Companion Electronic Device.
5. Gaming mode
5.1. An accelerometer is incorporated in the display of Computing Device and/or Companion Electronic Device allowing it to be used as a gaming device, navigation or pointing device
6. Scanner/Camera—The display can be rotated so the camera can be used as a scanner. Camera use cases include:
6.1. Biometric security, e.g., facial recognition, or fingerprint, iris recognition 6.1.1. This could be used in combination with proximity detection of the computing device and or the companion electronic devices 6.1.2. This could also be used in conjunction with another key or token in the computing device and or the companion electronic device.

6.2. Augmented reality use cases 6.3. Barcode scanning 6.4. Magnification 6.5. Use one device's camera to act as a light sensor, for example to provide information to automatically adjust the other device's display brightness 6.6. As a mouse to sense movement or "clicks" by moving the finger or covering the lens, this information to be used by the computing device and or the companion electronic device or both or by a server they may be connected to 6.7. As stated elsewhere, the two or more cameras could be used for video conferencing use cases 6.8. The two devices' cameras could be used in conjunction with one another to capture 3D video.

6.9. One device's LED "flash" could be used by and or controlled by the other or in conjunction with the other devices camera, for example, providing supplementary light 6.10. Use one device's camera as a scanner (fixed or handheld) for the other device.

6.11. The camera on the computing device or on the companion electronic device can be used in a video conference mode—in this mode a high resolution fixed focus camera or other camera present on the devices might have alternate parameters or it might have its image post processed to compensate the requirements of video conference mode operation such as having the subjects at a further distance from the camera or adopting a wide angle view.

6.12. The cameras on either the computing device and or the companion electronic devices can be used to adjusts factors such s the display brightness and contrast dependent on the ambient lighting conditions as detected by cameras on either the computing device and or the companion electronic device the device can adjust its own display and the other devices displays. In another embodiment of this invention the cameras and applications running on either the computing device or the companion electronic device can work together or combination based upon the type of applications being run and or displayed on either the computing device or the companion electronic device to adjust the display or other characteristics of the computing device and or the electronic computing device.

Environment Switching & Management

This allows the user to switch environments from one device to another; the computing device and or the companion electronic device allow and enables the storing of the device state or device status of themselves respectively and or each other.

Device Status may refer to, for example current hardware or software settings or requirements of any of the devices in the system, which may be related to the usage environment of any of the devices, including for example, the Computing Device, the Companion Electronic Device or another device such as a server.

Device State may refer to, for example, the past, current or scheduled/planned activities running on the device, such as the fact that the web browser is open and the page which is being viewed or the recently viewed page history. This may be the device state of any of the devices in the system, including for example, the Computing Device, the Companion Electronic Device or another device such as a server.

1. RTOS 1.1. Peripherals, configurations, preferences, etc. in or connected to one device, e.g., a printer, WAN connection preference, could appear as if they are in or connected to the other device. This can work in both directions.

2. OS 2.1. OS, elements or updates could be loaded from one device to the other 2.2. OS execution could be distributed between the two devices 2.3. Preferences and settings, including registry settings and user preferences 2.4. Extend the capacity, capability and features of the OS in one device with others that are available in the other device (s)

3. Applications—As mentioned elsewhere applications could:

3.1. Switch execution between the computing device and or the companion electronic device, running one device's application on the other, or on a server.

3.2. Application status or data is acquired from the computing device and or the companion electronic device and or a server to be used with a running application on the computing device and or the companion electronic device and or a server 3.3. Application capability can be extended to take advantage of additional resources. See, for example, Android Fragments discussion, and examples of one device using the resources of the other or on server 3.4. Applications could also limit capability, e.g., if a required hardware component is not present in the computing device and or the companion electronic device. For example, a music player that enables track switching based on a shake of the device as detected by sensor could remove this capability when being display on a computing device and or the companion electronic device that lacks that hardware capability.

3.4.1. Applications could also provide for an alternative way of accessing functionality if the usual way is not present in the second device. In the above example music track switching could instead be enabled through, for example, a hardware key present on the second device.

3.5. Data & files 3.5.1. See also discussions of data access, transfer, security and sync elsewhere in this document.

3.5.2. Data & files from the computing device and or the companion electronic device and or a server could be made available to the other the computing device and or the companion electronic device and or a server unhindered, limited or fully open through preferences, procedures or policies.

3.6. GUI 3.6.1. See also elsewhere in the document for options regarding GUI creation and management between Companion Electronic Device and Computing Device.

3.6.2. Sharing, switching or modification could be in whole or in part (or not at all) though preferences, procedures or polices.

3.7. Physical elements, e.g., input/output controls or components 3.8. Display preference, e.g., which elements to show on which device's display 3.9. Settings & preferences 3.9.1. Setting and preference information of Computing Device(s) or Companion Electronic Device(s) could be made available to the other of Computing Device(s) or Companion Electronic Device(s), either partially or fully, modified or unmodified based on preferences, policies and procedures.

3.9.2. The computing device(s) and or the companion electronic device(s) may also have alternative configurations, settings, or preferences that come into play when the devices are connected, enabling an enhanced configuration that is not available or relevant to either device independently.

3.9.3. Settings and preferences may also control the behavior of either the computing device(s) and or the companion electronic device(s) and or server(s) connected to either of them.

3.9.3.1. For example, Computing Device(s) or another device might prompt settings changes on Companion Electronic Device(s) to adapt the GUI display to the user's particular want or need, for example, to increase font size if the user has impaired eyesight or to increase loudness if the user is hard of hearing.

3.9.3.2. Another example of this concept would be to apply cosmetic UI settings such as colour, wallpaper, etc., on the computing device(s) and or the companion electronic device(s) based on settings from the other.

3.9.4. Switching could be initiated by user action or by policy settings or both 3.9.5. Peripherals, configurations, system or user preferences, etc. in or connected to the computing device(s) and or the companion electronic device(s) and or a serve(s)r, e.g., a printer, WAN connection, preference, could appear (modified or unmodified) as if they are in or connected to one or more of the other devices. This can work in both directions.

3.9.6. Companion Electronic Device(s) environment could be switched on (enabled) or skinned to match the look and feel of the Computing Device(s). For example, if the Computing Device is an iPhone, the Companion Electronic Device environment, including locally generated elements, could adapt itself to mimic the look and feel of related operating systems/UIs. By the same principle, Companion Electronic Device could adopt a Windows, Android, Chrome or other looks and feel based on the type of connected device.

See also earlier state retention, persistence, etc., discussions.

4. Companion Electronic Device user experience could be transferred back on to Computing Device(s)

5. Data and state information could be retained in both directions:

5.1. From Computing Device(s) to Companion Electronic Device(s)

5.2. From Companion Electronic Device to Computing Device, e.g., walk away using Computing Device with the email that you were writing on Companion Electronic Device Independent Display Management This allows independent management of displays in the Computing Device or Companion Electronic Device or other devices/units, such as peripherals devices or a server(s)

In this embodiment of the invention the independent management of the displays provides for one or more of the following, which could be initiated by Computing Device, Companion Electronic Device or another device, such as server, according to proximity, preference, policy, procedure an event or a user action:

One display to be turned off while the other is (or, others are) on. The different displays to be different resolutions The different displays to be different sizes The different displays to use different display parameters such as contrast, brightness, color saturation, etc. levels triggered for example, by a software program receiving data by sensors, cameras, policies procedures, content type, application type, algorithms, user settings, etc.

The different displays to show different views, information or content from the same application Controls for a video player on the Computing Device and the video itself on the Companion Electronic Device screen Magnification of content on one screen of the other Two different views of a game, for example from each player's perspective An EPG on one device, possibly with program preview, while watching content on the other.

The different displays to show views, information or content from different applications at the same time. E.g., the Computing Device to show an SMS message that has just been received and the Companion Electronic Device screen to show a video. For example:

Answering a call on the Computing Device while browsing or watching a video on the Companion Electronic Device display Controlling music playback from the Computing Device while browsing on the Companion Electronic Device The different displays can be used together, for example to physically extend a single view across multiple displays One display could be used to show subtitles in a selected language for video content being watched on the second display. This use case could also work in public settings such as a cinema where the cinema media system, the associated audio system, etc., acted as a Companion Electronic Device. A variation of this idea could also or instead transmit an alternative audio track, for example in a different language, for listening through a Computing Device, for example with headsets in a public cinema.

This independent control is achieved by software on the Computing Device and/or Companion Electronic Device, for example alterations to the driver, library or kernel layers of the Computing Device and possibly the provision of one or more API's for Application Developers to access the operational modes above. Computing Device and/or Companion Electronic Device can also manage/change/generate display attributes and characteristics dependent on activity, conditions or characteristics of the other device.

Multi-Token Interaction

The device can interact with other types of token, including by way of example only:

Bracelet

Ring

Pen

Magnetic/smart card

ID badge

Any Wirelessly enabled device including Computing Device or Companion Electronic Device themselves An embodiment of multitoken interaction could be through incorporation of NFC capability into Computing Device or Companion Electronic Device. Information exchanged could include profile, security or access rights and could be used to enable or disable specific functionality on the Computing Device or Companion Electronic Device. Examples include:

Payment

Internet content access restriction

Font size and other UI elements, e.g., for the visually impaired

Audio or subtitle settings, for example for the hearing impaired or for use in an alternative language.

Another embodiment is that the above and other examples could be enabled by the Computing Device and Companion Electronic Devices themselves corning in close proximity of each other.

Hot-Swappable Cells 2 or more batteries on the front, back or sides with hot-swappable cells.

In many but not all embodiments, it is intended that the Computing Device or Companion Electronic Device be a mobile solution and hence will require their own batteries as well as the ability to connect to an external power source. These batteries can also charge or be charged by the other device's batteries, including but not limited to Computing Device or Companion Electronic Device. As there may be several separate batteries or battery cells these will also be able to be "hot swapped" meaning that a one or more batteries can be removed without losing power to the Companion Electronic Device or Computing Device even if no external power source is available. The battery can then be replaced with a different charged battery. Individual batteries that have been replaced can then be charged by use of a separate charging station or by reinserting them in the dock and connecting the dock to an external power source or by the other batteries.

This embodiment is considered unique because phones and PC's today do not contain "hot swappable" batteries and lose power if the battery is removed without an external power source connected.

Automatic Back Up

Back up could take place immediately when you plug in the phone and or other Computing Device/Companion Electronic Device type. Alternatively, this could take place with other alternative connection methods, including wireless.

As the Computing Device becomes a replacement for your PC it is essential that a range of backup options are available within the PPC concept. Here the term "plug" can be defined as a physical or wireless connection. Existing solutions do not rely on the docked status of the Computing Device or Companion Electronic Device to trigger the back-up process.

The options include:

Limited content (the user specifies the content types to be backed up in the PPC settings applications) back up to:
Memory within the Computing Device/Companion Electronic Device
External memory via USB or other connection to the Computing Device/Companion Electronic Device
Back up to a server over a private home or office network—in this option WiFi could be enabled automatically to reduce data costs and off load data from the Operators network. If the user has turned WiFi off in their Computing Device it will then turn off automatically once the back-up is complete.
To cloud based storage via WiFi or cellular connection.
Full content back up
Memory within the Computing Device/Companion Electronic Device.
External memory via USB or other connection to the Computing Device/Companion Electronic Device
Back up to a server over a private home or office network—in this option WiFi will be enabled automatically to reduce data costs and off load data from the Operators network. If the user has turned WiFi off in their Computing Device it will then turn off automatically once the back-up is complete.
To cloud based storage via WiFi or cellular connection.
This back up is a background function that could run with a defined task priority within the operation.
There could be a visual indication to the user that the back-up is taking place such that the user will not disconnect the Computing Device from the Computing Device/Companion Electronic Device (physically or wirelessly) without understanding that the back-up is not yet complete.

The back-up process could be initiated as soon as the presence of the Computing Device/Companion Electronic Device is detected by the Computing Device or vice versa. The user will select the destination and content types for the back-up storage in the settings part of the software that runs on the Computing Device or Companion Electronic Device.

When data is backed up to a source that may be deemed by the user as "less secure" e.g. a memory card it will be possible to encrypt all or some of the data or add a security code to access it. This security code could be as simple as data from the users SIM card or a 4 digit user code. Some organisations are likely to want a far more secure access in which case an application on the Computing Device will encrypt all data prior to storing it with a key based algorithm that will also be required to read or restore the data stored.

Back-up could also extend to back-up of the memory of other connected or integrated devices, for example the content of a SIM card or the content of a connected USB flash drive or memory card.

An alternative or additional embodiment of the automatic backup capability would be for the system to automatically back up Computing Device to Companion Electronic Device or vice versa when wireless signal strength began to degrade. Signal strength degradation (as measured by RF power, quality of service, bit error rate or other metric) could indicate that the user was taking one device out of range of the other. The backup could instead be automatically prompted, giving the user the opportunity to agree to backup and to remain within the coverage area until the backup is complete.

In the case of a non-wireless connection, the system could prompt for back-up before the device is physically disconnected. If no removal prompt is required before disconnection, the system could prompt the user to reconnect the device for back-up/sync following a disconnection if back-up/sync were not complete.

Similarly, automatic or automatically prompted backup could also be triggered by other cases such as:

Low battery on Computing Device or Companion Electronic Device
Switch off of either device (back up before completing switch off)
Application closure or application sent to background
Reaching a given threshold of amount of data added or changed
A set amount of time between back-ups having passed
Automatic backup behaviour could be determined by preferences, policies or procedures. This could include monitoring the amount of data changed or added and triggering backup either with any change or with change of a set amount or percentage.

This embodiment could be especially useful, for example, in a public Companion Electronic Device "kiosk" scenario to ensure that all changes or additions were backed-up and synchronized to Computing Device before the user left the public kiosk.

In another embodiment, as mentioned elsewhere in the document, automatic back-up could take the form of periodic or continuous data and or software (including but not limited to OS, apps, etc.) synchronization between, for example, a mobile Computing Device and a home, office, network or cloud (e.g. a server) based Companion Electronic Device (or vice versa), in order to ensure data consistency between or among the devices. This back-up could be triggered and managed as with any of the above methods, or with other methods.

In the case that the devices are not in proximity with one another but each has a connection to the internet (or to another public or private network), the devices could be periodically or continuously backed up and/or synchronized via that network connection based on preferences, policies or procedures and/or some or all of the above methods.

Bumped Up Camera

See also multi-use display, camera and sensor section and Independent Display Management section.

See also Computing Device/Companion Electronic Device peripheral device management and sharing throughout the document.

1. "Bumped up" refers to higher capability, performance, etc., that is modal

2. Computing Device and Companion Electronic Devices could each have any number of their own cameras which could be used independently or in conjunction with one another to perform various functions which could include but are not limited to any of the following use cases. These use cases are enabled by the novel combination of cameras from two or several different devices in the PPC system, which could be managed in whole or in part by software residing on Computing Device, Companion Electronic Device, both, or another device.

2.1. Taking photos, including 3D or panoramic, taking advantage of the combination of Computing Device and Companion Electronic Device or Cn cameras 2.2. Capturing videos, including 3D, taking advantage of the combination of Computing Device and Companion Electronic Device, or Cn cameras 2.3. Video calling or conference calling 2.3.1. This could include taking advantage of multiple Computing Device and Companion Electronic Device or Cn cameras to each capture a different caller or callers' image which could then be combined or aggregated in software. For example, two users on one side of the call could be captured respectively by the Computing Device and Companion Electronic Device cameras while sitting in different parts of the room or in different rooms. The separate callers' images could then be combined in software into one calling view that is sent to the user on the other side of the call. The link between the devices and by extension their cameras could be a direct link or could be through an intermediate device such as a server.

2.3.2. In another embodiment, a user could, for example, use one camera to send an image of something else, for example a salesperson to show to a prospective purchaser, a product alongside an image of themselves as captured by a second camera.

2.3.3. In another embodiment, multiple cameras could be used to capture a 3D image stream from transmission to the other caller.

2.4. Webcamming—Video calling and video conferencing examples could also apply to webcamming.

2.5. Authentication or other security features as mentioned elsewhere in this document 2.6. In games, for example to track device or user movement or to provide a background image or game field for the gameplay 2.7. Motion detection, such as for security 2.8. Other multi-camera use cases such as a "mirror" to see behind you by, for example, aiming the Computing Device camera at your back while looking at the image for that camera in front of you on Companion Electronic Device.

Security Features

The PPC concept enables and could be supported a number of security features, including:

1. Remote kill—to enable remote killing of one or both or all devices 1.1. Remote kill could include deleting data on the remote device, disabling communication, rendering the remote device completely unusable, or any combination of these or other actions.

1.2. Remote kill could be manual or automatic, and it could be triggered by any number of preferences, policies and procedures.

1.3. Remote kill could be combined with the automatic back-up feature to back-up content on the remote device to another device or server prior to deleting the data on the remote device with remote kill.

1.4. Remote kill could benefit from the previously mentioned preference back up as well as app, sw, OS and data backup/synchronization, for example retaining the state of a lost or stolen remote device. This state could then be applied to a new replacement device.

1.5. Remote kill could include "killing" of any connected or integrated devices, for example USB flash drives or memory cards.

1.6. Further, remote kill could us the retained internet connection of the local device, for example Companion Electronic Device, to kill any services associated with that device. For example, this could include automatic notification to add the device's IMEI and/or IMSI (or equivalents) to a lost/stolen service blacklist.

2. Synchronisation—Computing Device can synch with Companion Electronic Device or vice-versa and/or with other devices and/or with the cloud. It can be all devices or just some.

See also earlier discussions of synchronization.

3. Authentication—See earlier description under camera and multitoken. Other examples include:

3.1. Separate passwords for Computing Device and Companion Electronic Device that combine to form an authentication key through a software method to allow permissions specific to that combination of Computing Device and Companion Electronic Device. Companion Electronic Device could have a common password to be used with many different Computing Devices or independent passwords.

3.2. In an embodiment a teacher could have a Companion Electronic Device password that, together with her Computing Device password, would enable administrator access while pupil's Computing Device passwords with the same or different Companion Electronic Device passwords would only allow restricted access.

3.3. In another embodiment, a service technician's Computing Device and Companion Electronic Device password combination could enable a service mode at a public kiosk Companion Electronic Device.

3.4. Voice print authentication in isolation or combined with any other authentication method could be enabled with a Computing Device, for example, for access to a Companion Electronic Device that does not have its own microphone.

Wireless Video/Display and Data Transmission

Wireless connections between Computing Device and Companion Electronic Device (and also other devices) could offer many practical and convenience benefits compared to wired connections. For example, a Computing Device could be left in a briefcase and or a pocket while accessed through a Companion Electronic Device. Or a tablet-style/notebook style/display Companion Electronic Device could be made especially thin and light without the need to physically dock a Computing Device into it.

However, wireless video/display transmission, especially, presents challenges. The connection between the devices must be robust, of sufficient bandwidth or if bandwidth is limited use techniques such as real time compression to reduce the signal's bandwidth requirements the use of compression can cause problems in situations where low latency is required such as gaming and or GUI interactions such as pinching or zooming on a Companion Electronic Device display, In many embodiments of Companion Electronic Device's video/display transmission, audio and use input/output events will be done concurrently also be sent in the same and/or opposite direction, and may require the adoption of a schema. This schema could use standardised protocols such as H.264 and MP3 for video and audio encoding and standardised USB protocols for data transmission and the passing of control signals between the Computing Device and the Companion Electronic Devices. Furthermore, other video or data streams, such as a live camera video stream, may also need to be sent concurrently. Such systems could also use non standardised or proprietary protocols to function In a wireless embodiment, wireless video transmission with low latency could be achieved using:
1. IEEE 802.11n or similar point-to-point connection between Computing Device and Companion Electronic Device.
2. A transmitter/receiver combination/system that has the required bandwidth and power to transmit and receive video/audio and data between the devices, this system may or may not use encoding techniques to allow for multipath and or other radio effects which could cause the received signal to be corrupted.
3. A progressive transfer mechanism that encodes and transfers a frame in portions, e.g., 1/10 horizontal slices, rather than frame-by-frame.
4. Dynamic reduction in Frame rate and in resolution dependent on the usage scenario with an application such as Gaming for example in certain game play modes or within a game mode display resolution and or frame rate may be reduced and or increased thus altering the bandwidth and hence compression requirements and consequently reducing latency of the system, as with less Information to compress the compression process can be executed faster.
5. The system could down scale video on the transmission side for example from Computing Device to Companion Electronic Device with downscaling happening on the Computing Device and then upscaling on the Companion Electronic Device after the video has been received (post processing) to restore the quality of the original source video—this downscaling/upscaling could be done through simple techniques such as reducing the scan rate of the video signal (or a data representation thereof) it could also be done by line skipping e.g. transmitting only the odd or even lines in a frame.
6. The techniques described in 5 could be augmented by adding information regarding the frame such as the number of lines of the original source e.g., it was 1080 P or colour/contrast information this could be transmitted along with the video signal (or a data representation thereof) for use by the Companion Electronic Device when upscaling the video to restore the original quality of the frame. This could be achieved using hardware or software methods.
7. The techniques above could also be adopted in a fixed setting for example when gaming always use a lower frame rate/resolution or scan frequency as opposed to being dynamically implemented by either Computing Device and or Companion Electronic Device
8. In another embodiment of this invention the physical and or wireless or network interface between the computing device, the companion electronic device (s) or network they are connected to can be switched from one type of interface to another type e.g. Bluetooth to WiFi and or the interface characteristics of any of the connected devices can be adjusted to suit the capabilities of either the computing device(s) or the companion electronic device(s) dependent or resources available to them such as the companion electronic device(s) having a enhanced capability interface. This altering of the interface type or characteristics can be triggered by the interface environment e.g. The presence of interference on a particular type of interface or by the use or running of different applications that require or are more suited to a different type of interface connection. It may also be triggered by other characteristics, statuses or states, such as available system power of either device, thermal status and/or capability of either device, or the presence of additional hardware or interfaces (e.g., one device is compliant with the faster 802.11n standard while the other device is only compliant with the slower 802.11g).

Key Concepts

A computing device operable to work in conjunction with a companion electronic device, in which the computing device and the companion electronic device each have their own electronics and/or own operating system and each is able to construct a partial or complete user environment;

in which the computing device is operable to send data to the companion device, on request of the companion device, which the companion electronic device then uses to locally construct its own user environment, in whole or in part.

The user environment for the computing device and the companion electronic device is the complete set of software and hardware components that together provide for output to and input from a user, where a user is a person, persons or another device (for example, for machine to machine (M2M) applications).

The following features may be implemented in the above device, and may also each be independently novel and inventive over the above concepts:

The computing device may include at least one processor core and that core is used, under the instruction of the companion electronic device, to provide and/or generate the data that is sent from the computing device to the companion electronic device and to provide services to the companion electronic device. The core may be used in conjunction with other electronics, (e.g., application-specific ICs) to provide and/or generate the data that is sent from the computing device to the companion electronic device and to provide services to the companion electronic device.

The computing device may communicate over an interface or interfaces with the companion electronic device, where the interface(s) include one or more of the following: a physical connection, a wireless connection, or a network connection, and in which the computing device and companion electronic device may be local or remote to one another.

The computing device may send data to the companion electronic device that:

includes elements that are directly or indirectly used in the user environment of the companion electronic device, using mechanisms on either the computing device and or the companion electronic device.

is, at the companion electronic device, combined with elements generated locally at the companion electronic device to build the companion electronic device user environment, in whole or part.

includes one or more of: content (for example, audio or video information and or media), data (for example device data, network data, user data, application data), application results, applications themselves, input/output, user feedback, information and/or data.

The computing device may provide:

services or additional capabilities on request to the companion electronic device.

functions including application execution on the computing device, elements of which of which are provided to the companion electronic device.

The computing device may be operable to detect the presence of the companion electronic device, or the companion electronic device may be operable to detect the presence of the computing device. The computing device and/or the companion electronic device adjusts its functionality in accordance with this detection. Where the computing device is not operable to detect the configuration of the companion electronic device, then the companion electronic device may be operable to (i) detect the configuration of the computing device or (ii) to inform the computing device of the companion electronic device's configuration, or (iii) to instruct the computing device to operate in a manner which is suitable for the companion electronic device's configuration without actually sharing configuration information.

The computing device in conjunction with the companion electronic device, when in a linked state, act independently to display information shared between them in a manner consistent with policies, preferences or procedures on each device and/or a server that either device is connected to and or generated independently, in a manner consistent with policies, preferences or procedures on each device.

The computing device may send data that is an abstraction or generalisation of data and/or information that defines a user environment and therefore may not be specific to any single type or class of companion electronic devices, but instead can be used by the companion electronic device to construct the user environment appropriate to fit with its own configuration, settings or capabilities. The data abstractions may be tokens. The data abstractions may use industry standard or de facto standard methods such as XML or Flash. A graphical image may be described and sent by the computing device using a method such as the Scalable Vector Graphics (SVG) specification of XML or another standards or non-standards based method and be interpreted and rendered by the companion electronic device.

User environment elements may be sent from the computing device as commands or library calls which are then received, interpreted and executed by the companion electronic device.

The computing device may receive changes back from the companion electronic device, or from another devices/servers connected to the companion electronic device, so that the computing device maintains the master, definitive data set.

The companion electronic device may receive changes back from the computing device, or from another device connected to the computing device, so that the companion electronic device maintains the master, definitive data set.

The computing device may receive changes back from the companion electronic device, so that data coherency is maintained between the devices. The companion electronic device may receive changes back from the computing device, so that data coherency is maintained between the devices.

The changes on either the computing device or the companion electronic or devices or servers connected to them may include any of: OS changes, user data, application changes and status; configuration changes and status; and/or device settings, configuration and status. The changes may be exchanged continuously and asynchronously based upon an event, policy, preference or procedure.

The computing device may retains its device status, and/or the status of the companion electronic device or any connected server. The companion electronic device may retains the status of the computing device and/or any connected server. A connected server may retains the status of the computing device, and/or the companion electronic device.

The computing device and or the companion electronic device may retain state persistency, information, such as maintaining browsing session, open applications, application state, device state, etc., when connecting to, operating with, or disconnecting from one another.

The companion electronic device may also retains state persistency information, such as maintaining browsing session, open applications, application state, device state, etc., when connecting to, operating with, or disconnecting the companion electronic device.

Applications resident on one device (the computing device, the companion electronic device or a local or remote server) may be executed in whole or in part on one or more of the other devices/servers; the application execution may be switched from one device to the other device and/or server at any time. Application status or data may be acquired from or shared among any of the devices to be used with the running application. The functionality, capability or behaviour of the application being executed on one device may be extended or modified by utilizing additional or different capabilities of any of the other device or devices.

The computing device may share:

a common physical memory device for the storage and or manipulation of data with the companion electronic device.

a common logical memory device for the storage and or manipulation of data with the companion electronic device.

a common file management system for the storage and manipulation of data with the companion electronic device.

The computing device and the companion electronic device may operate separate physical and logical memory systems and file systems.

The computing device may itself have no knowledge of the capabilities of the companion electronic device. The computing device may be manufactured by a different manufacturer than the companion electronic device. The computing device may not originally have been intended to be operable with the companion electronic device but may be made so operable through the addition of hardware components, software components and/or intermediary or peripheral devices, whether local or remote to the computing device and companion electronic devices.

The computing device may not have continuous interaction with the companion electronic device or continuous access to computational resources on the computing device, hence reducing resource requirements on the computing device, and the companion electronic device interface bandwidth requirements, and power requirements.

The computing device may transmit a video signal (or a data representation thereof) to the companion electronic device, and the video signal (or a data representation thereof) may then be modified/enhanced/adapted on the companion electronic device to be suitable for the user preferences capabilities and/or configuration of the companion electronic device, for example for output on a larger or smaller display or in a larger font size or in 3D.

The companion electronic device may transmit a video signal (or a data representation thereof) to the computing device, and the video signal (or a data representation thereof) may then be modified/enhanced/adapted on the computing device to be suitable for the user preferences capabilities and/or configuration of the computing device, for example for output on a larger or smaller display or in larger font size or in 3D.

The computing device may transmit over an interface an audio signal (or a data representation thereof) to the companion electronic device, which is then enriched or adapted on the companion electronic device for output to the user, for example at a louder sound level or an original mono signal (or a data representation thereof) output as stereo or vice versa, or an original stereo signal (or a data representation thereof) output in surround sound.

The computing device may receive from the companion electronic device over an interface an audio signal (or a data representation thereof), which is then enriched or adapted on the computing device for output to the user, for example at a louder level or an original mono signal (or a data representation thereof) output as stereo, or vice versa, or an original stereo signal (or a data representation thereof) output in surround sound.

The computing device may adapt, switch off or put into sleep mode its resources when in a linked state to the companion electronic device, thus reducing, amongst other things, the power consumption of the computing device. The companion electronic device may instruct the switch off or sleep/reduced activity mode.

The devices may be in a linked state and resources on either device are switched on dependent on one or more of the following: policies; preferences and application instructions.

The companion electronic device may adapt, switch off or put into sleep/reduced activity mode one or more of the following of the computing device: display, display driver, audio drivers, portions of memory, communication systems and components, input and output devices and capabilities and other system elements.

The companion electronic device may adapt, switch off or put into sleep/reduced activity mode its resources in a linked state to the computing device, thus reducing, amongst other things, the power consumption of the companion electronic device.

The computing device may be connected over an interface to multiple companion electronic devices at the same time.

The computing device may be connected over an interface and may be able to switch the interface to another interface or adjust the interface characteristics dependent on the capabilities or resources available to either the companion electronic device or the computing device, or based on the software running on or activities of either the computing device and or the companion electronic device The companion electronic devices may be connected over an interface to each other, whereby one or more companion electronic devices acts as a computing device.

The computing device and any number of other computing devices may be connected over an interface to a single or to multiple companion electronic devices at the same time.

The computing device may enable the control or simultaneous use of the same applications, in whole or in part, or modified versions of the same applications, in whole or in part, or different applications, in whole or in part, on different companion electronic devices.

The computing device and/or the companion device may distribute and/or share computing and or software tasks between the computing device and/or the electronic computing device, in accordance with a preference, policy, procedure or application requirement.

The computing device or the companion device may distribute and/or share data and/or applications between the computing device and/or the companion electronic device in accordance to a preference, policy, procedure or application requirement.

The computing device or the companion electronic device may be able to detect appropriate companion electronic devices for the use of resources and or services or the running of applications dependent on applications being run on either the computing device and or the companion electronic device.

The computing device and the companion electronic device may combine or share their physical, hardware and software resources to make an enhanced system, to reduce power consumption on either device or to improve performance. The computing device may use the antenna system of the companion electronic device. The computing device may offload some or all processing to the companion electronic device. The devices may share power resources. A schema may manage the charging and the priority of charging between the devices.

The computing device and/or the companion electronic device may adjust their computing clock speed for either the processor or the memory or both, individually or in combination in accordance with a preference, policy, procedure or application requirement based upon the system voltage of either the computing device or the companion electronic device.

The computing device and/or the companion device may distribute computing and/or software tasks between the computing device and/or the companion electronic device in accordance with a preference, policy, procedure or application requirement based upon the system voltage of the computing device and/or the companion electronic device.

The computing device and/or the companion electronic device may enable or disable system resources on either the computing device and/or the companion electronic device in accordance with a preference, policy, procedure or application requirement based upon the system voltage of the computing device and/or the companion electronic device.

The computing device and/or the companion electronic device communicate status information to one another in order to facilitate upscaling/downscaling or other behavior modifications, such as one device using capabilities of the other device in preference to its own. The status information communicated may be thermal state information.

The status information communicated may also be one or more of: available general purpose processing power, availability or presence of specific processing capability (such as the presence of a graphic processing unit). available runtime or storage memory, battery capacity, battery voltage, peripheral availability, function availability (e.g., camera). Software, or firmware or hardware may implement a function of communicating the status information; a hardware implementation may be a modification to a microprocessor.

The computing device and/or the companion electronic device may adjusts its computing clock speed for either the processor or the memory or both in accordance with a preference, policy, procedure or or RTOS, OS, application or other software requirement based upon the thermal capabilities available to the computing device and/or the companion electronic device and may switch tasks between the computing device and the companion electronic device based upon any combination of these.

The computing device and/or the companion electronic device may distribute computing tasks in accordance with a preference, policy, procedure, or application requirement based upon the thermal capabilities available in on either the computing device and or the companion electronic device and or the current or scheduled tasks required to executed on either the computing device and/or the companion electronic device.

The computing device and/or the companion electronic device may enable or disable system resources on either the computing device and/or the electronic device in accordance with a preference, policy, procedure or application requirement based upon the thermal capabilities available to the computing device and/or the companion electronic device.

The computing device and/or the companion device may enable or disable system resources on either the computing device and/or the electronic device in accordance with a preference, policy, procedure or application requirement based upon the thermal status and or based upon the scheduled tasks required to be executed on either the computing device and/or the companion electronic device.

The computing device may in whole or in part instruct or enable the companion electronic device to generate or deploy a user environment or a skin that corresponds, in whole or in part, to the user environment or skin of the computing device. The skin may be a skin associated with the operating system of the computing device.

The display orientation of information in either device can be controlled by the companion electronic device.

The companion electronic device may instruct the computing device to function in a specific manner, such as a remote control, or to display subtitles, or as a game controller for the companion electronic device, such as when the companion electronic device is displaying a movie or playing a game.

The computing device may switch between being a master to the companion electronic device and being a slave to that companion electronic device.

The computing device may be informed, or the companion device may instruct or inform the computing device of its presence based upon hardware or software means, including connector type, a hardware configuration, a protocol, or IP address, or by another identifier.

The devices alone or in conjunction with another device or system may be aware of each other's location and can track each other's movement, and/or act as an enabler for access or control of software or hardware on the devices or devices connected to either device.

The computing device may functions as a peripheral, such as a mouse, when connected to the companion electronic device.

The devices may each have an integrated or attached camera and these cameras' function may then be modified to behave in alternative modes such as a wide angle video conferencing mode by either adaptation of the cameras' settings or by post processing of the image taken by the camera on either the computing device the companion electronic device an intermediate device or a server connected to the devices.

The devices may each have an integrated or attached camera and these cameras adapt the characteristics of the computing device and or the companion electronic device such as reducing back lighting levels and or contrast on the displays of the computing device and or the companions electronic devices, or make adaptations based upon the type of activity e.g. the type of running applications being run and or displayed on either device.

The computing device may function as a security or access control device to either the hardware or software or both on the companion electronic device or other hardware or software or devices the companion electronic device may be connected to.

The computing device may, in conjunction with another device or token, function as a security or access control device to either the hardware or software or both on the companion electronic device or other software or devices the companion electronic device may be connected to.

The computing device and the companion electronic device may, in conjunction with each other and/or with software resident on both or either device, function as a security or access control to either the hardware or software or both on the companion electronic device or the computing device and to devices/servers connected to them. This functionality may also extend to other devices, such as door locks or other forms of physical access control.

The computing device may include settings that can tell the companion electronic device what preferences the user or an application wants and what mode it needs to be in, or vice versa, based on criteria such as the companion electronic device's or the computing device's capabilities, or the capabilities of peripheral devices attached to either of the computing device or the companion electronic device.

The computing device may be automatically or manually detected by the companion electronic device, or vice versa; the computing device or the companion electronic device is then asked whether it wishes to connect and does so or not based on a user preference or system policy.

The communications capabilities of the devices may be enabled and/or disabled, in accordance with resources available to either the computing device and/or the companion electronic device and/or based upon a policy, preference, procedure.

The computing device may takes on a context-dependent role that takes advantage of the combined capabilities of the computing and the companion electronic devices.

The computing device may be a portable, personal computing device, which may be selected from the list: Feature phone; Smartphone; Electronic navigation device; PDA; Media player; Camera; eReader; Tablet; Netbook/smartbook; Laptop; Convertible computer (e.g., netbook/tablet), or Devices with the appearance and or function in whole or in part of any of the preceding devices.

A system may include a computing device and a companion electronic device as described above. The companion electronic device may be selected from the list: Secondary display; Peripherals such as memory, printer, etc; Tablet computers; Automobile or other transport displays; Desktop Computer; Server; Gaming console; Keyboard; Remote control; Game controller; Electronic Kiosk; Electronic navigation device; Television; Multimedia receiver/player;

Other multimedia system; Point of sale device; Industrial PDA; Feature phone; Smartphone; Digital Camera; eReader; Netbook/smartbook; Laptop; Convertible computer (e.g., combined netbook/tablet); docking stand; or Devices with the appearance and or function in whole or in part of any of the preceding devices. Hardware, software, and processing components and tasks may be distributed across any or all devices in the system.

A companion electronic device may operate as a stand-alone system independent of the computing device once the data is sent from the computing device.

UE generation, adaptation, transformation, etc., functions of the companion electronic device may in addition be handled by a remote or local server, with the results then relayed to the companion electronic device or multiple companion electronic device either through local or remote connections, including for example, over a private network or over the internet.

The companion electronic device may receive changes back from the computing device, or from another device connected to the computing device so that the companion electronic device maintains the master, definitive data set.

The companion electronic device may receive changes back from the computing device so that data coherency is maintained between the devices.

The companion electronic device may adjust its computing clock speed either the processor or the memory or both in accordance with a preference, policy, procedure or application requirement based upon the system voltage of the companion electronic device.

The companion electronic device may under its own control or in conjunction with the computing device, in whole or in part generates or deploys a user environment or a skin that corresponds, in whole or in part, to the user environment or skin of the computing device. The skin may be a skin associated with the operating system of the computing device.

An application or operating system/graphical user interface of the companion electronic device may behave differently, either enhanced, reduced or otherwise, depending on criteria such as user preferences, the type or number of displays, peripherals, companion devices, and/or other device or software capabilities are that available to it or connected to it either directly or over an interface or network connection.

The companion electronic device may provide peripherals, capabilities, or connections to the computing device for the computing device to use, in preference to its own peripherals, capabilities, or connections, on instruction from the companion electronic device. The companion electronic device may function as a peripheral, such as memory storage, when connected to the computing device. The companion electronic may function as a security or access control device to either the hardware or software or both on the companion electronic device or other hardware or software or devices such as a server the companion electronic device may be connected to.

The companion electronic device may, in conjunction with another device or token, functions as a security or access control device to either the hardware or software or both on the companion electronic device or other hardware or software or devices the companion device may be connected to.

The companion electronic device may be operable to detect the presence of the computing device.

The companion electronic device may provide services or additional capabilities on request to the computing device.

The computing device or the companion electronic device may change roles or functions at any time, with the computing device assuming the role or function of the companion device and the companion device assuming the role or function of the computing device.

An application running on either device, or the operating system it runs on, may select or recommend whether a display on the computing device or the companion electronic device is used, or whether multiple displays are used.

The computing device may be connected over an interface and may switch the interface to another interface or adjust the interface characteristics dependent on the capabilities, requirements of software running on the companion electronic device or the computing device or a server connected to either of them or resources available to either the companion electronic device or the computing device.

The original interface may be one of: physical and/or wireless and/or network interface and the new interface switched to is a different type selected from that list and the switch to a different type of interface is done to suit the capabilities of either the computing device(s) or the companion electronic device(s) or the resources available to them. The switch to a different type of interface may be done if there is interference on a particular type of interface. The switch to a different type of interface may also be done if an application requires or is more suited to a different type of interface connection. The switch to a different type of interface may be triggered by other characteristics, statuses or states, such as available system power of either device, thermal status and/or capability of either device, or the presence of additional hardware or interfaces (e.g., one device is compliant with the faster 802.11n standard while the other device is only compliant with the slower 802.11g).

An intermediary device may be attached to a computing device as described above, in which the intermediate device supplements or improves the capability of the computing device to work in conjunction with the companion electronic device.

The capability that is provided by the intermediary device may include but is not limited to one or more of the following: Auxiliary wireless data or A/V transmission; A/V conversion, encoding, decoding or transformation; Auxiliary memory; Auxiliary battery capacity; mechanical adaptation of computing devices to integrate with and into companion electronic devices, Connector adaptation and/or transformation; Mechanical adaptation and/or transformation.

A consistent external interconnection scheme may be both mechanically and electronically employed allowing the creation of a standardized physical and electronic interface between computing devices and companion electronic devices, having the benefit of multiple companion electronic devices being able to physically interconnect with multiple computing devices.

A system in which a laptop housing comprising a display and a keyboard, is configured to mechanically and electrically attach to a computing device to form a single unit, and is characterized in that:
a) functionality are complemented and enhanced by interworking with the elements of the laptop style housing and any devices connected to the unit,
b) control of the functionality of the system is split between the computing device and the companion electronic device and applications,
c) the single unit operates as a personal computer.

A system in which a docking stand comprises a first port to connect to a display apparatus and a second port to connect to a keyboard, the docking stand configured to mechanically and electrically attach to a computing device, and is characterized in that:
a) functionalities of the computing device are complemented and enhanced by interworking with the elements of the docking stand and any further devices connected to the first and second ports,
b) control of the functionality of the system are split between the computing device and the companion electronic device and applications,
c) the attached computing device operates as a personal computer when connected to the display apparatus and the keyboard via its ports.

A system in which a tablet comprising a display and a which may include buttons and/or a keyboard, is configured to mechanically and electrically attach to a computing device to form a single unit, and is characterized in that:
a) functionality are complemented and enhanced by interworking with the elements of the tablet style housing and any devices connected to the unit,
b) control of the functionality of the system is split between the computing device and the companion electronic device and applications.
c) the single unit operates as a personal tablet computer.

The invention claimed is:

1. A system including a mobile phone computing device and a companion electronic device, the mobile phone computing device including a first processor, a first input interface, a first output interface, a first memory storing instructions, and a first transceiver operable to communicate with the companion electronic device; the companion electronic device including a second processor, a second input interface, a second output interface, a second memory storing instructions, and a second transceiver operable to communicate with the mobile phone computing device;
   wherein the mobile phone computing device is
   i) informed of the presence of the companion electronic device or is informed by the companion electronic device of its presence through hardware or software including connector type, a hardware configuration, type of connector used, a protocol, or IP address; and
   ii) operable to detect either manually or automatically the presence of the companion electronic device, or in which the companion electronic device is operable to detect either manually or automatically the presence of the mobile phone computing device, and the mobile phone computing device or the companion electronic device is operable to adjust its functionality in accordance with being informed or detected;
   iii) operable to switch between being a master to the companion electronic device and being a slave to the companion electronic device, and
   wherein the mobile phone computing device is connected over an interface to the companion electronic device, and operable to switch the interface to another type of interface or adjust the interface characteristics dependent on the capabilities or resources available to either the companion electronic device or the mobile phone computing device, and
   wherein the mobile phone computing device enables the control or simultaneous use of at least one of the same applications, or at least one of modified versions of the same applications, or at least one of different applications, or different companion electronic devices; and
   wherein the mobile phone computing device is operable to work synchronously or asynchronously in conjunction with the companion electronic device, in which the mobile phone computing device and the companion electronic device each have their own electronics and/or own operating system and each is able to construct a complete user environment, and
   wherein the complete user environment is a complete set of software and hardware components that together provide for output to and input from a user, wherein the complete user environment includes at least one of graphics assets, GUI gadgets or widgets, input/output control methods, audio, commands, haptic or other feedback method or instructions;
   wherein the mobile phone computing device is operable to send data defining at least one of the following: graphics assets, GUI gadgets or widgets, input/output control methods, audio, commands, haptic or other feedback method or instructions, to the companion electronic device, on request of the companion electronic device, which the companion electronic device then uses to locally construct its own constructed complete user environment adapted to its form factor and modality of usage, wherein the constructed complete user environment includes at least one of: the graphics assets, GUI gadgets or widgets, input/output control methods, audio, commands, haptic or other feedback method or instructions, defined in data sent by the mobile phone computing device.

2. The system of claim 1 in which the mobile phone computing device includes at least one processor core and that core is used, under the instruction of the companion electronic device, to provide and/or generate the data that is sent from the mobile phone computing device to the companion electronic device and to provide services to the companion electronic device.

3. The system of claim 2 in which the core is used in conjunction with other electronics, to provide and/or generate the data that is sent from the mobile phone computing device to the companion electronic device and to provide services to the companion electronic device.

4. The system of claim 1 in which the mobile phone computing device communicates over the interface or over interfaces with the companion electronic device, where the interface or interfaces include one or more of the following: a physical connection, a wireless connection, or a network connection, and in which the mobile phone computing device and companion electronic device are local or remote to one another.

5. The system of claim 1 in which a user is a person, persons or another device in a machine to machine (M2M) application, or a peripheral.

6. The system of claim 1 in which the data the mobile phone computing device sends to the companion electronic device includes elements that are directly or indirectly used in the constructed complete user environment of the companion electronic device, using mechanisms on the mobile phone computing device or the companion electronic device.

7. The system of claim 1 in which the mobile phone computing device operates independently of or in conjunction with the companion electronic device and in which the data that is sent to the companion electronic device can include but is not limited to one or more of: content, data, application results, applications themselves, input/output, user feedback, information and/or data application results, which may be modified, enhanced, or adapted on the mobile phone computing device or companion electronic device to be suitable for user preferences, capabilities and/or the configuration of the mobile phone computing device or companion electronic device, and this data is combined, at the companion electronic device, with elements generated locally at the companion electronic device to build the companion electronic device constructed complete user environment.

8. The system of claim 1 in which the mobile phone computing device provides services or additional capabilities on request to the companion electronic device.

9. The system of claim 1 in which the mobile phone computing device which provides functions including application execution on the mobile phone computing device, elements of which of which are provided to the companion electronic device.

10. The system of claim 1 in which the mobile phone computing device is one in which the data sent from the mobile phone computing device includes data that is an abstraction or generalisation of data and/or information that defines some elements of a complete user environment and therefore may not be specific to any single type or class of companion electronic devices, but instead can be used by the companion electronic device to construct the constructed complete user environment appropriate to fit with its own configuration, settings or capabilities.

11. The system of claim 1 in which the mobile phone computing device is one in which a graphical image is described and sent by the mobile phone computing device using a method which is the Scalable Vector Graphics (SVG) specification of XML, or another standards or non-standards based method, and is interpreted and rendered by the companion electronic device, or some elements of the constructed complete user environment are sent by commands or library calls, or data is sent as data abstractions which are then received and interpreted by the companion electronic device.

12. The system of claim 1 in which the mobile phone computing device is one for which a connected server retains the status of the mobile phone computing device, and/or the companion electronic device.

13. The system of claim 1 in which the mobile phone computing device shares a common physical or logical memory device or file system for the storage and/or manipulation of data with the companion electronic device.

14. The system of claim 1 in which the mobile phone computing device shares a common file management system for the storage and manipulation of data with the companion electronic device.

15. The system of claim 1 in which the mobile phone computing device does not share a common file management system for the storage and manipulation of data with the companion electronic device.

16. The system of claim 1 in which the mobile phone computing device itself has no knowledge of the capabilities of the companion electronic device.

17. The system of claim 1 in which the mobile phone computing device is not originally intended to be operable with the companion electronic device but which may be made so operable through the addition of hardware components, software components and/or intermediary or peripheral devices, whether local or remote to the mobile phone computing device and companion electronic devices.

18. The system of claim 1, the system including additional mobile phone computing devices, in which the mobile phone computing device is one which, singularly or together with the additional mobile phone computing devices, is connected over one or more interfaces to multiple companion electronic devices at the same time.

19. The system of preceding claim 18 in which the mobile phone computing device is one interfacing with multiple companion electronic devices that are each connected over one or more interfaces to each other, wherein one or more companion electronic devices act as a computing device.

20. The system of claim 1 in which the mobile phone computing device functions independently of, or in conjunction with, another device or token, and/or independently or in conjunction with software resident on one or both of the companion device and the another device or token, as a security or access control device to either the hardware or software, or to both the hardware and software, on the companion electronic device, or to other hardware or software or devices.

21. The system of claim 1 in which the mobile phone computing device is one in which the settings on the mobile phone computing device can tell the companion electronic device what preferences the user or an application wants and what mode it needs to be in, or vice versa, based on the companion electronic device's or the mobile phone computing device's capabilities, or the capabilities of peripheral devices attached to either of the mobile phone computing device or the companion electronic device.

22. The system of claim 1 in which the mobile phone computing device is one which is selected from the list: Feature phone; Smartphone; Electronic navigation device; PDA; Media player; Camera; eReader; Tablet; Netbook/smartbook; Laptop; Convertible computer.

23. The system of claim 1 in which the companion electronic device is a tablet computer, a notebook computer, or a TV/PC monitor.

\* \* \* \* \*